(12) United States Patent
Anbalagapandian et al.

(10) Patent No.: US 12,210,812 B2
(45) Date of Patent: Jan. 28, 2025

(54) GENERATING AND UTILIZING DIGITAL MEDIA CLIPS BASED ON CONTEXTUAL METADATA FROM DIGITAL ENVIRONMENTS

(71) Applicant: Dropbox, Inc., San Francisco, CA (US)

(72) Inventors: Arunsunai Anbukarasi Anbalagapandian, San Francisco, CA (US); Devin Mancuso, Alameda, CA (US); Rituparna Vincent, Alamo, CA (US); Viksit Gaur, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

(21) Appl. No.: 17/657,573

(22) Filed: Mar. 31, 2022

(65) Prior Publication Data
US 2023/0315972 A1   Oct. 5, 2023

(51) Int. Cl.
*G06F 40/00* (2020.01)
*G06F 40/106* (2020.01)

(52) U.S. Cl.
CPC ................... *G06F 40/106* (2020.01)

(58) Field of Classification Search
CPC .................................................. G06F 40/106
See application file for complete search history.

(56) References Cited

U.S. PATENT DOCUMENTS

| | | | |
|---|---|---|---|
| 6,741,996 B1 | 5/2004 | Brechner et al. | |
| 7,765,236 B2 | 7/2010 | Zhai et al. | |
| 7,774,341 B2 | 8/2010 | Aravamudan et al. | |
| 8,732,853 B1 * | 5/2014 | Byrne | H04L 63/08 726/28 |
| 8,838,748 B2 | 9/2014 | Nair et al. | |
| 8,949,252 B2 | 2/2015 | Chittar et al. | |

(Continued)

FOREIGN PATENT DOCUMENTS

| | | |
|---|---|---|
| CN | 108985165 A | 12/2018 |
| JP | 2016167237 A | 9/2016 |

(Continued)

OTHER PUBLICATIONS

"Same Energy—Visual Search Engine," Retrieved from the Internet: https://same.energy, retrieved on Apr. 15, 2022, 2 pages.

(Continued)

*Primary Examiner* — Barbara M Level
(74) *Attorney, Agent, or Firm* — Keller Preece PLLC

(57) ABSTRACT

The present disclosure relates to systems, methods, and non-transitory computer-readable media that dynamically capture, organize, and utilize digital media clips. For example, in one or more implementations, the disclosed systems can capture and generate digital media clips of content items that include both content metadata of the content items as well as contextual metadata of contextual signals surrounding the content item. Additionally, in some implementations, the disclosed systems analyze contextual metadata to search, retrieve, discover, and organize new and existing digital media clips. Further, in various implementations, the disclosed systems facilitate generating digital media clip libraries as well as the creation of digital media collections, where different types of digital media clips can be combined in a cohesive interactive graphical user interface.

20 Claims, 40 Drawing Sheets

(56) References Cited

U.S. PATENT DOCUMENTS

| | | | |
|---|---|---|---|
| 8,972,392 B2 | 3/2015 | He et al. | |
| 9,298,797 B2 | 3/2016 | Balakrishnan et al. | |
| 9,332,318 B2 | 5/2016 | Li et al. | |
| 9,448,696 B1* | 9/2016 | Kline | H04L 65/61 |
| 9,848,228 B1* | 12/2017 | Morris | H04N 5/76 |
| 10,057,651 B1 | 8/2018 | Singh et al. | |
| 10,133,816 B1 | 11/2018 | Bilinski et al. | |
| 10,567,484 B2 | 2/2020 | Houston et al. | |
| 10,776,417 B1 | 9/2020 | Ravichandran et al. | |
| 10,909,767 B1 | 2/2021 | Childress et al. | |
| 10,997,240 B1 | 5/2021 | Aschner et al. | |
| 11,169,675 B1* | 11/2021 | Anvaripour | H04L 51/52 |
| 11,216,517 B1* | 1/2022 | Ahmed | G06F 3/0482 |
| 11,386,152 B1 | 7/2022 | Arowesty et al. | |
| 11,609,738 B1 | 3/2023 | Imbruce et al. | |
| 11,790,391 B1* | 10/2023 | Thomas | H04L 67/306 705/14.36 |
| 2002/0002550 A1 | 1/2002 | Berman | |
| 2002/0111887 A1 | 8/2002 | McFarlane et al. | |
| 2004/0189691 A1 | 9/2004 | Jojic et al. | |
| 2004/0215643 A1* | 10/2004 | Brechner | G06F 16/40 |
| 2005/0149557 A1 | 7/2005 | Moriya et al. | |
| 2006/0015494 A1 | 1/2006 | Keating et al. | |
| 2006/0218522 A1 | 9/2006 | Hanechak | |
| 2007/0239779 A1 | 10/2007 | Hugill et al. | |
| 2008/0215509 A1 | 9/2008 | Charlton | |
| 2008/0222201 A1 | 9/2008 | Chen et al. | |
| 2008/0256399 A1* | 10/2008 | Erdosi | G06F 11/366 714/47.1 |
| 2008/0307310 A1* | 12/2008 | Segal | G06Q 30/02 715/723 |
| 2009/0076881 A1 | 3/2009 | Svendsen | |
| 2009/0077084 A1 | 3/2009 | Svendsen | |
| 2009/0171559 A1 | 7/2009 | Lehtiniemi et al. | |
| 2009/0234784 A1 | 9/2009 | Buriano et al. | |
| 2010/0036883 A1 | 2/2010 | Valencia-Campo et al. | |
| 2010/0250539 A1 | 9/2010 | Zhou et al. | |
| 2010/0318515 A1 | 12/2010 | Ramanathan et al. | |
| 2011/0225136 A1 | 9/2011 | Tu et al. | |
| 2011/0320715 A1 | 12/2011 | Ickman et al. | |
| 2012/0124517 A1* | 5/2012 | Landry | G06F 3/0482 715/810 |
| 2012/0311447 A1 | 12/2012 | Chisa et al. | |
| 2013/0060616 A1 | 3/2013 | Block et al. | |
| 2013/0311595 A1* | 11/2013 | Milatinovici | G06F 15/167 |
| 2014/0068501 A1* | 3/2014 | Wu | G06Q 50/01 715/764 |
| 2014/0096056 A1 | 4/2014 | Latzina | |
| 2014/0101707 A1 | 4/2014 | Kishore | |
| 2014/0143355 A1 | 5/2014 | Berdis et al. | |
| 2014/0229481 A1 | 8/2014 | Qureshi et al. | |
| 2014/0331139 A1* | 11/2014 | Carson | H04N 21/472 715/723 |
| 2014/0380142 A1* | 12/2014 | Mikutel | G06F 9/451 715/234 |
| 2015/0026179 A1 | 1/2015 | Yokoyama et al. | |
| 2015/0046827 A1* | 2/2015 | Akselrod | G06F 16/908 715/738 |
| 2015/0154205 A1 | 6/2015 | Grano et al. | |
| 2015/0177937 A1* | 6/2015 | Poletto | G06F 3/167 715/739 |
| 2016/0054916 A1 | 2/2016 | Snibbe et al. | |
| 2016/0132217 A1 | 5/2016 | Asokan et al. | |
| 2016/0149956 A1* | 5/2016 | Birnbaum | H04L 63/20 726/1 |
| 2016/0314120 A1* | 10/2016 | Dauderman | G06F 17/30 |
| 2016/0349973 A1 | 12/2016 | Peevers et al. | |
| 2017/0017658 A1 | 1/2017 | Blong et al. | |
| 2017/0052662 A1 | 2/2017 | Smith, Jr. | |
| 2017/0185753 A1* | 6/2017 | Yang | H04L 67/06 |
| 2017/0358321 A1* | 12/2017 | Kilar | G11B 27/028 |
| 2018/0012619 A1 | 1/2018 | Ryan et al. | |
| 2018/0077469 A1* | 3/2018 | Geduldig | H04N 21/4316 |
| 2018/0158159 A1 | 6/2018 | Divine et al. | |
| 2018/0173381 A1* | 6/2018 | Bakker | G06F 9/543 |
| 2018/0181566 A1 | 6/2018 | Lee et al. | |
| 2018/0199080 A1 | 7/2018 | Jackson, Jr. et al. | |
| 2018/0330756 A1* | 11/2018 | MacDonald | G06F 16/951 |
| 2019/0043095 A1 | 2/2019 | Grimaud et al. | |
| 2020/0117910 A1 | 4/2020 | Willomitzer | |
| 2020/0147489 A1 | 5/2020 | Mahlmeister et al. | |
| 2020/0152237 A1 | 5/2020 | Chen et al. | |
| 2020/0206612 A1* | 7/2020 | Gault | A63F 13/355 |
| 2021/0019342 A1 | 1/2021 | Peng et al. | |
| 2021/0021551 A1 | 1/2021 | Yang et al. | |
| 2021/0073179 A1* | 3/2021 | Berman | G06F 16/1873 |
| 2021/0166285 A1 | 6/2021 | Yajima | |
| 2021/0173863 A1 | 6/2021 | Collins | |
| 2021/0319223 A1 | 10/2021 | Nagata et al. | |
| 2021/0326373 A1 | 10/2021 | Gasparic et al. | |
| 2021/0402297 A1 | 12/2021 | Khan | |
| 2022/0021921 A1* | 1/2022 | Osman | G06T 7/50 |
| 2022/0035865 A1 | 2/2022 | Lo et al. | |
| 2022/0253477 A1 | 8/2022 | Lipka et al. | |
| 2022/0365638 A1* | 11/2022 | Ryan | G06F 3/04842 |
| 2023/0047548 A1 | 2/2023 | Day et al. | |
| 2023/0058828 A1 | 2/2023 | Mori | |

FOREIGN PATENT DOCUMENTS

| | | |
|---|---|---|
| KR | 20110136452 A | 12/2011 |
| KR | 20130031530 A | 3/2013 |
| KR | 20150022246 A | 3/2015 |
| KR | 20200094162 A | 8/2020 |
| WO | WO-2015148693 A1 | 10/2015 |

OTHER PUBLICATIONS

Apple Support, "Create, Edit, and Delete Smart Playlists in Music on Mac," Apple Music User Guide, Retrieved from the Internet: https://support.apple.com/guide/music/create-edit-and-delete-smart-playlists-mus1712973f4/mac#:~:text=In, Apr. 15, 2022, 3 pages.

"ARE.NA," Retrieved from the Internet: https://www.are.na, Apr. 15, 2022, 4 pages.

Be, "Photos, Videos, Logos, Illustrations and Branding on Behance," Retrieved from the Internet: https://www.behance.net, Apr. 15, 2022, 4 pages.

"Blot," Retrieved from the Internet: https://blot.im, Apr. 15, 2022, 2 pages.

Collect by WeTransfer, "Save and Organize Inspiration," Retrieved from the Internet: https://wetransfer.com/collect, Apr. 15, 2022, 5 pages.

"DRIBBBLE—Discover the World's Top Designers & Creative Professionals," Retrieved from the Internet: https://dribbble.com, Apr. 15, 2022, 103 pages.

Figma, "Community," Retrieved from the Internet: https://www.figma.com/community, Apr. 15, 2022, 15 pages.

Google Arts & Culture, Retrieved from the Internet: https://artsandculture.google.com, retrieved on Apr. 15, 2022, 1 page.

"Google Keep—Free Note Taking App for Personal Use," Retrieved from the Internet: https://www.google.com/keep/, Apr. 15, 2022, 6 pages.

Instagram Blog, "Introducing the Emoji Slider Sticker for Instagram Stories," Retrieved from the Internet: https://about.instagram.com/blog/announcements/introducing-the-emoji-slider-sticker, Apr. 15, 2022, 5 pages.

Invision, "Inside Design," Retrieved from the Internet: https://www.invisionapp.com/inside-design/freehand-creative-collaboration/, Apr. 15, 2022, 9 pages.

"Landing," Retrieved from the Internet: https://app.landing.space/?tab=discover, Apr. 15, 2022, 1 page.

MDN Web Docs, "Masonry Layout—CSS: Cascading Style Sheets," Retrieved from the Internet: https://developer.mozilla.org/en-US/docs/Web/CSS/CSS_Grid_Layout/Masonry_Layout, retrieved on Apr. 15, 2022, 12 pages.

"Mem: The Self-Organizing Workspace," Retrieved from the Internet: https://get.mem.ai, retrieved on Apr. 15, 2022, 10 pages.

(56) References Cited

OTHER PUBLICATIONS

"Mirror—On the App Store," Retrieved from the Internet: https://apps.apple.com/us/app/mirror/id379516970, retrieved on Apr. 15, 2022, 4 pages.

"Muse—Your Tool for Thought," Retrieved from the Internet: https://museapp.com, retrieved on Apr. 15, 2022, 4 pages.

"Musically—Some of Spotify's Programmed Playlists will now be Personalised," Retrieved from the Internet: https://musically.com/2019/03/26/some-of-spotifys-programmed-playlists-will-now-be-personalised/, Retrieved on Apr. 15, 2022, 5 pages.

"My Mind—Mymind is the Extension for your Mind," Retrieved from the Internet: https://mymind.com, Retrieved on Apr. 15, 2022, 12 pages.

"Online Archive—Search Online Archive at Letterform Archive," Retrieved from the Internet: https://oa.letterformarchive.org, Retrieved on Apr. 15, 2022, 3 pages.

OpenAI, "Clip: Connecting Text and Images," Retrieved from the Internet: https://openai.com/blog/clip/, Retrieved on Apr. 15, 2022, 16 pages.

"Paper by WeTransfer—Simple Sketch App," Retrieved from the Internet: https://wetransfer.com/paper, retrieved on Apr. 15, 2022, 6 pages.

"Pinterest—On the App Store," Retrieved from the Internet: https://apps.apple.com/us/app/pinterest/id429047995, Retrieved on Apr. 15, 2022, 4 pages.

"Playbook—Organize your Creative Files," Retrieved from the Internet: https://www.playbook.com, Retrieved on Apr. 15, 2022, 7 pages.

"Pocket—Get Right to the Good Stuff," Retrieved from the Internet: https://getpocket.com/en/, retrieved on Apr. 15, 2022, 5 pages.

"Raindrop.io—All-in-One Bookmark Manager," Retrieved from the Internet: https://raindrop.io, Retrieved on Apr. 15, 2022, 7 pages.

"Reclaimai—Smart Time Blocking for your Calendar," Retrieved from the Internet: https://reclaim.ai, Retrieved on Apr. 15, 2022, 11 pages.

"Roam Research—A Note taking Tool for Networked Thought," Retrieved from the Internet: https://roamresearch.com, Retrieved on Apr. 15, 2022, 5 pages.

"TechCrunch—Figma introduces a whiteboard tool called FigJam," Retrieved from the Internet: https://techcrunch.com/2021/04/21/figma-introduces-a-whiteboard-tool-called-figjam/, Retrieved on Apr. 15, 2022, 11 pages.

"TechCrunch—Google Photos gets Smarter, Automatically creates Albums with your best Photos," Retrieved from the Internet: https://techcrunch.com/2016/03/22/google-photos-gets-smarter-automatically-creates-albums-with-your-best-photos/, Retrieved on Apr. 15, 2022, 7 pages.

"Story Time—Not Boring by Packy McCormick," Retrieved from the Internet: https://www.notboring.co/p/story-time?s=r, Retrieved on Apr. 15, 2022, 19 pages.

"Trello," Retrieved from the Internet: https://trello.com/en-us, Retrieved on Apr. 15, 2022, 8 pages.

"Unsplash—Beautiful Free Images & Pictures," Retrieved from the Internet: https://unsplash.com, Retrieved on Apr. 15, 2022, 4 pages.

"Wayback Machine—Internet Archive: Digital Library of Free & Borrowable Books, Movies, Music & Wayback Machine," Retrieved from the Internet: https://archive.org, Retrieved on Apr. 15, 2022, 4 pages.

Webpage Capture, "archive.today," Retrieved from the Internet: https://archive.ph, Apr. 15, 2022, 1 page.

Tkalcic M., et al., "Affective Labeling in a Content-Based Recommender System for Images," IEEE Transactions on Multimedia, vol. 15, No. 2, Feb. 2013, pp. 391-400.

International Search Report and Written Opinion for Application No. PCT/US2022/080626 mailed on Mar. 23, 2023, 14 pages.

Non-Final Office Action from U.S. Appl. No. 17/657,571, mailed on Apr. 13, 2023, 21 pages.

Notice of Allowance from U.S. Appl. No. 17/657,572, mailed May 5, 2023, 13 pages.

Notice of Allowance from U.S. Appl. No. 17/657,572, mailed May 16, 2023, 2 pages.

Final Office Action from U.S. Appl. No. 17/657,571, mailed on Nov. 21, 2023, 33 pages.

Non-Final Office Action from U.S. Appl. No. 17/657,571, mailed on Apr. 11, 2024, 19 pages.

Final Office Action from U.S. Appl. No. 17/657,571 mailed Sep. 10, 2024, 25 pages.

Notice of Acceptance for Australian Application No. 2022449894 mailed on Jul. 11, 2024, 3 pages.

Office Action for Canadian Application No. 3241561 mailed on Jul. 24, 2024, 4 pages.

Non-Final Office Action from U.S. Appl. No. 18/469,319, mailed Sep. 5, 2024, 41 pages.

\* cited by examiner

GENERATING AND UTILIZING DIGITAL MEDIA CLIPS BASED ON CONTEXTUAL METADATA FROM DIGITAL ENVIRONMENTS

BACKGROUND

Recent years have seen significant advancements in hardware and software platforms that improve the management of digital content. As web-based functionalities such as messaging, content sharing, browsing, and searching continue to increase, many existing web-based systems offer ways to organize digital content obtained online. For example, these existing systems provide organized features, such as bookmark managers and image collection boards.

Despite advances in the areas of digital content management, many existing systems face several technical shortcomings that result in inaccurate, inefficient, and inflexible operations. To illustrate, many existing systems imprecisely capture digital content items. For example, upon bookmarking a webpage, some existing systems provide a bookmark manager that records the URL of the webpage in a list or as a file. As another example, upon detecting an indication of interest for an image online, various existing systems add the image along with its weblink to an online collection or board of digital images. However, these existing systems often only collect surface information about the digital content itself, which restricts the existing systems from utilizing and processing the digital content in meaningful ways, such as providing insights based on secondary information of a digital content item.

In addition, many existing systems are inefficient regarding collecting, managing, and utilizing digital content. In particular, various existing systems often haphazardly and inefficiently organize collected digital content. As a result, both storage and retrieval of digital content are inefficient and costs additional computing resources to perform. In some instances, existing systems provide cumbersome navigation and menus for users that need to store or retrieve digital content. By requiring user interactions to navigate through multiple and/or separate windows and menus, existing systems again consume excessive computing resources, such as real-time memory. Furthermore, many existing systems often fail to surface stored digital content in a meaningful way as well as frequently present duplicate and/or otherwise unnecessary digital content when attempting to retrieve digital content. In addition, many existing systems often inefficiently display content. For example, existing systems often require the use of jumping between multiple applications to access web-based stored digital content. Further, users must often manually navigate through various cumbersome user interfaces to request access to stored digital content.

Moreover, existing systems are often rigid and inflexible. As an initial matter, existing systems are often unable to keep up with the increasing complexity of and interactions between different web-based sources and/or content item types. For example, many existing systems are limited to connecting and storing content items of a given type or category. In particular, these existing systems are often constrained to access capabilities of a single web source or single content item type. Indeed, many existing systems include a structure that is specifically designed to isolate each web source or content item type. Additionally, there are various types of content items that cannot be captured or collected by any existing systems.

Furthermore, just as existing systems isolate individual web sources for a user, existing systems often isolate individual users from one another with respect to collecting digital content. Although existing systems may allow users to access a specific web source (e.g., an online email or messaging system) to communicate, existing browsing systems are otherwise limited in allowing user collaboration across other web sources.

Additionally, various existing systems provide poor display and arrangement of content items. Often many existing systems are unable to display different types of content items in the same user interface. Moreover, many existing systems are inflexible in that they lack additional tools, capabilities, and operations to accurately and dynamically capture and organize content items, without requiring substantial user input. Indeed, this rigidity only exacerbates the accuracy and efficiency problems outlined above.

These, along with additional problems and issues, exist with regard to existing web browsing systems.

BRIEF SUMMARY

Embodiments of the present disclosure provide benefits and/or solve one or more of the foregoing or other problems in the art with systems, non-transitory computer-readable media, and methods that dynamically capture, organize, and utilize digital media clips. For example, in one or more implementations, the disclosed systems can capture and generate digital media clips of content items that include both content metadata of the content items as well as contextual metadata of contextual signals surrounding the content item. Additionally, in some implementations, the disclosed systems analyze contextual metadata to search, retrieve, discover, and organize new and existing digital media clips. Further, in various implementations, the disclosed systems facilitate generating digital media clip libraries as well as the creation of digital media collections, where different types of digital media clips can be combined in a cohesive interactive graphical user interface.

To illustrate, in one or more implementations, the disclosed systems detect user interaction with a content item and, in response, extract the content item and content metadata for the content item. In addition, the disclosed systems can generate contextual metadata for the content item based on contextual signals from digital environments in which the content item is located. The disclosed systems can also generate a digital media clip comprising the content item, the content metadata, and the contextual metadata. Further, the disclosed systems can identify the content item based on the contextual metadata from the digital media clip. Additionally, in some instances, the disclosed systems can also display the content item along with the content item metadata within an interactive graphical user interface.

In addition, the media clip system can provide recommendations for adding content items to the media clip library of a user account. To illustrate, in various implementations, the media clip system identifies items that are not part of a user account's media clip library. Additionally, the content management system can determine a correlation score for each content item by comparing them to contextual metadata from media clips in the media clip library. Based on the correlation scores, the content management system can provide a recommendation to add a content item to the media clip library of a user account.

Moreover, the disclosed systems can generate and provide various versions of a media clip collection. For example, in one or more implementations, the disclosed systems provide one or more control lenses for a media clip collection, which modifies the appearance or access to the media clip collection when viewed by others. In some implementations, the disclosed systems provide various layout arrangements for viewing, editing, and/or presenting a media clip including a flexible freeform layout arrangement. Further, in various implementations, the disclosed systems provide for stacking digital media clips to bind the digital media clips together when being viewed within a media clip collection.

Additional features and advantages of one or more embodiments of the present disclosure are outlined in the following description.

BRIEF DESCRIPTION OF THE DRAWINGS

The detailed description provides one or more embodiments with additional specificity and detail through the use of the accompanying drawings, as briefly described below.

DETAILED DESCRIPTION

Figure 1:
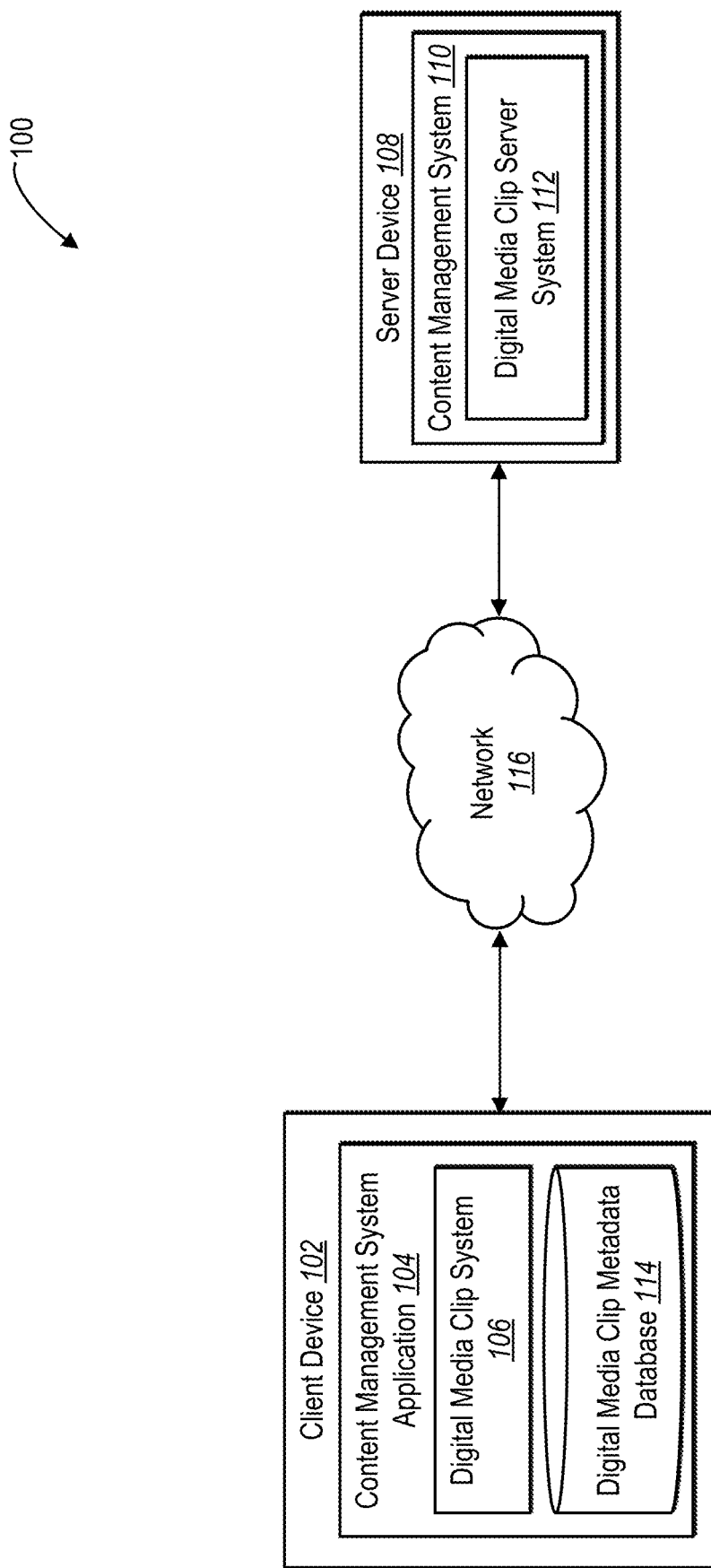
FIG. 1 illustrates a diagram of a computing system environment including a digital media clip system in accordance with one or more embodiments.

One or more embodiments of the present disclosure relate to a digital media clip system that dynamically captures, generates, organizes, and utilizes digital media clips. For instance, the digital media clip system (or simply "media clip system") can generate digital media clips (or simply "media clips") for content items, which include contextual metadata based on contextual signals identified when capturing the content item. In addition, in some instances, the media clip system can analyze contextual metadata to search, retrieve, discover, and organize new and existing digital media clips. Further, in various instances, the media clip system can generate digital media collections that include various organizational schemes where different types of digital media clips can be combined in a cohesive interactive graphical user interface.

To illustrate, in some implementations, the media clip system detects user interaction with the content item, such as detecting a request to "clip" a content item. In response, the media clip system extracts the content item and content metadata for the content item. In addition, the media clip system can generate contextual metadata for the content item based on contextual signals from digital environments in which the content item is located. The media clip system can also generate a digital media clip comprising the content item, the content metadata, and the contextual metadata. In additional implementations, the media clip system can identify the content item based on the contextual metadata from the digital media clip. Additionally, in some instances, the disclosed systems can also display the content item along with its content item metadata within an interactive graphical user interface.

As described above, in various implementations, the media clip system detects a request to generate a media clip from a content item. For example, the media clip system provides an interactive interface to facilitate requests for capturing content items as well as generating media clips from those content items. As provided below, the media clip system facilitates capturing media clips from content items across a wide range of content item types, applications, and digital environments.

In various implementations, in response to detecting a request to save a content item as a media clip, the media clip system extracts the content item from its source. As one example, the source of the content item is web-based, such as an image or text from a website, a social media post, or a video. As another example, the source of the content item is application-based, such as from a natively running application, such as a document, a game, a video chat, or a presentation. As a further example, the source of the content item is a screenshot or screen recording.

As mentioned above, the media clip system can also capture content metadata for the content item. Examples of content metadata include a name, size, file, type, attributes, tags, creation date, or permissions of the content item. In some implementations, the type of available content metadata is based on the content item type of the content item. For example, images have different content metadata than documents or web links. In example implementations, the type of available content metadata is based on the source of a content item. For instance, an image extracted from a camera may include additional content metadata beyond that of an image screenshot. Accordingly, the media clip system can determine, detect, and collect content metadata for a content item based on the content item type, the source, and/or other factors.

As also mentioned above, the media clip system can generate contextual metadata for a content item. For instance, in one or more implementations, the media clip system identifies one or more digital environments associated with the client device that provides the content item. Examples of digital environments include a web-based environment, an application environment, and/or an operating system (OS) environment. In various implementations, each of these digital environments provides one or more signals (i.e., contextual signals), which the media clip system can collect and analyze to discover additional context for the content item at the time of capture.

In various implementations, the media clip system generates the contextual metadata for a content item based on these contextual signals. For example, when an image (e.g., content item) is captured within a webpage browser, the media clip system can detect web-based environment signals (e.g., the URL of the website from which the image was captured, the source of the image, and/or other tabs recently opened or accessed), application-based signals (e.g., open or active applications or processes), and OS signals (e.g., date and time captures, OS system details, network activity, etc.). In some implementations, the media clip system stores one or more signals as contextual metadata for the content item. In various implementations, the media clip system analyzes one or more signals and stores the results as contextual metadata.

As mentioned above, the media clip system can generate a media clip. For example, in various implementations, the media clip system generates a media clip by combining the content item with its content metadata and contextual metadata. For instance, in some implementations, the media clip system stores the content metadata and/or the contextual metadata in a digital media clip metadata database (or simply "metadata database") and generates a media clip by associating a content item with its content item metadata (i.e., content metadata and contextual metadata) in the metadata database. In alternative implementations, the media clip system generates a new file type that includes a content item along with its content item metadata.

In various implementations, the media clip system generates a digital media clip collection that includes multiple media clips. In one or more implementations, the media clip system facilitates identifying, displaying, and searching existing media clips based on the content item and/or metadata (included contextual metadata). In various implementations, the media clip system provides an interactive interface to display, navigate, search, and otherwise utilize the media clip collection.

In addition, the media clip system can provide recommendations for adding content items to a media clip collection and/or a media clip library. To illustrate, in various implementations, the media clip system identifies one or more content items not associated with a content management system account of the user, such as content items within a web browser. For these content items, the media clip system can determine correlation scores by comparing them to contextual metadata from media clips in the media clip library or a media clip collection. Based on the correlation scores, the media clip system can provide a recommendation to add a content item to the media clip collection or the media clip collection. In particular, the media clip system can generate a media clip for a recommended content item and add the media clip to the media clip library associated with the user account.

The media clip system can also suggest adding content items to a media clip library for a user account based on media clips belonging to the media clip library of other user accounts. For example, in various implementations, the media clip system determines that two user accounts include the same content item within their respective media clip libraries. Accordingly, the media clip system can analyze media clips from the media clip library of one user account and recommend adding one or more of these media clips to the media clip library of the other user. In various implementations, the media clip system makes the recommendation based on comparing contextual metadata.

In some implementations, the media clip system improves search functionality for identifying content items stored in digital media clips within a media clip library of a user account. To illustrate, in various implementations, the media clip system identifies a set of content items based on a search query, which could include detecting a text string or a selection of a target media clip. In addition, the media clip system identifies implicit user preferences based on contextual metadata of media clips in the media clip library. Further, the media clip system generates a subset of content items by filtering the set of content items based on the implicit user preferences and presents the subset of content items in response to the search request.

The media clip system can also facilitate relatedness searches for new content items. For example, in one or more implementations, the media clip system receives a search query and a relatedness level indication, which can range from highly correlated to unrelated or uncorrelated. In addition, in some implementations, the media clip system tunes parameters of a media clip classification machine-learning model based on the relatedness level. Further, the media clip system utilizes the tuned media clip classification machine-learning model and the search query to identify content items that match the search query to the extent indicated by the relatedness level indication, as further described below.

In various implementations, the media clip system facilitates generating media clip collections from one or more digital media clips in a media clip library of a user account of the content management system. For example, the media clip system provides an interactive interface that displays digital media clips belonging to a user account along with tools to create media clip collections from the digital media clips. In various implementations, the content management system facilitates adding digital media clips and content items to media clip collections from other user accounts of the content management system and/or outside sources. Additionally, in some instances, the content management system determines and displays metadata for a media clip collection when showing the media clip collection.

In some implementations, in connection with generating a media clip collection, the media clip system can provide suggestions, recommendations, and insights for media clips added to a media clip collection. For instance, the content management system suggests similar media clips from a user account's media clip library or the media clip library of other user accounts. In some instances, the content management system provides insights, such as the background of a digital media clip and/or additional content item metadata discovered about the media clip.

In various implementations, the media clip system facilitates generating and utilizing various control lenses with media clip collections. For example, in one or more implementations, the content management system adds one or more control lenses that change the appearance and/or the access to a media clip collection without modifying the digital media clips within the media clip collection. Further, the content management system can apply different control lenses to different audiences. In this manner, the content management system is able to change how a media clip collection appears for one audience as well as who can access the media clip collection for another audience.

Additionally, in some implementations, the content management system generates stacked digital media clips. For instance, a stacked digital media clip can include multiple digital media clips that are bonded or joined in a defined presentation order. Indeed, when two or more digital media clips are stacked, the content management system displays each of the digital media clips together, at least partially, when presented within a media clip collection. In this manner, when one of the digital media clips in a stack is selected for display, each of the digital media clips in the stack is simultaneously displayed.

In some implementations, the content management system generates and provides several layout arrangements. For example, the content management system can provide a variety of layout arrangements ranging from rigid layouts to flexible arrangements. Examples of layout arrangements include a grid layout, a gallery layout, a timeline layout, and a freeform layout (e.g., canvas layout) among other layout arrangements.

As also mentioned above, the digital media clip system can provide several advantages over existing systems, particularly with regard to the accuracy, efficiency, and flexibility of implementing computer devices. To illustrate, the media clip system improves accuracy over existing systems by generating digital media clips that provide a more complete representation of a content item. Indeed, the media clip system generates and utilizes media clips that pair content items with contextual metadata (in addition to content metadata). By adding contextual information (e.g., web-based environment signals, application-based environment signals, and/or OS-based environment signals) to a content item within a media clip, the media clip system facilitates the improved organization and search accuracy as well as other functions among content items (i.e., media clip system).

In addition to improved accuracy, the digital media clip system can also improve efficiency relative to existing systems. For example, the media clip system improves efficiency with respect to collecting, managing, and utilizing media clips and media clip collections. In particular, in various implementations, the media clip system better organizes collections of media clips based on their contextual metadata (e.g., the intelligent arrangement of a media clip in collections), which can often provide better relationship signals among media clips than other information. As a result, the media clip system provides improved storage and retrieval of media clips, which reduces computing costs additional reduced resources usage. Indeed, in various implementations, the media clip system prevents the frequent duplication of content items and reduces resource usages compared to existing systems.

In various implementations, the media clip system improves efficiency by providing improved interactive interfaces (i.e., interactive graphical user interfaces). For example, the media clip system can provide various streamlined interactive interfaces that enable more efficient capture, search, and organization functions over existing systems. As a result, the media clip system reduces the number of navigational steps previously needed to save, search, utilize, and/or otherwise organize media clips.

Additionally, the media clip system can provide various interactive interfaces to assist in capturing content items as media clips. In some implementations, the media clip system provides an interactive interface for searching new or existing content items based on their contextual metadata. In one or more implementations, the media clip system provides an interactive interface for generating various media clip collections and/or modifying the organization or arrangement of a media clip collection. Moreover, the interactive interface allows for access to media clips without having to switch applications or navigate between different interfaces of an application. Indeed, in one or more implementations, the media clip system provides a floating interactive interface or browser extension that enables the quick and efficient search of a media clip as well as the ability to drag the media clip into an application without leaving the application.

As mentioned, the digital media clip system can also improve flexibility relative to existing systems. For example, the media clip system can generate, organize, and/or utilize media clips for content items across a large range of content item types. For instance, in various implementations, the media clip system facilitates a dynamically sized media clip collection that displays media clips from a wide variety of content item types. In contrast, most existing systems are limited to a single content item type or grouping of content item types.

In addition, the media clip system facilitates using and synchronizing media clips, media clip collections, and media clip libraries across different client device platforms as well as within web-based environments. Similarly, the media clip system can efficiently scale up based on the number of media clips, media clip collections, user accounts, and/or other growth factors.

As illustrated by the above discussion, the present disclosure utilizes a variety of terms to describe the features and advantages of the digital media clip system. Additional detail is now provided regarding the meanings of some of these terms. For instance, as used herein, the term "content item" refers to a discrete digital data representation of a document, file, image, or another data structure having digital content. In particular, a content item can include, but is not limited to, an electronic document (e.g., text file, spreadsheet, PDF, webpage, presentation, list, table, form, workspace, template, playlist, post, calendar item, email message, etc.), a digital image, a digital video, and/or electronic communication.

As used herein, the term "content metadata" refers to attributes, characteristics, and/or descriptions of a content item. In some embodiments, content metadata refers to data that is associated with a content item at the time of capturing the content item. For instance, prior to a user capturing a content item, the content item can be associated with metadata (e.g., tags, links, or other forms of data that describe aspects, attributes, characteristics, and/or descriptions of the content item. Examples of content metadata include a name, size, file, type, attributes, tags, creation date, or permissions of the content item. Content metadata can also vary based on content item type. For example, an image content item type may include content metadata such as resolution, image capture date, image capture location, pixel density, and file size while a text document may have other content metadata such as author, version data, keyword data, and number of pages. In one or more implementations, the media clip system gathers the content metadata from the content item source. In some implementations, the digital content management system determines, derives, or otherwise determines content metadata for a content item.

As used herein, the term "contextual metadata" refers to contextual information associated with a content item. In some embodiments, contextual metadata is data that is generated upon the media clip system capturing a content item, meaning for example, that contextual metadata is data that is not pre-associated with the content item prior to capture. In some implementations, contextual metadata includes metadata that is not pre-specified and not previously associated with the content item, and accordingly, in some examples, contextual metadata includes data that requires post-capture-processing to derive additional attributes, aspects, and properties of a content item not included within the content item metadata. For instance, the media clip system can process a content item to derive contextual metadata, processing such as natural language processing, image processing, or other post processing techniques. In addition, a content item is often located within one or more digital environments. Examples of digital environments include web-based environments, application-based environments, or operating system environments. Each digital environment can give produce contextual signals (or simply "signals") that reveal or indicate context information, such as a capture time, a capture location, current applications open, hidden windows, application version information, OS version information, etc. In addition, the term "content item metadata" refers to the combination of content metadata and contextual metadata for a content item.

The terms "media clip library" and "digital media clip library" refer to digital media clips associated with a user account. For example, each time a user account adds a digital media clip, the media clip system associated it with the media clip library of the user account. Additionally, the terms "media clip collection" and "digital media clip collection" refer to a group of digital media clips associated with one or more user accounts. For instance, the media clip system generates a media clip collection from one or more digital media clips in the media clip library of a user account. Further, when a digital media clip from a first user account is added to a media clip collection of a second user account, the media clip system can add the digital media clip to the media clip collection of a second user account as well as the media clip library of the second user account.

Further, as used herein, the term "control lens" refers to a filter, layer, or element that modifies access to and/or presentation of one or more digital media clips. As one example, a control lens added to a media clip collection changes the appearance of media clips in the media clip collection. As another example, another control lens added to a media clip collection restrict, limits, or modified how media clips in the media clip collection are interacted with or viewed. In various implementations, the media clip system adds metadata to a media clip collection that provides instructions for a control lens.

As used herein, the term "machine-learning model" refers to a computer model or computer representation that can be tuned (e.g., trained) based on inputs to approximate unknown functions. For instance, a machine-learning model can include, but is not limited to, a transformer model, a sequence-to-sequence model, a natural language processing (NLP) model, a neural network (e.g., a convolutional neural network or deep learning model), a decision tree (e.g., a gradient boosted decision tree), a linear regression model, a logistic regression model, a random forest model, a clustering model, association rule learning, inductive logic programming, support vector learning, Bayesian network, regression-based model, principal component analysis, or a combination thereof.

Additionally, as used herein, the term "neural network" refers to a machine learning system or algorithm that can be tuned (e.g., trained) based on training inputs to estimate an unknown function. In particular, a neural network can include a plurality of interconnected artificial neurons that transmit data to other artificial neurons that generate outputs based on one or more inputs. More specifically, the plurality of interconnected neurons can learn to estimate complex elements by utilizing prior estimations and other training data. For example, a neural network can include deep neural networks, convolutional neural networks ("CNN"), fully convolutional neural networks ("FCN"), or recurrent neural networks ("RNN"). In other words, a neural network is a system or algorithm that implements deep learning techniques that utilize a set of learned parameters arranged in layers according to a particular architecture to attempt to model high-level abstractions in data.

Additional detail regarding the digital media clip system is now provided with reference to the figures. For example, FIG. 1 illustrates a schematic diagram of a digital medium system environment 100 (or simply "environment 100") for implementing a digital media clip system 106 in accordance with one or more embodiments. As shown in FIG. 1, the environment 100 includes a client device 102 and a server device 108 connected via a network 116. Additional detail regarding these computing devices and networks is provided below in connection with FIGS. 24-25.

As mentioned, the environment 100 includes the server device 108. In some embodiments, the server device 108 comprises content servers and/or a data collection server. As shown, the server device 108 includes a content management system 110 having a digital media clip server system 112. The content management system 110 can organize, manage, and/or execute tasks associated with user accounts, cloud storage, file synchronization, data security/encryption, smart workspaces, etc. In one or more implementations, the content management system 110 facilitates generating, managing, storing, and/or utilizing media clips associated with accounts of users within the content management system 110 (i.e., a "user account").

In at least one embodiment, the content management system 110 organizes digital content (e.g., digital media clips and other content items such as user-generated documents and images) and stores changes made to the digital content in response to various user activities. For example, in response to a user generating a new content item using the client device 102, the content management system 110 on the server device 108 detects (via the network 116) and stores the content item and/or distributes the content item (or a placeholder of the content item) to other client device associated with the account of the user (or to shared user accounts). Additional detail regarding the content management system 110 is provided below with FIG. 25.

As shown, the content management system 110 includes the digital media clip server system 112. In one or more implementations, the digital media clip server system 112 supports and/or operates in connection with the media clip system 106 on the client device 102. For example, the digital media clip server system 112 provides instructions to the content management system application 104 on the client device 102 to implement one or more functions of the media clip system 106.

As shown in FIG. 1, the environment 100 includes the client device 102. The client device 102 can be one of a variety of computing devices, including a smartphone, tablet, mobile device, smart television, desktop computer, laptop computer, virtual reality device, augmented reality device, and/or another computing device as described with FIG. 25. For example, the client device 102 can be operated by users to perform various functions (e.g., via a content management system application 104) such as, but not limited to, creating, receiving, sorting, viewing, searching, identifying, modifying, and/or transmitting media clips, configuring user account or application settings of a content management system, and/or electronically communicating with other user accounts of a content management system. Although FIG. 1 illustrates a single client device, in some embodiments the environment 100 can include any number of similar client devices.

To access the functionalities of the content management system 110 (and the media clip system 106), users can interact with the content management system application 104 via the client device 102. The content management system application 104 can include one or more software applications installed on the client device 102. In some implementations, the content management system application 104 can include one or more software applications that are downloaded and installed on the client device 102 to include an implementation of the media clip system 106. In some embodiments, the content management system application 104 is hosted on the server device 108 and accessed by the client device 102 through a web browser and/or another online platform. Moreover, the content management system application 104 can include functionalities to access or modify a file structure stored locally on the client device 102 and/or hosted on the server device 108.

As just mentioned, in some embodiments, the client device 102 includes the media clip system 106 and a digital media clip metadata database 114 (or simply "metadata database 114"). In particular, as shown in FIG. 1, the client device 102 implements the media clip system 106 and the digital media clip metadata database 114 through the content management system application 104. In one or more implementations, the media clip system 106 generates captures, generates, organizes, and utilizes digital media clips. In some implementations, the media clip system 106 searches and recommends media clips based on contextual metadata of media clips. In various implementations, the media clip system 106 provides clips within a collection and/or digital canvas for viewing, editing, and/or performing other functions, as provided above. Additionally, in certain implementations, the media clip system 106 maintains some or all of a media clip at the digital media clip metadata database 114. For example, the media clip system 106 stores content metadata and/or contextual metadata on the digital media clip metadata database 114. In some implementations, the digital media clip metadata database 114 stores collections of media clips. Additional details regarding the media clip system 106 and the digital media clip metadata database 114 are provided below in subsequent figures.

In some implementations, the media clip system 106 and/or the digital media clip metadata database 114 is located on the client device 102 outside of the content management system application 104. While FIG. 1 illustrates the media clip system 106 being implemented by a particular component and/or device within the client device 102, in some embodiments, the media clip system 106 is implemented, in whole or part, by other computing devices and/or components in the environment 100. For example, as also shown, in some implementations, the media clip system 106 is implemented on the server device 108 within the content management system 110. More specifically, in some embodiments, some or all of the media clip system 106 is implemented by the server device 108 and accessed by the client device 102 through the content management system application 104, web browsers, and/or other online platforms (as described above).

Generating and Utilizing Digital Media Clips that Include Contextual Metadata

Figure 2:
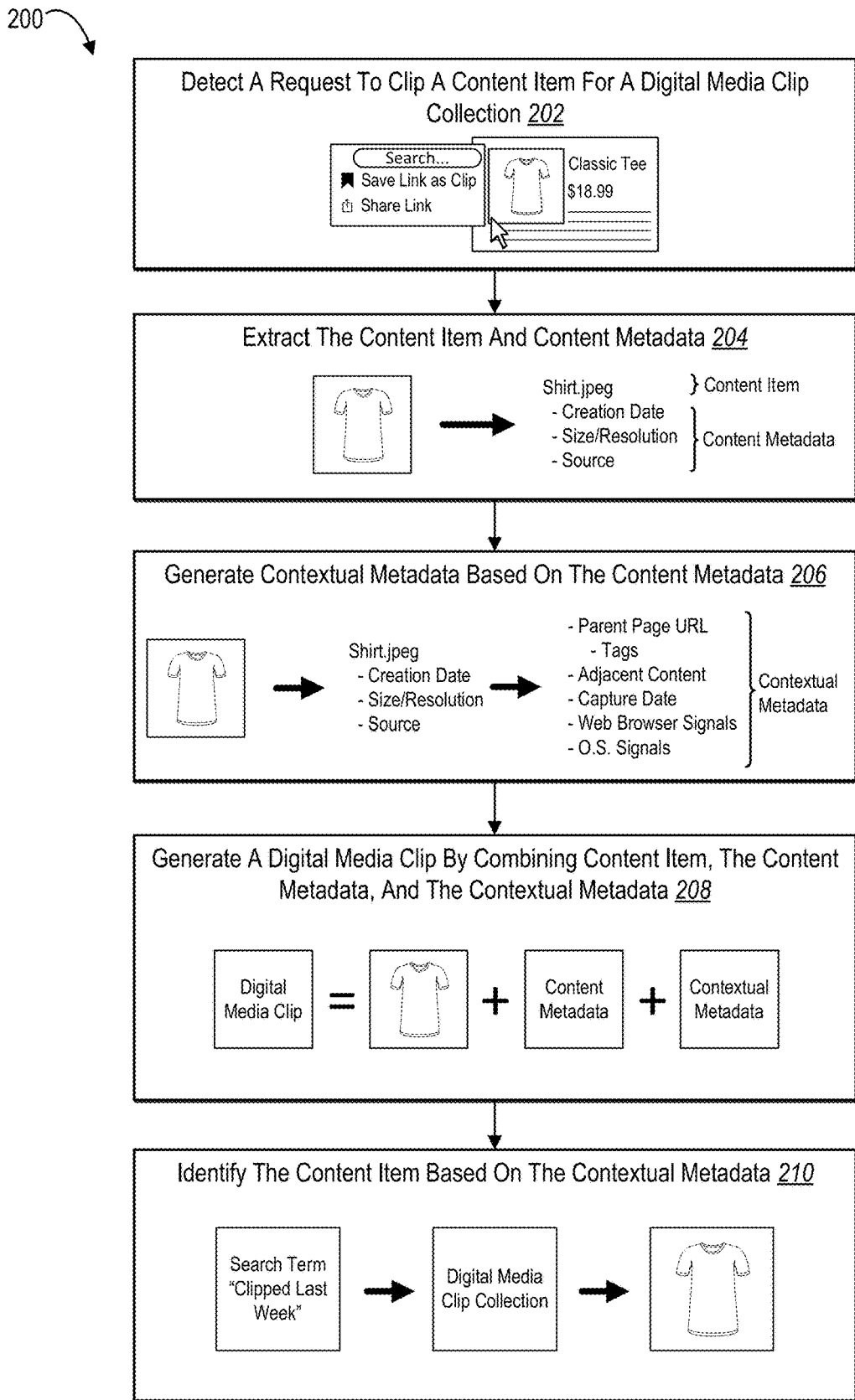
FIG. 2 illustrates an overview diagram of capturing, generating, and utilizing digital media clips in accordance with one or more embodiments.

As mentioned above, in various implementations, the media clip system 106 generates, organizes, and/or utilizes media clips. To illustrate, FIG. 2 shows an overview diagram of generating a media clip for a content item as well as subsequently identifying the content item based on corresponding contextual metadata. In particular, FIG. 2 includes a series of acts 200 performed by the media clip system 106 for generating media clips.

As shown in FIG. 2, the series of acts 200 includes an act 202 of detecting a request to clip a content item for a digital media clip library. For example, in certain implementations, the media clip system 106 detects a user interaction with an external content item. For instance, the media clip system 106 detects a request to "clip" (e.g., save) a content item and add it to a media clip collection (e.g., a set or grouping of one or more media clips associated with a user account of the content management system) and/or a media clip library of the user account. Additional detail regarding detecting requests to clip a content item is provided below in connection with FIGS. 4A-4C and 5A-5B.

The series of acts 200 also includes an act 204 of extracting the content item and content metadata. For instance, in certain implementations, the media clip system 106 saves, copies, records, captures, and/or screenshots a content item. In various implementations, the media clip system 106 determines how to capture the content item based on the content item type. Additionally, in various implementations, the media clip system 106 extracts content metadata for the content item (e.g., attributes, characteristics, and descriptions about a content item). Additional detail regarding extracting the content item and content metadata is provided below in connection with FIGS. 3 and 4A-4C.

As shown in FIG. 2, the series of acts 200 includes an act 206 of generating contextual metadata based on the content metadata. For example, in one or more implementations, the media clip system 106 utilizes the content metadata to discover information regarding the environment in which the content item resides. In some implementations, the act includes generating the contextual metadata for the content item based on contextual signals from one or more digital environments in which the content item is located (e.g., with or without the content metadata). Additional detail regarding generating contextual metadata is provided below in connection with FIGS. 3, 4A-4C, and 8.

Further, the series of acts 200 includes an act 208 of generating a digital media clip by combing the content item, the content metadata, and the contextual metadata. For example, in various implementations, the media clip system 106 groups the captured content item with its corresponding content metadata as well as the generated contextual metadata. In some implementations, the media clip system 106 associates the content item, which can be stored in a file system, with the content metadata and contextual metadata, which is stored in a metadata database to generate a media clip, which can be represented in a media clip collection. Additional detail regarding generating media clips is provided below in connection with FIGS. 3 and 6A-6B below.

As also shown in FIG. 2, the series of acts 200 includes an act 210 of identifying the content item based on the contextual metadata. For instance, in one or more implementations, the media clip system 106 detects user input within an interactive interface searching for content items based on contextual metadata. For example, the media clip system 106 receives a search query of "clipped last week" or another environment signal along with a search term. In response, the media clip system 106 can identify matching contextual metadata. Further, the media clip system 106 returns the content item corresponding to the identified contextual metadata. Additional detail regarding searching for and identifying content items based on contextual metadata is provided below in connection with FIG. 7.

Figure 3:
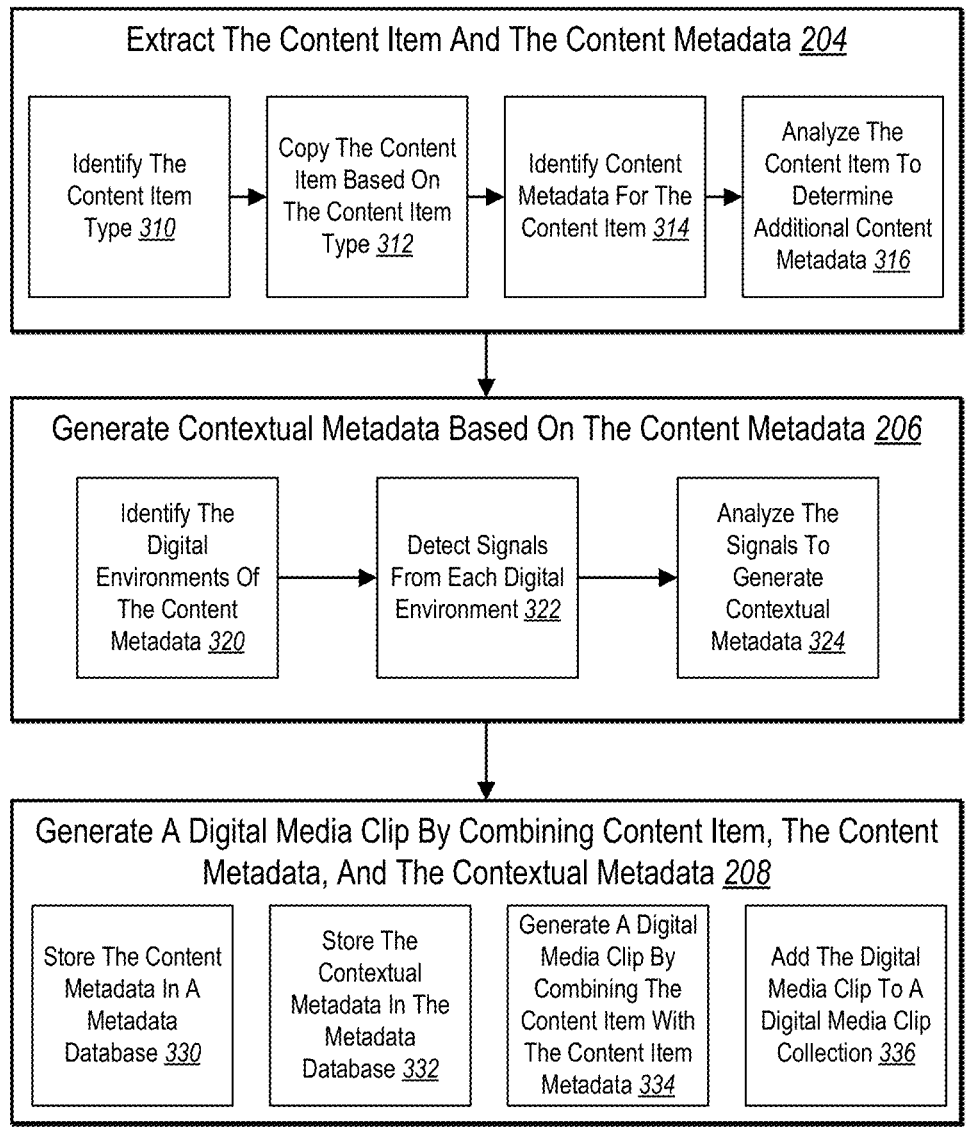
FIG. 3 illustrates a diagram of extracting content metadata for a content item, generating contextual metadata, and generating digital media clips in accordance with one or more embodiments.

Turning to the next figure, FIG. 3 illustrates a diagram of extracting content metadata for a content item, generating contextual metadata, and generating digital media clips in accordance with one or more embodiments. In particular, FIG. 3 expands the acts 208-208 from the series of acts 200 shown in FIG. 2. Indeed, each of the acts in FIG. 3 include multiple sub-acts.

To illustrate, FIG. 3 includes the act 204 of extracting the content item and content metadata. As shown, the act 204 includes a sub-act 310 of identifying the content item type. For instance, in various implementations, the media clip system 106 determines the data structure, media type, protocol, and/or file type of a content item. For example, the media clip system 106 determines that the content item is an image, a text string, a video, an animation, a social media post, a token (e.g., a non-fungible token or NFT), an XML file, a document, an application file, a screenshot, an audio segment, or another content item type.

In various implementations, the media clip system 106 detects the content item type from a file extension of a content item. For instance, if the content item is located natively on a client device, the media clip system 106 identifies the file extension type. If the content item is web-based, the media clip system 106 can identify the file extension type from a network source. In some implementations, such as if the file type is unknown, the media clip system 106 analyzes images, texts, and/or audio from the content item utilizing a trained machine-learning model and/or neural network to determine the content item type.

As shown, the act 204 includes a sub-act 312 of copying the content item based on the content item type. For instance, the media clip system 106 can utilize a set of heuristics to determine how to capture a content item. For example, the media clip system 106 utilizes a first set of rules or actions for capturing images and a second set of rules or actions for capturing text. In some implementations, the media clip system 106 enables a new set of capture tools based on the content item type. To illustrate, for a live video, the media clip system 106 provides a capture tool to save the last 30 seconds (or another length) of the video (and, in some instances, the entire live video user interface) while the media clip system 106 can capture all or a selected portion of prerecorded videos. Indeed, the media clip system 106 can continually add new heuristics to capture new content item types. In this manner, the media clip system 106 enables the capture of many types of content items not able to be captured by existing systems.

Additionally, in some implementations, the media clip system 106 can capture content items based on the location of the content item. For example, for web-based content items (e.g., links, images, media, etc.), the media clip system 106 copies a link to the content item and/or downloads the content item from its network source. For locally stored or captured items, the media clip system 106 copies the content item locally or generates a placeholder (e.g., an alias or shortcut) to the content item.

In various implementations, the media clip system 106 stores a captured content item. For example, the media clip system 106 stores the captured content item in a file structure associated with a user account. In some implementations, the media clip system 106 stores the captured content item in a media graph (e.g., a data structure not visible to a client device user with the file structure). In some implementations, the media clip system 106 copies and/or synchronizes the captured content item to a network storage device and locally stores a link to the remotely stored content item.

As shown, the act 204 includes a sub-act 314 of the media clip system 106 identifying content metadata for the content item. For instance, in one or more implementations, the media clip system 106 identifies a set of metadata attributes stored with the content item. In some instances, the media clip system 106 detects and captures a metadata file or data structure linked to the content item.

In some implementations, the media clip system 106 determines which attributes and/or characteristics of the content item (e.g., the content metadata) to capture based on the content item type. For instance, each content item type can be associated with a list of content metadata for a corresponding content item. For example, for an image content item type, the media clip system 106 seeks to obtain image attributes such as image size, resolution, dimensions, color model, etc. Then, for a text content item type, the media clip system 106 seeks to obtain text attributes such as font type, font size, font styles, etc.

In one or more implementations, the media clip system 106 stores the content metadata in a metadata database (i.e., digital media clip metadata database). For example, the media clip system 106 maintains a metadata database (e.g., locally or remotely) that is indexed to content items and includes entries for the content metadata corresponding to each content item. In some implementations, the metadata database can also include a copy of the content item. In various implementations, the media clip system 106 stores the content metadata with the content item.

As shown, the act 204 includes a sub-act 316 of the media clip system 106 analyzing the content item to determine additional content metadata. For instance, in various implementations, the media clip system 106 utilizes an attribute detection model, an attribute detection machine-learning model, and/or an attribute detection neural network to determine one or more attributes and/or characteristics of a content item. For example, for an image, the media clip system 106 can determine a color theme, a color palette, or prominent colors found in the pictures and save this information as content metadata. As another example, the media clip system 106 can detect text and/or objects in an image and include that information as content metadata.

As another example, the media clip system 106 can provide the text of a content item to an attribute detection model to discover characteristics and attributes about the text. For instance, the attribute detection model determines word patterns, word or sentence statistics, keywords, statistical phrases, etc., from analyzing a text content item. Indeed, for different content items and/or content item types, the attribute detection model can determine additional attributes and add this information to the content metadata of the content item.

FIG. 3 also includes the act 206 of the media clip system 106 generating contextual metadata based on the content metadata. As shown, the act 206 includes a sub-act 320 of identifying the digital environments of the content metadata. For instance, in connection with capturing the content item and/or the content metadata, the media clip system 106 can identify one or more digital environments in which the content item resides. As noted above, examples of digital environments include web-based environments, application-based environments, and OS environments. In many instances, a digital environment is located within another digital environment (e.g., an application-based environment is nested within an OS environment).

In some implementations, the media clip system 106 detects multiple digital environments of the same type. For example, while the media clip system 106 detects a single OS environment, the media clip system 106 also detects multiple application-based environments that correspond to multiple applications being open and/or in use on the client device. Additionally, in example implementations, the media clip system 106 detects that the content item resides within a web browser or a web-based environment.

As shown, the act 206 includes a sub-act 322 of detecting signals (i.e., contextual signals) from the digital environments. For instance, upon identifying the various digital environments, the media clip system 106 may analyze the digital environments to further identify contextual signals from each of the digital environments. As used herein, the term "environment signals" (or simply "signals") refers to actions, processes, attributes, or states of a digital environment. For example, a signal can indicate a digital environment version (e.g., the OS version or web browser version), whether a given digital environment is active or implemented (e.g., in the case of an application-based environment), or a hardware profile of a client device. In addition, a signal can indicate the current state of a digital environment, such as running processes, open applications, recently established network connections (e.g., webpages recently loaded), open web-browser tabs, and recently accessed documents.

To further illustrate, in several implementations, the sub-act 322 includes media clip system 106 detecting OS signals corresponding to the current date and time when a content item is captured. In addition, the media clip system 106 can detect web-based signals corresponding to one or more network sources that are being assessed around the same time with a web-based content item. Further, the media clip system 106 can detect application-based signals corresponding to open applications. In this manner, the media clip system 106 can detect signals from one or more of the digital environments at the time of clipping a content item.

As also shown, the act 206 includes a sub-act 324 of analyzing the signals to generate contextual metadata. To illustrate, the media clip system 106 generates contextual metadata by collecting, extracting, identifying, analyzing, and/or copying contextual signals, which enables the media clip system 106 to encapsulate the digital environments of a content item at the time it was clipped. Indeed, the media clip system 106 detects, identifies, and/or generates contextual metadata such that the media clip system 106 can predict (e.g., via a machine-learning model trained of environment signals or another model) the current objective of the content (e.g., for what purpose is a user viewing, utilizing, and/or saving the content item).

To illustrate, in some implementations, based on detecting signals from one or more application-based environments, the media clip system 106 analyzes the signals to determine applications that are currently open on the client device, whether the application is visible or hidden, whether the content item is located in an application, the size and locations of open application interfaces on a virtual desktop of the client device, and/or whether an application is currently being utilized by one or more users on the client device. In some implementations, the media clip system 106 analyzes a signal from an application-based environment to determine whether an application is accessing files (e.g., has files open) as well as the subject matter of the open files.

In one or more implementations, based on detecting and analyzing signals from a web-based environment, the media clip system 106 determines network-based context information of the content item. For instance, the media clip system 106 identifies links to various content sources that were accessed (e.g., requested by an HTTP call and/or downloaded) around the time a content item was accessed. In addition, the media clip system 106 identifies other elements within a proximity to a content item (e.g., text, images, audio, video, along with their source links) and/or links associated with open (or saved) tabs and windows.

In example implementations, the media clip system 106 can determine that content items that share a border with a target content item are proximate to the target content item. In example implementations, the media clip system 106 determines that a target content item nested within a parent content item and/or all content items within the parent content item are proximate to the target content item. In one or more implementations, the media clip system 106 determines content items within the same webpage of a target content item are proximate to the target content item. In some implementations, all content items within a threshold amount (e.g., number of pixels, set distance, screen percentage, etc.) are proximate to the target content item.

Additionally, in various implementations, the content management system 110 generates contextual metadata based on multiple environment signals (i.e., contextual signals). For example, the content management system 110 generates a contextual metadata element that combines one or more signals from two or more different digital environments. For instance, the content management system 110 combines one or more OS-based signals with one or more web-based signals and/or one or more application-based signals. In this manner, the content management system 110 determines contextual metadata that distinctively captures the environment in which a content item resides, which the content management system 110 can later use for media clips searches or providing media clip suggestions.

The media clip system 106 can store information from a signal as contextual metadata for a content item (e.g., within the metadata database). In some implementations, the media clip system 106 processes one or more environment signals from a digital environment to generate contextual data, as noted above. For example, upon identifying the date and time signal from the OS environment or a web-based environment, the media clip system 106 generates a capture date and a capture time as part of the contextual metadata for the content item. Similarly, the media clip system 106 stores the capture source of a content item and/or information regarding the capture source based on analyzing the environment signals, as described above.

FIG. 3 also includes the act 208 of the media clip system 106 generating a digital media clip by combing the content item, the content metadata, and the contextual metadata. As shown, the act 208 includes a sub-act 330 of storing the content metadata in a metadata database (i.e., a digital media clip metadata database). As provided above, in various implementations, the media clip system 106 maintains a metadata database that stores and/or links to content metadata for a content item.

As shown, the act 208 includes a sub-act 332 of the media clip system 106 storing the contextual metadata in the metadata database. For instance, the media clip system 106 also stores the contextual metadata in the metadata in connection with the content metadata for a content item in the metadata database. In some implementations, the media clip system 106 generates content item metadata for a content item by combining the content metadata and the contextual metadata (e.g., also known as content item metadata) in the metadata database.

As also shown, the act 208 includes a sub-act 334 of the media clip system 106 generating a digital media clip by combining the content item with the content item metadata (e.g., content metadata and contextual metadata). For example, in some implementations, the media clip system 106 generates a media clip that links a content item stored at a first location with its content item metadata (e.g., content metadata and contextual metadata) stored at a second location, such that when selected, the content item appears as a unified file. In alternative implementations, the media clip system 106 generates and/or stores a new file that combines a content item with its content item metadata.

As further shown, the act 208 includes a sub-act 336 of the media clip system 106 adding the digital media clip to a digital media clip library. For instance, in various implementations, the media clip system 106 generates a media clip and stores it in a media clip library of the user account. In some implementations, the media clip system 106 also adds to links the media clip to a media clip collection. Additionally, in some instances, when displaying the media clip (e.g., by itself or within a media clip collection), the media clip system 106 shows the content item along with some or all of its content item metadata (e.g., accessed from the metadata database or another locating that stores the content item metadata for the content item). An example of displaying a media clip with some metadata elements is shown in FIG. 17C.

Figure 4A:
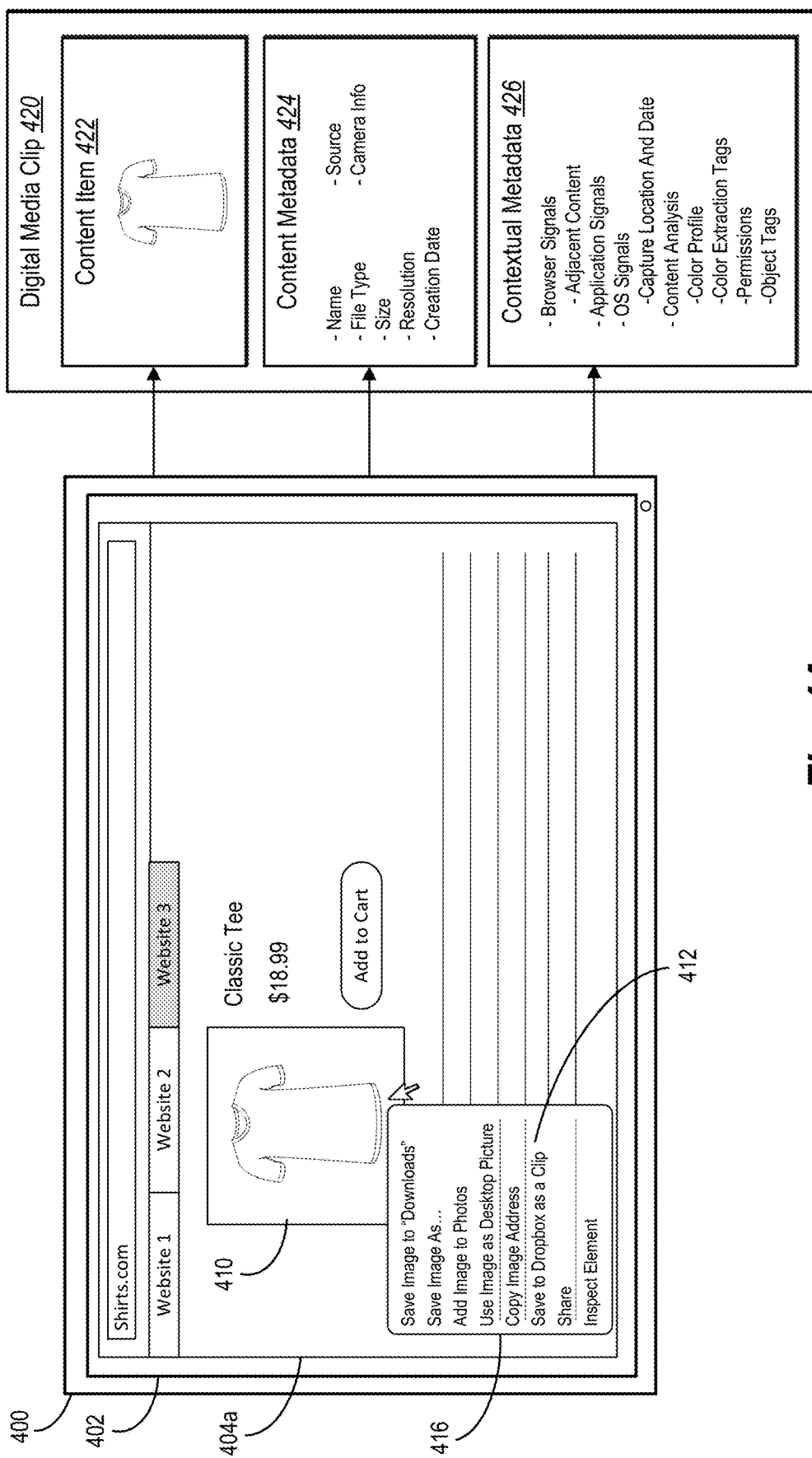
FIGS. 4A-4C illustrate generating digital media clips based on different content item types in accordance with one or more embodiments.
Figure 4B:
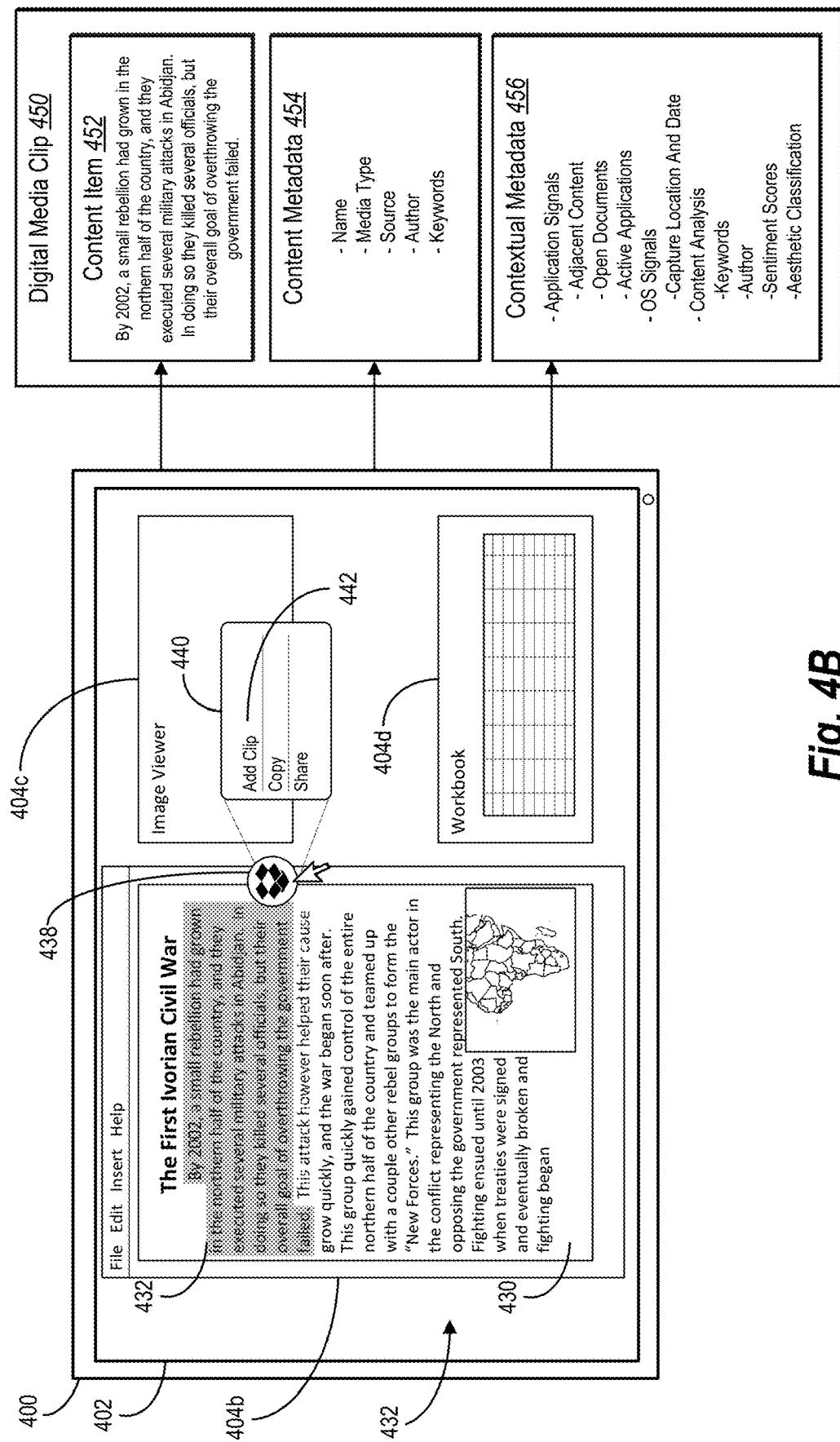
Figure 4C:
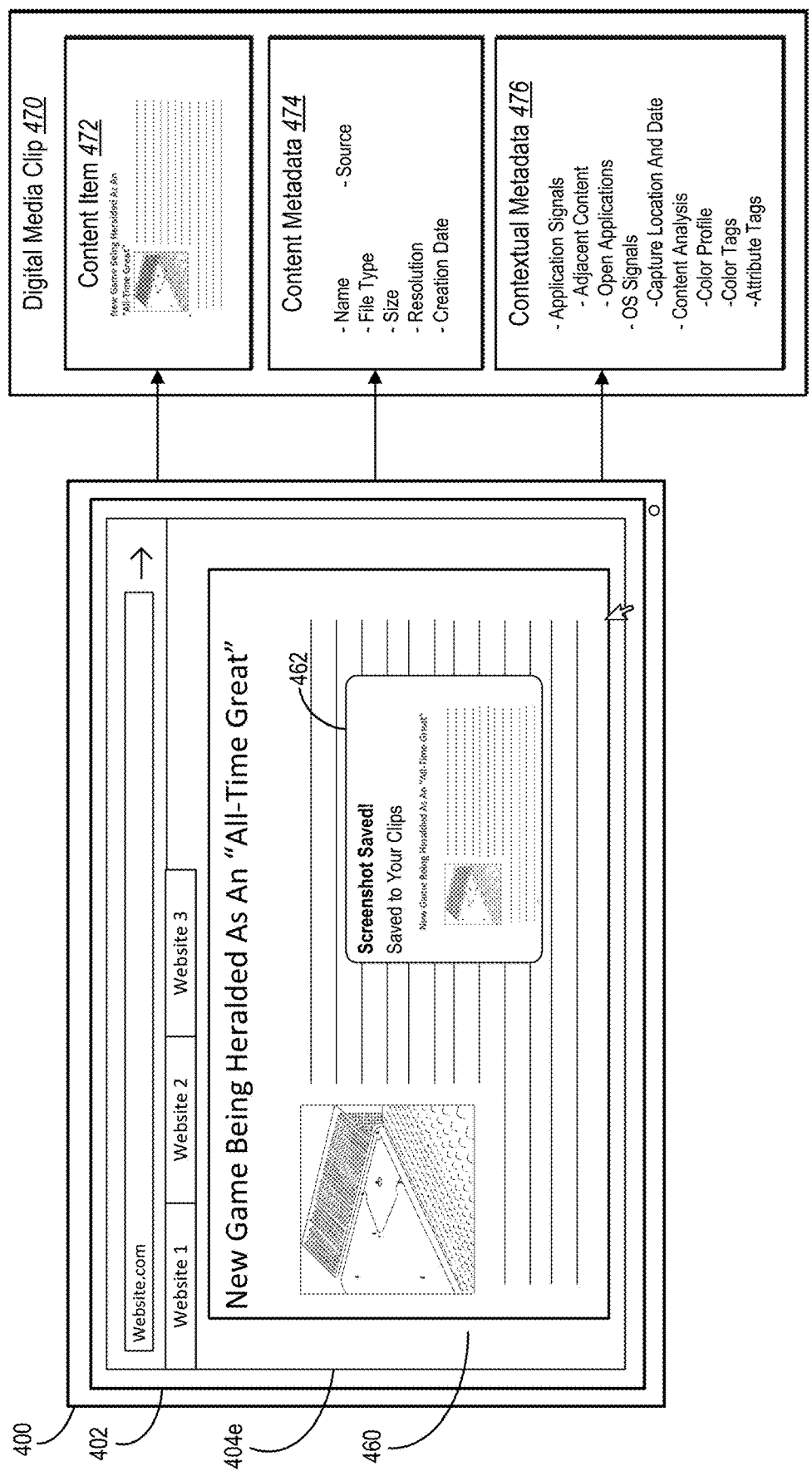

FIGS. 4A-4C show graphical user interfaces (GUIs) of the media clip system 106 generating media clips. In particular, FIGS. 4A-4C illustrate generating digital media clips based on different content item types in accordance with one or more embodiments. For context, FIGS. 4A-4C include a client device 400 having a graphical user interface 402 for displaying visual and graphical components and elements (e.g., a computer display). In some implementations, the client device 400 is a representation of the client device 102 introduced above in connection with FIG. 1.

As shown in FIG. 4A, the graphical user interface 402 includes a first application 404a that displays a first content item 410 (e.g., an image of a shirt). For example, the first application 404a is a web browser that displays images, text, audio, video, and other network-based digital content. As shown, the first application 404a includes various tabs and shows an opened tab that includes the first content item 410 along with corresponding texts and elements.

As also shown, the graphical user interface 402 includes a first menu 416 that includes a selectable clipping element 412 for generating a media clip from a content item. For instance, in various implementations, upon detecting a selection of the first content item 410 (e.g., a right-mouse click or its equivalent), the client device and/or media clip system 106 displays the first menu 416, which includes the selectable clipping element 412. As provided below, the media clip system 106 can provide the selectable clipping element 412 (or an equivalent option) via alternative menus or elements.

Based on detecting selection of the selectable clipping element 412, the media clip system 106 can generate a first digital media clip 420 of the first content item 410. As shown, the media clip system 106 links to, extracts, and/or copies the first content item 410 to the first digital media clip 420 (e.g., the content item 422 represents a copy of the first content item 410). In some implementations, the media clip system 106 identifies content metadata 424 as well as determines contextual metadata 426 for the content item, as provided above.

To illustrate, regarding the content metadata 424, the media clip system 106 gathers content metadata 424 associated with the first content item 410. For example, the media clip system 106 identifies image attributes and characteristics associated with the first content item 410. As shown, the content metadata 424 includes a list of example content metadata elements. In particular, some of the content metadata elements are general to content items (e.g., name, file type, size) while other content metadata elements are specific to the content item type (e.g., resolution, camera information).

With respect to the contextual metadata 426, the media clip system 106 generates the contextual metadata 426 from the digital environments around the first content item 410 and/or the content metadata 424. For example, as shown, the media clip system 106 detects browser signals (e.g., web-based signals), application signals (e.g., application-based signals), and OS signals. In particular, as shown, the media clip system 106 determines adjacent content from the browser signals, such as content or content items within a proximity distance to the first content item 410 and/or on the same webpage as the first content item 410. For example, the media clip system 106 identifies the content item title, price, availability option (e.g., "Add to Cart"), product information, product text summary, other products near the first content item 410, etc., as elements of the contextual metadata 426. In some implementations, the adjacent content corresponds to content and content items in other open tabs within the first application 404a.

In some implementations, the browser signals provide information about the webpage that is not directly tied to the first content item 410. For example, the browser signals indicate the author of the website, whether the website belongs to an entity (e.g., a person or a company), when the website was last updated, reading time of the website if text is present, embedded tags or search terms, etc. Indeed, the browser signals can enable the media clip system 106 to generate a semantic understanding of the webpage and/or adjacent webpages at the time the content item is clipped.

Additionally, the contextual metadata 426 also shows the media clip system 106 determining contextual metadata from the OS signals. For example, upon capturing the first content item 410, the content management system 110 identifies the server source as well as the date and time of capturing the content item. In some implementations, the media clip system 106 utilizes a content management system application to detect OS signals at the time of content item capture (in connection with a web-based plugin that captures the browser signals).

Furthermore, the media clip system 106 can perform a content analysis, as shown in FIG. 4A, to determine additional contextual metadata 426. In some implementations, the media clip system 106 analyzes a content item to determine one or more contextual metadata 426 elements. For example, the media clip system 106 utilizes a color detection model to determine the color profile of the first content item 410. The media clip system 106 can add this determined contextual metadata as a new element of the contextual metadata 426 or replace existing content metadata elements. In one or more embodiments, the media clip system 106 can use the determined color profile to generate color extraction tags as indicated in the contextual metadata shown in FIG. 4A. Additional examples of contextual metadata 426 that can be generated from content item analysis include permissions, object tags, interest scores, and other data generated from an analysis of the content item.

As described above, in various implementations, the media clip system 106 generates the first digital media clip 420 by combining or otherwise associating the content item 422 with the content metadata 424 and the contextual metadata 426, as shown. In this manner, the first digital media clip 420 not only provides the content item 422 along with content metadata 424 for the content item 422, but the first digital media clip 420 also provides contextual metadata 426 about the digital environments where the content item 422 was captured, as provided above.

FIG. 4B shows the graphical user interface 402 including a second application 404b that displays a second content item 432 (e.g., a highlighted portion of text from a larger section of text). In particular, the second application 404b is a document editor located on the client device 400 that displays a document 430, which includes the second content item 432. As also shown, the graphical user interface 402 includes a third application 404c, and a fourth application 404d. For example, the third application 404c is an image viewer/editor application and the fourth application 404d is a workbook application. While not shown, the graphical user interface 402 can include additional applications including duplicates of the same application (e.g., multiple document editor or image viewer applications).

In addition, the graphical user interface 402 in FIG. 4B includes a content item element 438. In some instances, the content item element 438 selectively appears in connection with the document 430 and/or the second application 404b. In one or more implementations, the content item element 438 is part of an application running on the client device 400, such as an application associated with a content management system.

As shown, the content management system 110 can detect a selection of the content item element 438, such as a click, hover, gesture, or another action. Upon detecting the selection of the content item element 438, the graphical user interface 402 can update to show a second menu 440 that includes a selectable clipping element 442 for generating a media clip from a content item. Further, based on detecting a further selection of the selectable clipping element 442, the media clip system 106 can generate a second digital media clip 450 of the second content item 432.

To illustrate, the media clip system 106 copies (or otherwise extracts) the second content item 432 as a content item 452. As shown, the media clip system 106 copies the highlighted text in the document 430 as the content item 452 of the second digital media clip 450. Additionally, the media clip system 106 can also identify and/or generate content metadata 454 and contextual metadata 456, as described above. In particular, the content metadata 454 can include general metadata attributes corresponding to multiple types of content items as well as more specific metadata attributes corresponding to the content item type of the content item 452. For example, content metadata 454 associated with the selected text can include a name, media type, source (e.g., URL or file location), as illustrated in FIG. 4B.

In one or more embodiments, the media clip system 106 the document 430 is a webpage within a web browser and the document 432 is a web document, i.e., a webpage. In such an example, the media clip system 106 can clip a portion of the webpage (as illustrated in FIG. 4A) or the media clip system 106 can clip the entire webpage or website. In other examples, the media clip system 106 can allow a user to select an image or other content element within the webpage. The features and functions described herein with respect to the selected text can be applied in a similar manner when the media clip system 106 saves the webpage, the website, or other elements within the website.

As mentioned, in various implementations, the media clip system 106 generates the contextual metadata 456. As shown in FIG. 4B, the media clip system 106 detects application signals (e.g., application-based signals) and OS signals. In particular, as shown, the media clip system 106 determines adjacent content from the application signals, such as elements and/or content items within a proximity of the second content item 432. For example, the media clip system 106 adds the title of the document 430 and text surrounding the second content item 432 as contextual metadata 456, which allows the second content item 432 to be considered in its original and intended context.

Additionally, the media clip system 106 analyzes the application signals to determine open documents and/or active applications. For example, in various implementations, the media clip system 106 detects if the document 430 is connected to other opened documents (e.g., tabs) within the second application 404b. Further, in some implementations, the media clip system 106 identifies other active applications (e.g., applications open, visible, and/or active at or around the time the second digital media clip 450 is requested) such as the third application 404c, and the second application 404b. As noted above, in a number of implementations, the media clip system 106 can utilize the application signals to determine further actions and/or intentions of a user with respect to the second content item 432 and/or other potential media clips.

Furthermore, in one or more embodiments the media clip system 106 can generate the content metadata 454 based on analyzing the captured text. For example, and as illustrated in FIG. 4B, the media clip system 106 can analyze the text to determine an author, extract keywords, and generate keyword tags. In addition, and as further shown in FIG. 4A, the media clip system 106 can analyze the text (e.g., using an ML or classification model) to determine a sentiment score associated with the text (e.g., positive, negative, neutral) and/or an aesthetic classification (e.g., formats, fonts, art styles, etc.).

FIG. 4C shows the graphical user interface 402 including a fifth application 404e that displays a third content item 460 (e.g., a website that includes an image and text). For instance, the fifth application 404e is a web browser located on the client device 400 that displays a webpage. In alternative implementations, the fifth application 404e is another application type, such as a document editor, image viewer, video player, etc.

As shown, the media clip system 106 facilitates generating a digital media clip 470 based on capturing a screenshot 462 of the third content item 460. For example, in various implementations, the media clip system 106 provides tools for capturing a screenshot image and generating a media clip from the image. Indeed, in one or more implementations, the media clip system 106 provides a menu that includes a selectable clipping element for capturing and storing a screenshot. In example implementations, upon detecting a screenshot, the media clip system 106 can prompt the user to generate a media clip from the screenshot.

As shown, the media clip system 106 generates a digital media clip 470 having a content item 472, content metadata 474, and contextual metadata 476. In various implementations, the media clip system 106 identifies and/or gathers elements of the content metadata 474, as noted above. In some implementations, the media clip system 106 analyzes the content item 472 to determine missing and/or additional content metadata. For instance, because a screenshot of a content item is often a newly created image, some of the content metadata 474 may be absent. In these instances, the media clip system 106 can analyze the content item to identify additional corresponding content metadata 474, as provided above. In some implementations, the media clip system 106 tries to complete a list of content metadata elements that have initial null values when the content item is a screenshot.

In some implementations, when capturing a screenshot, the media clip system 106 can identify elements of the content metadata 474 based on analyzing corresponding content items identified in the screenshot. For example, in one or more implementations, the media clip system 106 identifies an image in the screenshot and locates the corresponding image within the graphical user interface 402 of the client device 400. Then, the media clip system 106 identifies and adds one or more content metadata elements to the content metadata 474 of the digital media clip 470. Similarly, the media clip system 106 can analyze captured text and/or corresponding text to identify additional corresponding content metadata 474 for the content item 472.

As discussed above, the media clip system 106 can generate the contextual metadata 476. For example, the media clip system 106 identifies and analyzes contextual signals for one or more digital environments on the client device 400 to generate the contextual metadata 476 for the content item 472. For example, as shown, the media clip system 106 determines adjacent content items to the content found in the screenshot as well as open applications.

Indeed, as shown in FIG. 4A-4C, the media clip system 106 can generate media clips for a wide range of content item types. Additionally, the media clip system 106 can also identify and/or generate content metadata and contextual metadata for a captured content item. In some instances, the media clip system 106 identifies and/or determines different content metadata elements based on a content item type and detected environment signal. Further, the media clip system 106 can follow the framework to generate media clips, which includes adding content metadata and contextual metadata, based on content item type for types of content items not shown in FIGS. 4A-4C.

Figure 5A:
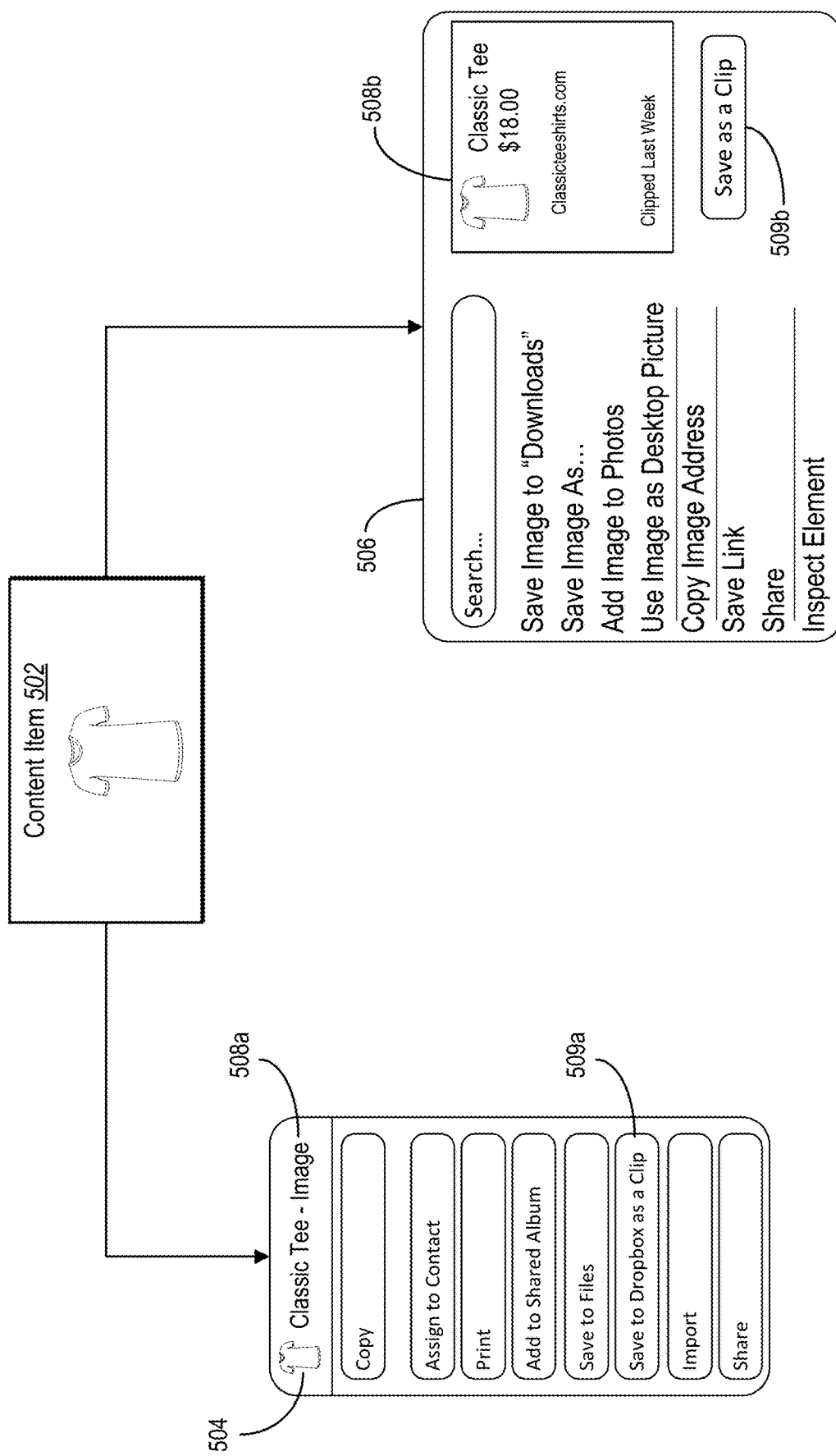
FIGS. 5A-5B illustrate various interactive interfaces for capturing digital media clips in accordance with one or more embodiments.
Figure 5B:
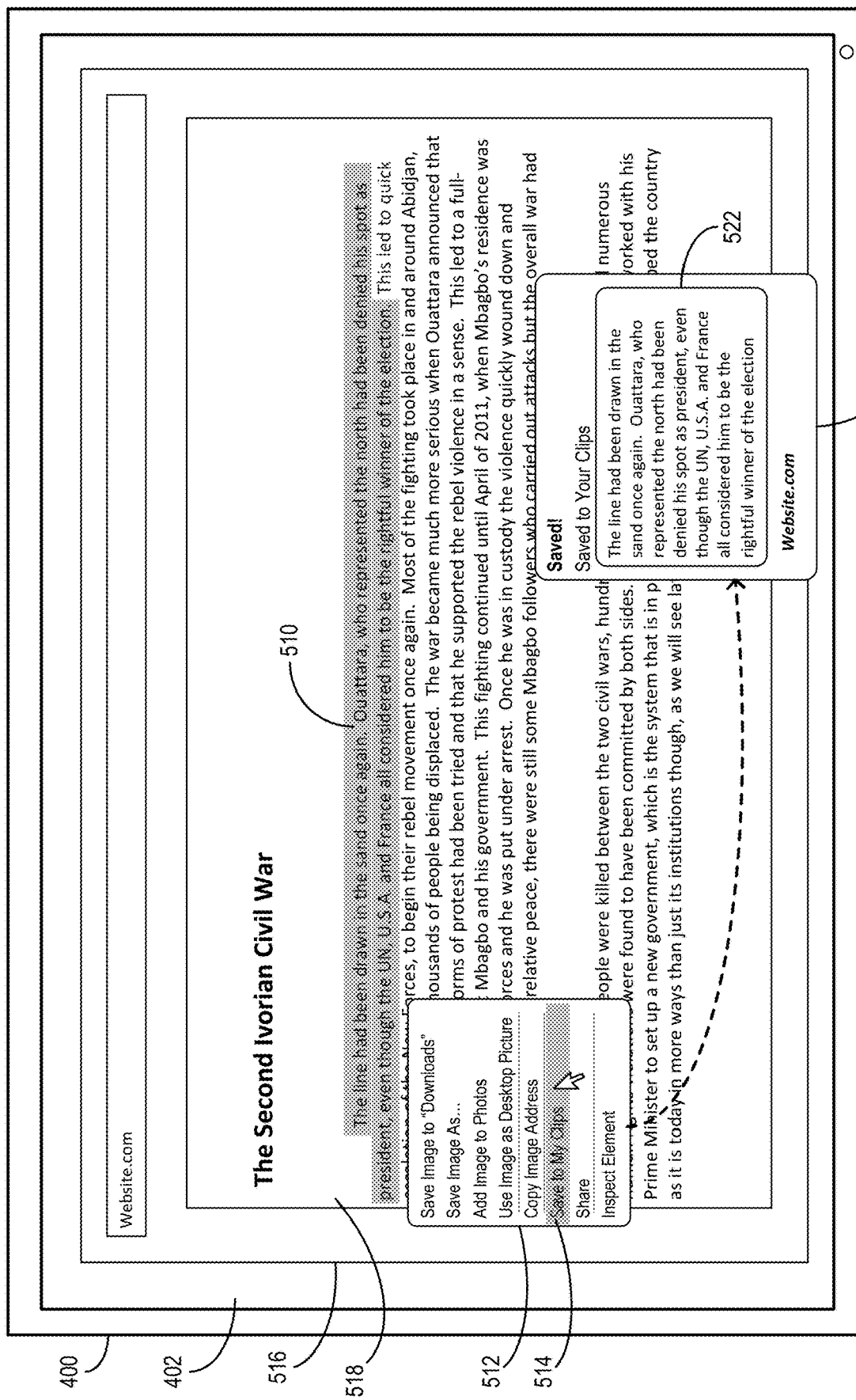

Turning to the next set of figures, FIGS. 5A-5B illustrate various interactive interfaces for capturing digital media clips in accordance with one or more embodiments. To illustrate, FIG. 5A includes a content item 502, a first interactive interface 504, and a second interactive interface 506. Upon detecting an interaction with the content item 502, such as on a client device, the media clip system 106 can cause the first interactive interface 504, the second interactive interface 506, or another interactive interface to display. In some implementations, the media clip system 106 causes the first interactive interface 504 to be displayed if the client device is a mobile device or has a smaller, compact display (e.g., a smartphone or mini mobile device) and the second interactive interface 506 to be displayed for client devices with larger displays (e.g., a laptop or desktop).

To illustrate, in one or more implementations, a client device displays the first interactive interface 504. As shown, the first interactive interface 504 can be a menu that includes a first media clip preview 508a of the content item 502 and a first selectable clipping element 509a. In some implementations, the first media clip preview 508a includes a limited preview to accommodate smaller screens. For example, the first media clip preview 508a includes a small image, title, and content item type (e.g., "image") of the content item 502.

In various implementations, a client device displays the second interactive interface 506. As shown, the second interactive interface 506 includes a second media clip preview 508b of the content item 502 and a second selectable clipping element 509b. As also shown, the second media clip preview 508b includes an image of the content item 502 along with corresponding information. In one or more implementations, the media clip system 106 adds content metadata to the second media clip preview 508b. Additionally, or in the alternative, the media clip system 106 adds contextual metadata to the second media clip preview 508b. Indeed, in certain implementations, the media clip system 106 begins identifying and displaying content metadata and/or contextual metadata before a user confirmation is received to generate a media clip for the content item.

In example implementations, the second interactive interface 506 can include additional tools and features. For example, in some implementations, the media clip system 106 includes tools to search a media clip library of the user account (locally or remotely stored) and/or other content items within a client device. In some implementations, the second interactive interface 506 includes an additional area for user notes or comments that the media clip system 106 adds as contextual metadata when generating a media clip for the content item 502.

FIG. 5B shows the client device 400 having the graphical user interface 402, as introduced above. As shown, the graphical user interface 402 in FIG. 5B includes an application 516 displaying a webpage 518 having text, where a portion of the text is within the webpage 518 is selected as a content item 510. While the application 516 corresponds to a web browser displaying a webpage 518, the application 516 can correspond to other types of applications provided herein.

In response to detecting an interaction with the content item 510 (e.g., highlighting text, selecting the highlighted text, and/or opening a pop-up menu), in one or more implementations, the media clip system 106 displays an interactive interface 512, such as a content item menu having a selectable clipping element 514. In various implementations, the media clip system 106 provides the selectable clipping element 514 in a different and/or additional selection menu (e.g., a menu accessed from a toolbar), as part of an application, or in response to detecting a shortcut key being triggered.

Additionally, upon detecting the selection of the selectable clipping element 514, the media clip system 106 can generate a media clip for the content item 510. To illustrate, the media clip system 106 generates a media clip for the content item 510 and stores the media clip in a media clip library. In some implementations, the media clip system 106 displays a notification that a content item has been saved as a clip. For instance, the media clip system 106 causes a media clip preview 520 to be displayed indicating that the content item 510 was generated as a media clip and saved to a media clip library. In various implementations, the media clip preview 520 includes the content item 522, and in some instances, content metadata and/or contextual metadata. In example implementations, the media clip preview 520 indicates a media clip collection in which the content item 510 is being assigned and provides an option to move the media clip to a different media clip collection or to create a new media clip collection.

Figure 6A:
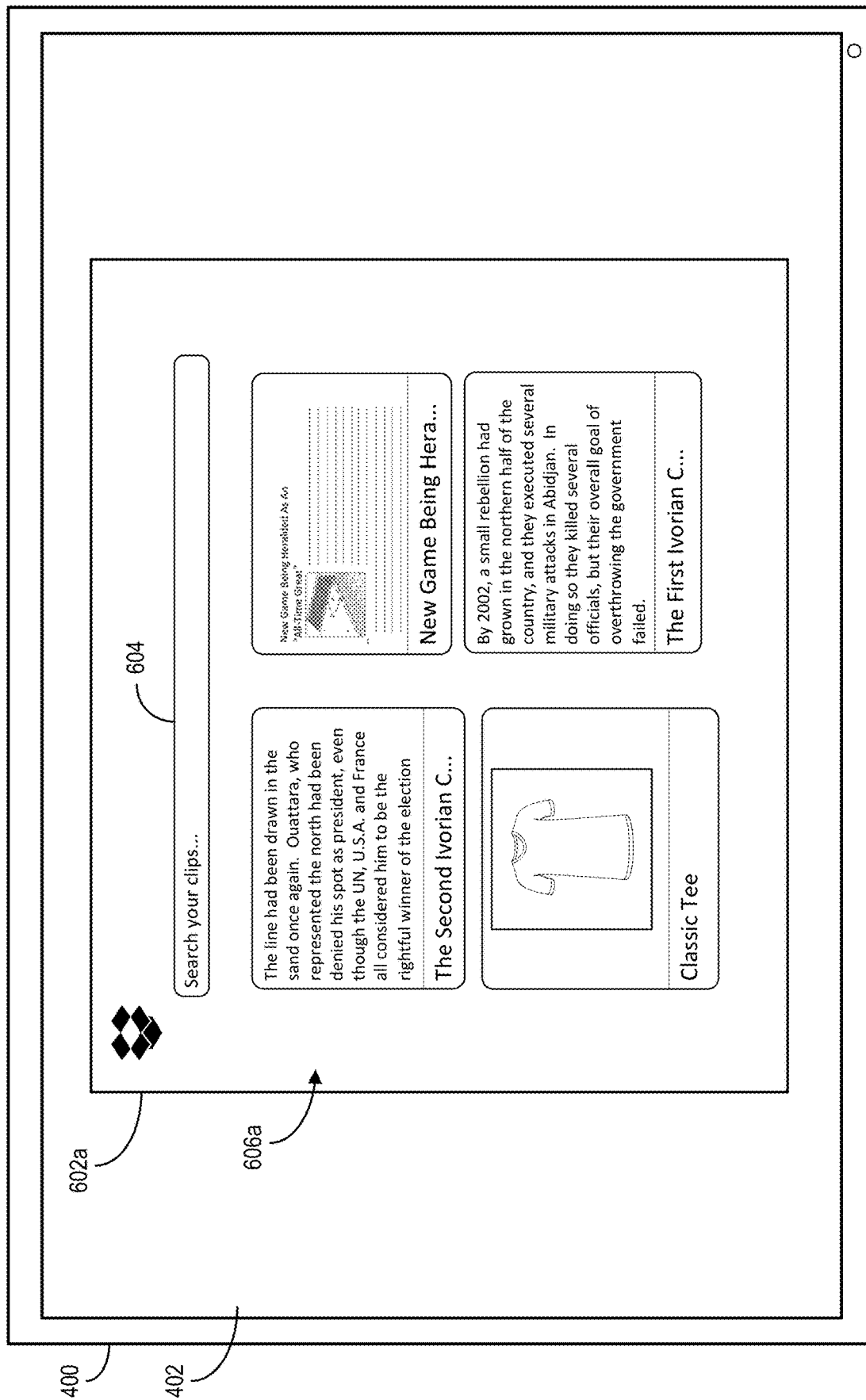
FIGS. 6A-6B illustrate various interactive interfaces for displaying and utilizing digital media clips in accordance with one or more embodiments.
Figure 6B:
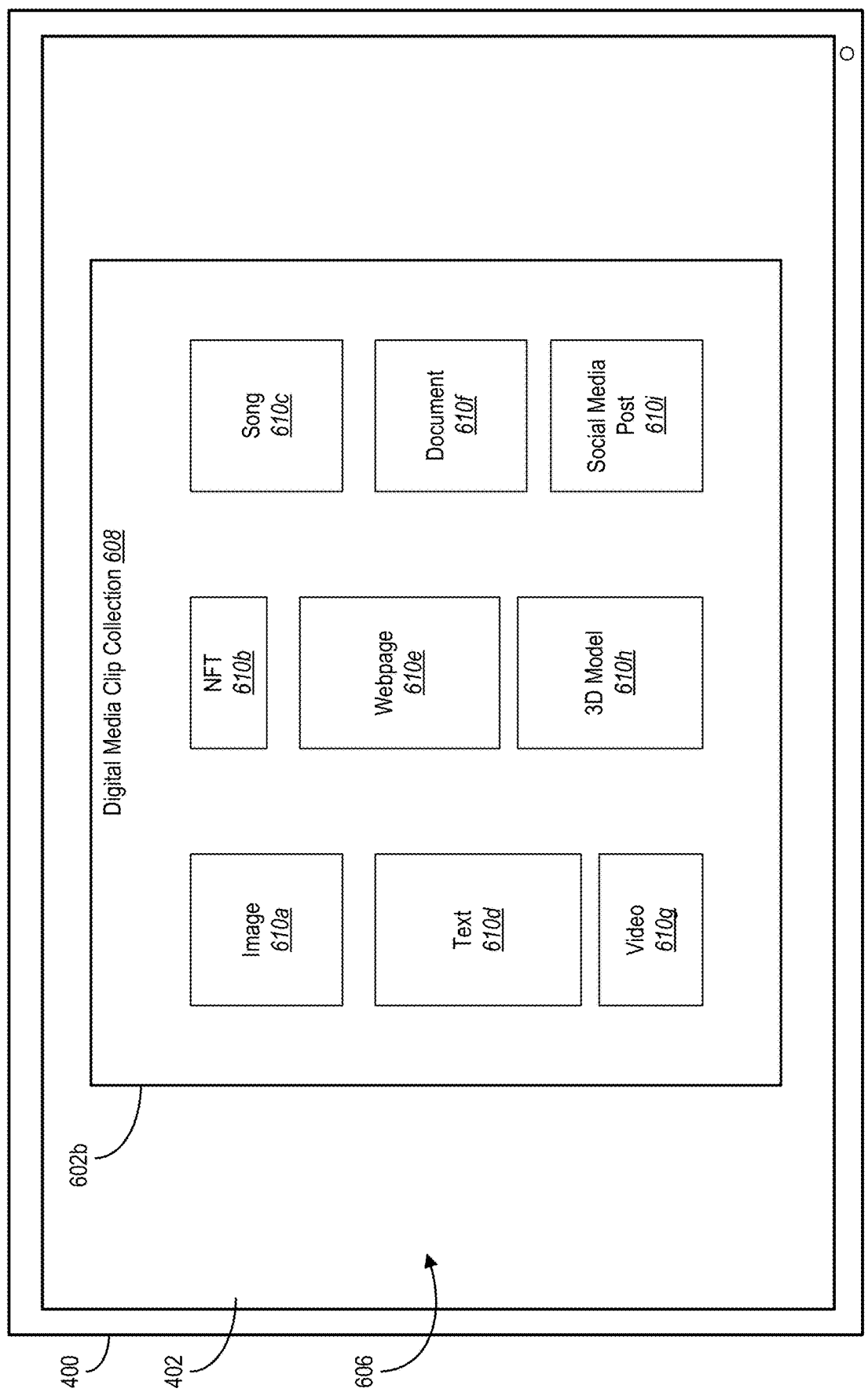

As mentioned above, the media clip system 106 can add a newly generated media clip to one or more media clip collections. To illustrate, FIGS. 6A-6B show example media clip collections. In particular, FIGS. 6A-6B illustrate various interactive interfaces for displaying and utilizing digital media clips in accordance with one or more embodiments. For context, FIGS. 6A-6B include the client device 400 and the graphical user interface 402 introduced above, As shown in FIG. 6A, the graphical user interface 402 includes a first interactive interface 602a that displays a media clip library 606a. As also shown, the media clip library 606 includes multiple media clips that each include a content item along with content metadata elements and/or contextual metadata elements. Indeed, each of the media clips in the media clip library 606 can include additional information from either its content metadata, contextual metadata, or both.

In addition, the first interactive interface 602a also includes a dynamic search query area 604. In one or more implementations, the media clip system 106 provides a dynamic search query area 604 to facilitate searching for a content item within a media clip collection, on a client device of the user, or within a user account of the content management system. As provided below in connection with FIG. 7, the media clip system 106 can identify media clips that satisfy a search query in one or more implementations based on comparing the contextual metadata of the content items on the media clip collection.

In FIG. 6B, the graphical user interface 402 of the client device 400 displays a second interactive interface 602b having a digital media clip collection 608. As shown, the digital media clip collection 608 includes media clips 610-610i (i.e., digital media clips) from different sources and/or content item types and can be generated from the media clips in the media clip library 606. In particular, the digital media clip collection 608 includes an image clip 610a, an NFT clip 610b, an audio clip 610c, a text clip 610d, a webpage clip 610e, a document clip 610f, a video clip 610g, a 3D model clip 610h, and a social media post clip 610i. Accordingly, in various implementations, the digital media clip collection 608 includes multiple media clips across a range of media types (e.g., content item types).

Indeed, the media clip collections maintained by the media clip system 106 are not limited to a specific content item type, but flexibly accommodates a range of content item types (as well as files, as described below). Further, in addition to providing one or more media clip collections that accommodate displaying, organizing, and utilizing media clips of different content item types, the media clip system 106 also displays content metadata and/or contextual metadata with a media clip in a media clip collection. In this manner, the media clip system 106 can assist in grouping, organizing, and/or correlating media clips that otherwise would not be associated due to their having different (e.g., noncompatible) content item types.

Figure 7:
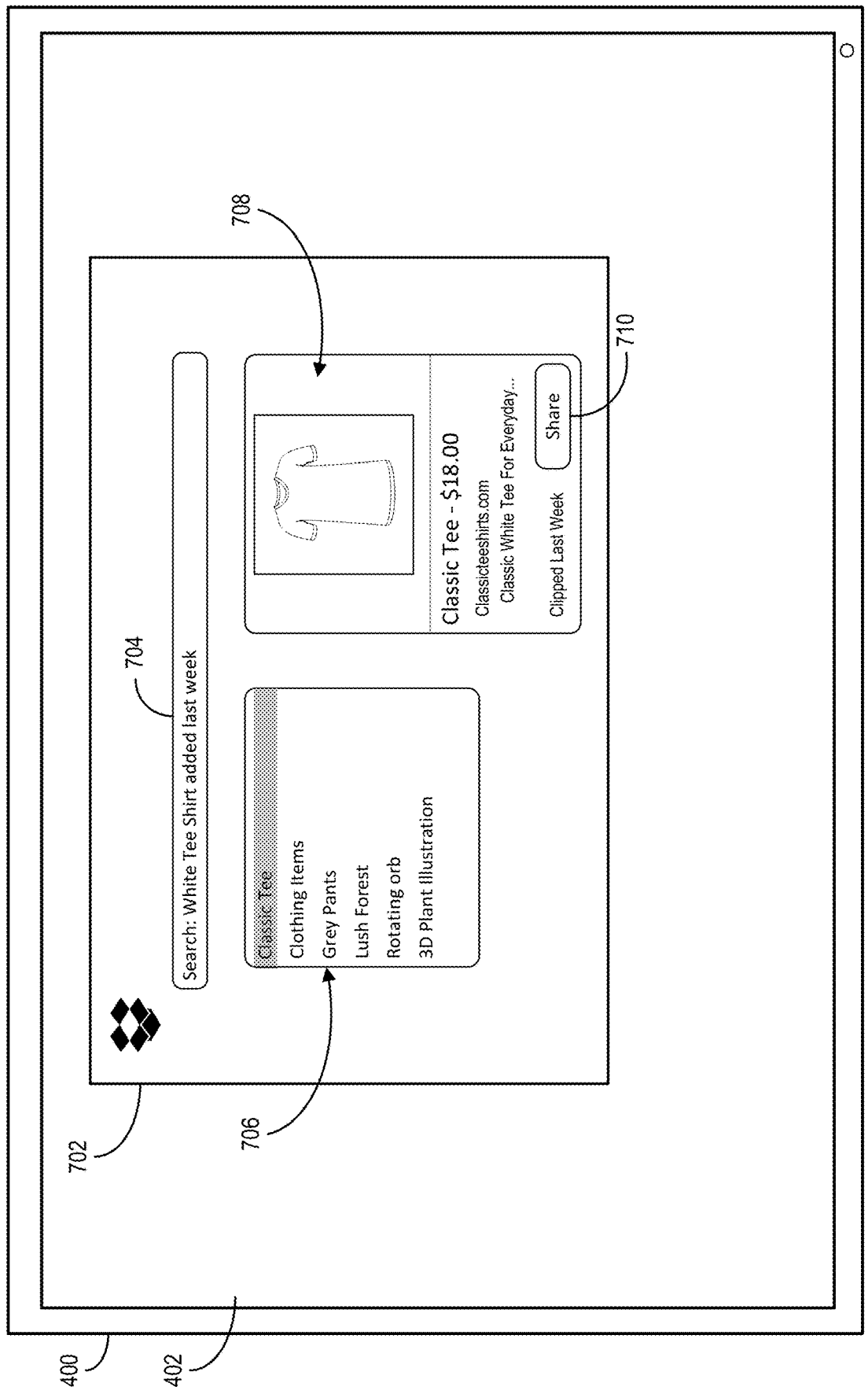
FIG. 7 illustrates searching for digital media clips based on contextual metadata in accordance with one or more embodiments.

As mentioned above, FIG. 7 provides additional detail regarding searching for and identifying content items based on contextual metadata. In particular, FIG. 7 illustrates searching for digital media clips based on contextual metadata in accordance with one or more embodiments. As shown, FIG. 7 includes the client device 400 and the graphical user interface 402 previously described. Additionally, the graphical user interface 402 includes an interactive interface 702 having a dynamic search query area 704, media clips 706, a media clip preview 708, and a share media clip element 710.

As noted above, the media clip system 106 enables searching of media clips within one or more media clip collections associated with a client device and/or user account of the content management system. In one or more implementations, the media clip system 106 detects a user-provided term (e.g., query string) entered into the dynamic search query area 704. Based on the term, the media clip system 106 searches a media clip collection for one or more media clips that match the user-provided term within its content metadata.

In various implementations, the media clip system 106 can search media clips for content items based on contextual metadata associated with the content item in each media clip. For instance, the media clip system 106 detects a media clip that the user-provided term matches with the contextual metadata for a media clip (i.e., a digital media clip).

In some implementations, the media clip system 106 compares the context of a user-provided term with the contextual metadata of media clips to determine correlations. To illustrate, the dynamic search query area 704 in the interactive interface 702 shows the user-provided terms of "White Tee Shirt" and "added last week." Accordingly, the media clip system 106 can search a media clip collection for media clips that correspond to a white tee shirt and that were clipped within the last 7 days and/or calendar week. In example implementations, the media clip system 106 searches through content item metadata in the metadata database to determine entries associated with media clips that satisfy both user-provided terms.

As shown in FIG. 7, the media clip system 106 identifies a list of media clips 706 that correspond to the user-provided term in the dynamic search query area 704. In addition, the interactive interface 702 includes the media clip preview 708, which shows the content item and content item metadata for the content item. In some implementations, the media clip preview 708 shows the content metadata and/or contextual metadata for the content item that corresponds to the user-provided term. Further, in various implementations, the media clip preview 708 includes a share media clip element 710 for sharing the media clip with other user accounts.

In some implementations, the user-provided term in the dynamic search query area 704 corresponds to a web-based signal, an application-based signal, or an OS-based signal. In certain implementations, the user-provided term is a combination of multiple environment signals (e.g., contextual signals). For example, the user-provided term indicates one or more applications opened and/or the client device (e.g., notebook, tablet, phone) the user was utilizing when a media clip was clipped.

In one or more implementations, the media clip system 106 searches for media clips based on a sample or query media clip. For example, the media clip system 106 receives a request to find media clips that have similar contextual metadata. In this manner, the media clip system 106 can identify additional media clips utilizing the distinct combination of application-based, web-based, and/or OS-based signals for a query media clip.

Additionally, in various implementations, the media clip system 106 can generate and/or modify a media clip collection based on contextual metadata. For example, the media clip system 106 creates a media clip collection to include media clips that include one or more particular pieces of contextual metadata, such as a particular application-based signal and a particular OS-based signal. Further, the media clip system 106 can recommend that new media clips be added to the media clip collection with the new media clip having the one or more particular pieces of contextual metadata and/or has contextual metadata that aligns with those in the media clip collection.

In additional implementations, the media clip system 106 provides the contextual metadata to a machine-learning model and/or neural network to determine connections between media clips that would otherwise go undetected. For example, the media clip system 106 generates and/or utilizes a machine-learning model that groups or clusters content items based on their contextual metadata and suggest media clip collections based on the clustered results.

In addition, in various implementations, the media clip system 106 can suggest content items to add to a media clip collection based on the contextual metadata of a media clip. For example, when browsing through content items, the media clip system 106 can identify contextual metadata for the content items and compare the contextual metadata to the contextual metadata of media clips stored in the metadata database (or stored elsewhere). If the media clip system 106 determines a correspondence value that satisfies a threshold, the media clip system 106 can notify or prompt the user to add the media clip to their media clip collection as well as indicate why the media clip system 106 suggested a particular recommendation.

Figure 8:
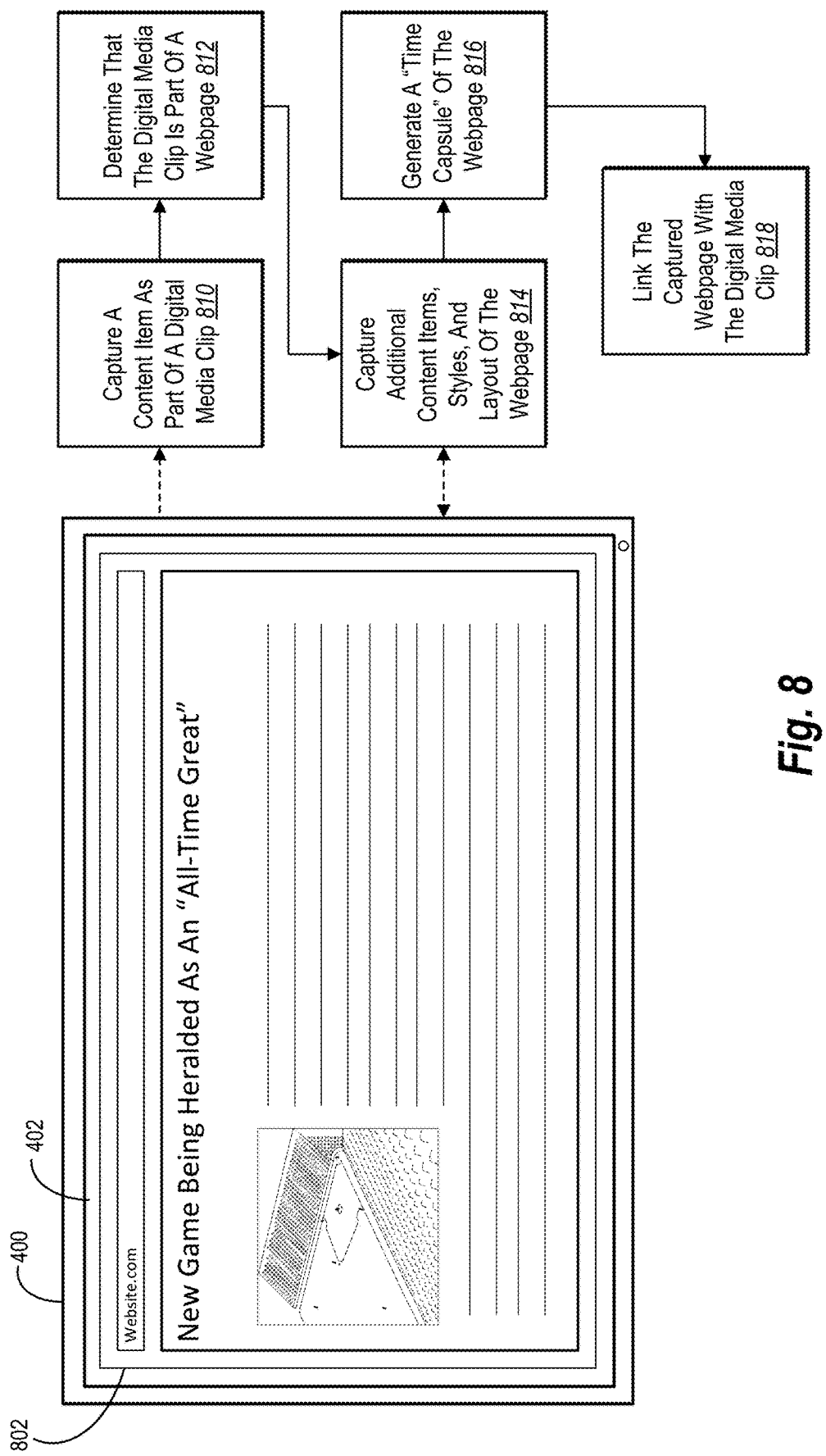
FIG. 8 illustrates capturing and associating additional content items with the contextual metadata of a digital media clip in accordance with one or more embodiments.

Looking now to FIG. 8, this figure illustrates capturing and associating additional content items with the contextual metadata of a digital media clip in accordance with one or more embodiments. As shown, FIG. 8 includes the client device 400 and the graphical user interface 402 previously described. Additionally, the graphical user interface 402 includes a webpage 802 within an application (e.g., a web browser).

As provided above, in various implementations, the media clip system 106 generates a media clip from a clipped content item. In some implementations, when clipping a content item from a webpage (or website), the media clip system 106 can capture a visual representation of the website that causes the media clip system 106 to preserve the look of the website at the time of capture. In this manner, if the website were to change, or if the current look of the website is temporary (e.g., a temporary branding promotion), the media clip system 106 can generate a "time capsule" that preserves the look, and in some instances, one or more functions of the webpage for future access and/or use. Indeed, in some implementations, the media clip system 106 saves the webpage as a media clip within a media clip collection.

To further illustrate, the media clip system 106 can detect a request to clip a content item within a webpage. In various implementations, the media clip system 106 performs an act 810 of capturing the content item as part of a digital media clip, as described above. For example, the media clip system 106 generates a media clip of the content item that includes identified and/or generated content metadata as well as generated contextual metadata.

In addition, in one or more implementations, the media clip system 106 performs an act 812 of determining that the digital media clip is part of a webpage. For instance, the media clip system 106 determines a URL of the webpage 802 from the content metadata and/or contextual metadata of the content item. For example, in some cases, the media clip system 106 analyzes web-based environment signals to identify a URL from the webpage 802 in which the content item resides.

In addition, based on determining that the content item belongs to a webpage (e.g., the content item has content metadata indicating a URL), the media clip system 106 can identify and collect additional content items on the webpage 802. For example, in various implementations, the media clip system 106 performs an act 814 of capturing additional content items, styles, and layouts of the webpage. In some implementations, the act 814 includes clipping each content item on the webpage 802 and saving each as a media clip. In some implementations, the act 814 includes capturing the styles (e.g., themes, fonts, style sheets, colors, etc.) of the webpage 802, code (e.g., HTML, JavaScript, etc.), as well as the layout of each content item within the webpage 802 at the time of capture. For instance, the layout indicates the proximity of each content item to each other and/or if content items are adjacent to, or nested within, other content items. In various implementations, the media clip system 106 also detects and captures some or all of the webpage functionality, such as if the webpage includes a function from a known function list.

In alternative implementations, rather than generating media clips for some or all of the content items on the webpage 802, the media clip system 106 generate and stores contextual metadata for a content item, as found in the current version of the webpage, by capturing elements (e.g., content item), styles, and a layout as displayed at a time of extracting the content item from the webpage. Indeed, when later accessing the content item, the media clip system 106 can provide a visual depiction of the website as part of the contextual metadata of a media clip.

In one or more implementations, the media clip system 106 performs an act 816 of generating a time capsule of the webpage 802. For example, the media clip system 106 utilizes the layout and styles to position the captured content item within the media clips as found and shown on the webpage 802. Indeed, the media clip system 106 can add contextual metadata to one or more of the media clips for content items from the webpage 802 that preserves the layout and the style of the website when the content item is captured (e.g., currently displayed on the web site).

Additionally, in various implementations, the media clip system 106 performs an act 818 of linking the captured webpage with the digital media clip. In some implementations, the media clip system 106 generates a time capsule of a webpage as part of the contextual metadata of one or more media clips of content items from the webpage. For instance, the contextual metadata is stored within the metadata database. In various implementations, the media clip system 106 stores the time capsule of the webpage in a septate database or file structure. In these implementations, the media clip system 106 can link the time capsule or saved current version of the webpage to one or more media clips of content items from the webpage.

As mentioned above, in some implementations, the media clip system 106 generates a time capsule in connection with generating a media clip for a content item from a webpage. In some implementations, the media clip system 106 provides a direct menu option to save or preserve a current version of a website. For example, the media clip system 106 facilitates a right-click menu that includes the selectable element of "Save this webpage" or "Create a Time Capsule of this webpage."

The media clip system 106 can provide various UI/UX features that provide different options for capturing a webpage or website. For example, in some implementations, the media clip system 106 can provide an option to capture a static time capsule of the webpage or website, meaning, the static time capsule preserves the content, formatting, and other attributes of the webpage or website as it exists at the time of capture. In other examples, the media clip system 106 can provide an option for a user to select to store a live time capsule, meaning, the live time capsule automatically updates as the underlying webpage or website updates. In other words, the media clip system 106 stores active references to a live version of a webpage or website, and periodically updates the version of the stored webpage or website within the media clip system 106 to a current version. Moreover, upon a user accessing the live time capsule, the media clip system 106 can access, store, and provide the up-to-date version of the webpage or website.

In one or more additional embodiments, the media clip system 106 can provide an option to capture a webpage or website over time. For example, the media clip system 106 can provide selectable options that allow a user to configure the frequency at which the media clip system 106 captures a version of a webpage or website (e.g., daily, weekly, monthly, yearly, etc.). In this way, the media clip system 106 can provide tools and interfaces that indicate how a webpage or website changes over a specified time period. For example, the media clip system 106 can provide an interface that presents (e.g., plays like a video) different versions of a webpage in succession to provide a visual representation of the changes. In addition, the media clip system 106 can analyze two or more different versions of a webpage and mark or highlight changes that are introduced between later versions.

Moreover, while FIG. 8 describes generating the function of saving a current version of a webpage, in example implementations, the media clip system 106 can apply similar techniques to generate a save current version of an application, and/or interactive interface. Indeed, the media clip system 106 can utilize environment signals from multiple digital environments to preserve the current environment of an application or even an OS state.

Figure 9:
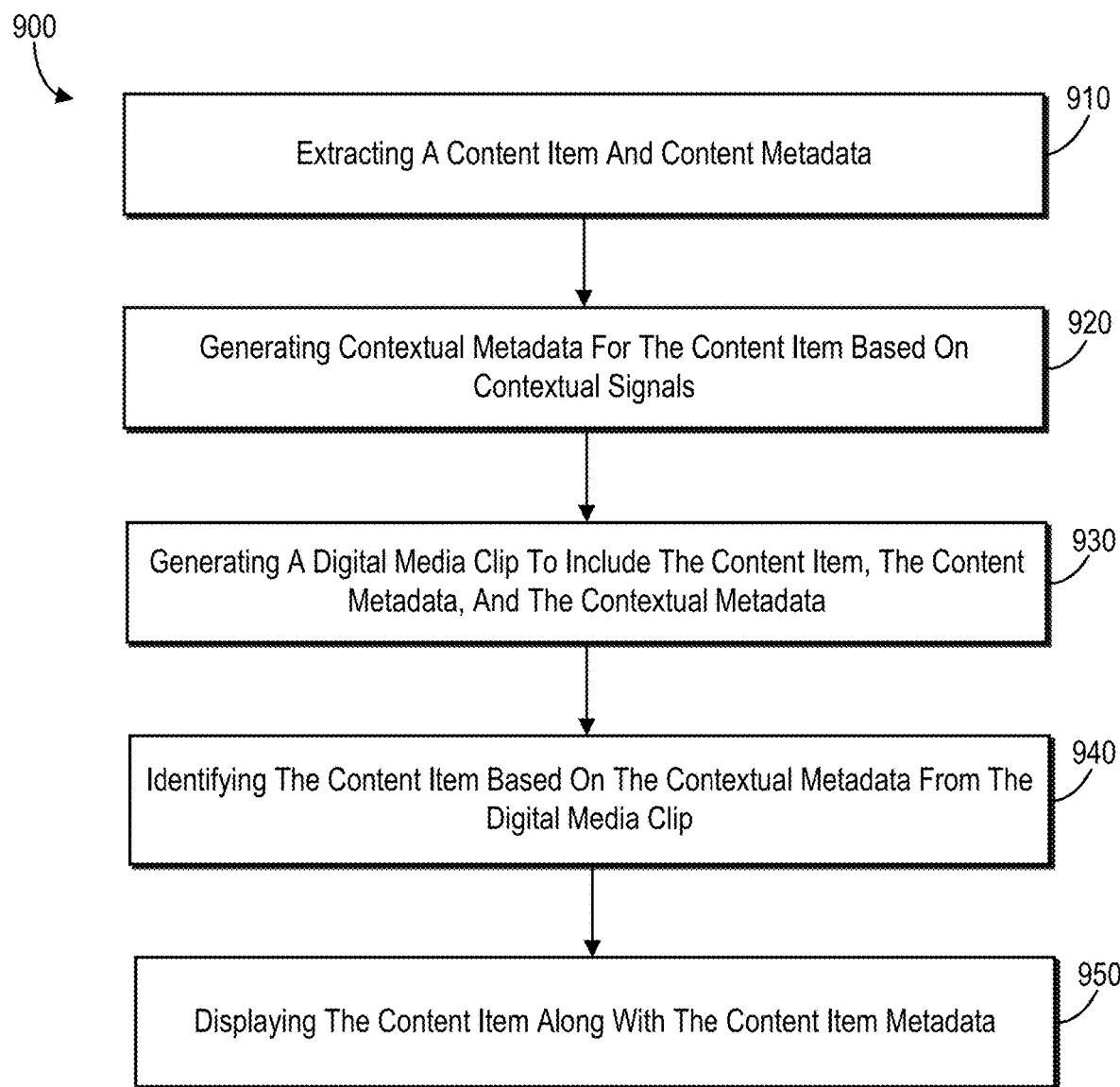
FIG. 9 illustrates a flowchart of a series of acts for generating digital media clips in accordance with one or more embodiments.

In some embodiments, the media clip system 106 can remove elements from a website that a user may not want to preserve. For example, the media clip system 106 can remove ads, popup elements, or other elements of the webpage 802. For instance, the media clip system 106 can provide a user selectable option during the capture process that, when the media clip system 106 receives an indication of The preceding figures, the corresponding text, and the examples provide several different systems, methods, techniques, components, and/or devices of the digital media clip system 106 in accordance with one or more embodiments. In addition to the above description, one or more embodiments can also be described in terms of flowcharts including acts for accomplishing a particular result. For example, FIG. 9 illustrate flowcharts corresponding to the one or more implementations of the media clip system 106 described above. Moreover, the outlined acts in FIG. 9 are only provided as examples, and some of the acts may be optional, combined into fewer acts, or expanded into additional acts without detracting from the essence of the disclosed embodiments. Further, the acts described herein may be repeated or performed in parallel with one another or in parallel with different instances of the same or similar acts.

Additionally, the digital media clip system 106 may perform one or more acts of the series of acts in addition to or alternatively to one or more acts described in conjunction with other figures. While FIG. 9 illustrates acts according to one embodiment, alternative embodiments may omit, add to, reorder, and/or modify any of the acts shown. Further, each of the acts of FIG. 9 can be performed as part of a method. Alternatively, a non-transitory computer-readable medium can comprise instructions that, when executed by one or more processors, cause a computing device to perform the acts of FIG. 9. In some embodiments, a system can perform the acts of FIG. 9.

To illustrate, FIG. 9 includes a series of acts 900 for generating digital media clips in accordance with one or more embodiments. As shown, the series of acts 900 includes an act 910 of extracting a content item and content metadata. For instance, the act 910 can involve extracting a content item and content metadata for the content item based on a detected user interaction with the content item. In one or more implementations, the act 910 includes detecting the selection of a content item for inclusion within a digital media clip collection. In some implementations, the act 910 includes extracting the content item and the content metadata for the content item based on a file format of the content item. In certain implementations, the content metadata includes a name, size, file, type, attributes, tags, creation date, and permissions of the content item Additionally, the series of acts 900 includes an act 920 of generating contextual metadata for the content item based on contextual signals. For instance, the act 920 can involve generating contextual metadata for the content item based on contextual signals from one or more digital environments from which the content item was extracted. In certain implementations, the contextual metadata includes one or more digital environment signals from one or more digital environments associated with extracting the content item.

In one or more implementations, the act 920 includes generating the contextual metadata for the content item to include a capture source and a capture time of the content item. In example implementations, the act 920 includes generating the contextual metadata for the content item based on analyzing the contextual signals from one or more digital environments associated with a client device from which the detected user interaction is received. In additional implementations, the act 920 includes analyzing an operating system digital environment to identify operating system signals to add to the contextual metadata. In various implementations, the act 920 includes analyzing a web-based environment to identify adjacent content within a proximity of the content item to add to the contextual metadata.

In some implementations, the act 920 includes generating the contextual metadata for the content item based on analyzing contextual signals from the one or more digital environments in which the content item resides. In various implementations, the act 920 includes generating the contextual metadata based on the contextual signals from the one or more digital environments including an operating system environment, an application environment, or a web-based environment.

The series of acts 900 also includes an act 930 of generating a digital media clip to include the content item, the content metadata, and the contextual metadata. For instance, the act 930 can involve generating a digital media clip including the content item, the content metadata, and the contextual metadata. In one or more implementations, the act 930 includes generating content item metadata for the content item within a content item attribute database by combining the content item and the contextual metadata in the content item metadata.

Further, the series of acts 900 includes an act 940 of identifying the content item based on the contextual metadata from the digital media clip. For instance, the act 940 can involve identifying the content item based on the contextual metadata from the digital media clip. In various implementations, the act 940 includes identifying the content item based on matching a user-provided term with the contextual metadata from the digital media clip. In one or more implementations, the act 940 includes identifying the content item by searching a digital media clip collection including a plurality of digital media clips within a user account of a content management system. Additionally, in example implementations, the digital media clip collection includes text clips, image clips, video clips, live video clips, audio clips, audiovisual clips, website clips, document clips, or application clips.

Moreover, the series of acts 900 includes an act 950 of displaying the content item along with the content item metadata. For instance, the act 950 can involve displaying the content item along with the content item metadata within an interactive graphical user interface. In one or more implementations, the act 950 includes displaying the content item along with the content item metadata accessed from the content item attribute database within an interactive graphical user interface. In various implementations, the interactive graphical user interface includes a selectable option to extract the content item from a web-based environment or an operating system environment.

The series of acts 900 can include one or more additional acts not shown. For example, in various implementations, the series of acts 900 includes an act of identifying additional digital media clips within a digital media clip collection within a user account of a content management system based on searching the content item attribute database. In various implementations, the series of acts 900 includes acts of determining that the content metadata includes a URL of a website; capturing additional content items, a layout, and a style currently displayed on the website; and generating a version of the website that displays the content item with the additional content items such that the version of the website preserves the layout and the style of the website when the content item is captured. In some implementations, based on determining that the content metadata includes a URL, the act includes generating the contextual metadata for the content item by saving a version of the webpage that captures elements, styles, and a layout as displayed at a time of extracting the content item from the webpage.

In some implementations, the series of acts 900 includes an act of generating a new digital media clip collection including the digital media clip and one or more additional digital media clips based on the one or more additional digital media clips sharing one or more contextual metadata attributes with the contextual metadata of the content item.
Recommending Content Items for a Media Clip Collection Based on Contextual Metadata As mentioned above, in various implementations, the media clip system 106 provides various tools and approaches for suggesting new content items to add to a media clip library or media clip collection as media clips. For instance, the media clip system 106 can identify new content items to suggest as users perform their regular computer activities. For example, the media clip system 106 recommends content items from websites, applications, and/or the media clip collections of other user accounts. In some instances, the media clip system 106 provides customized content item suggestions when assisting users searching for new content items to add as media clips.

Figure 10:
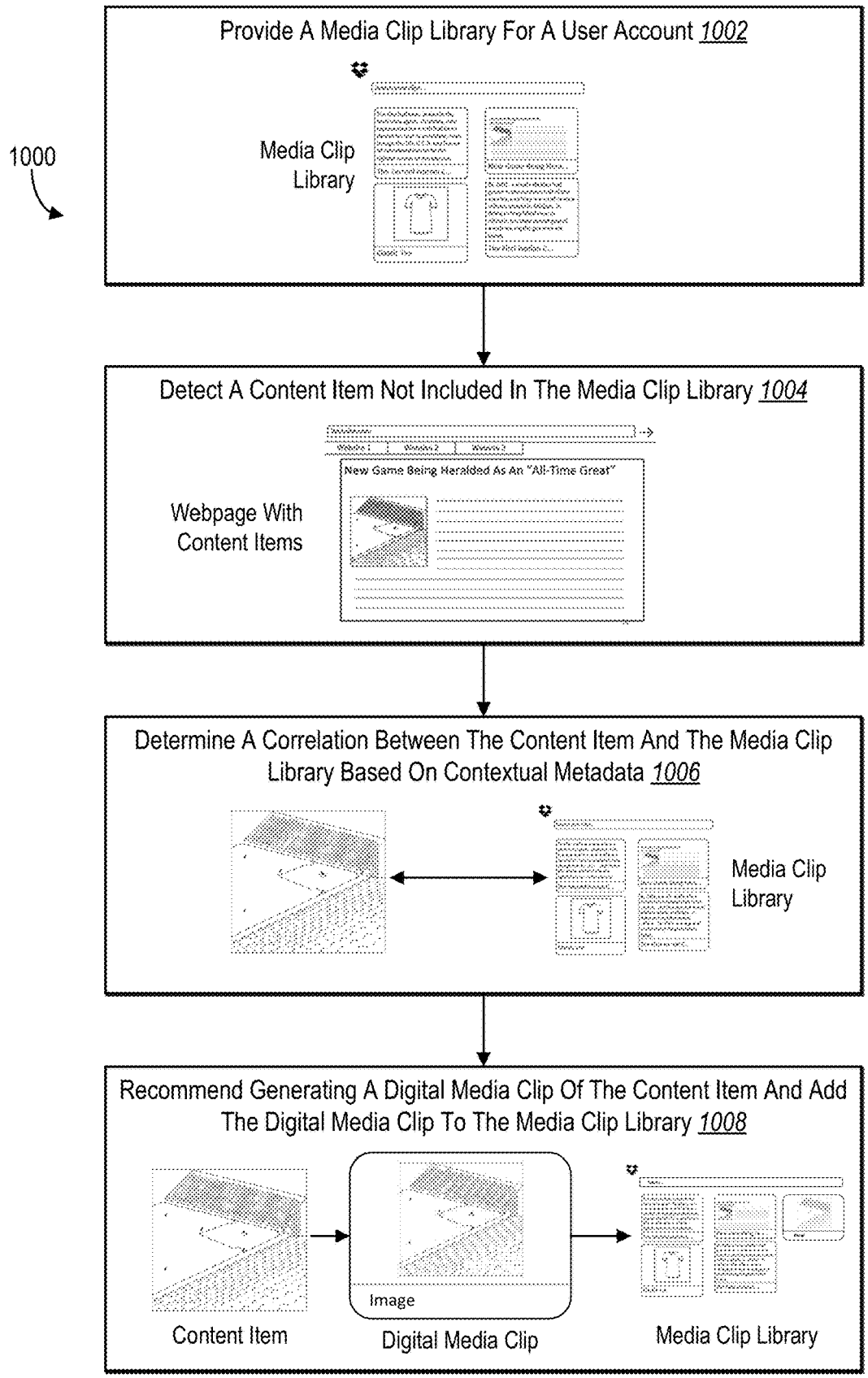
FIG. 10 illustrates an overview diagram of recommending content items to add to a media clip library based on contextual metadata in accordance with one or more embodiments.

To further illustrate, FIG. 10 shows an overview diagram of recommending content items to add to a media clip collection based on contextual metadata in accordance with one or more embodiments. In particular, FIG. 10 includes a series of acts 1000 performed by the media clip system 106 for identifying and suggesting content items to be made into media clips and added to a media clip collection.

As shown in FIG. 10, the series of acts 1000 includes an act 1002 of providing a media clip library for a user account. As described above, the media clip system 106 can create, provide, store, maintain, modify, and/or remove a media clip library that includes sets of media clips (i.e., digital media clips). In addition, the media clip system 106 can also maintain multiple media clip collections for a user account. For example, the media clip system 106 can organize media clip collections by themes, category, topics, and/or as defined by a user. In various implementations, the media clip system 106 creates one or more media clip collections based on determining similarities in their contextual metadata and/or content metadata. Additional detail regarding generating a media clip library and media clip collections is provided above in connection with FIGS. 6A-6B.

As shown, the series of acts 1000 includes an act 1004 of detecting a content item not included in the media clip library. For example, in various implementations, the media clip system 106 detects content items within applications (e.g., a web browser, a document, a photo, a news article, etc.) and determines that the content item is not included in a media clip library associated with a user account. As another example, the media clip system 106 identifies content items from media clip collections associated with other user accounts and that are not included in a media clip library associated with the user account. Additional detail regarding identifying potential content items to add to a media clip library of a user account is provided below in connection with FIGS. 11 and 12.

The media clip system 106 can determine whether to recommend a detected content item that is not included in a media clip library associated with a user account. To illustrate, as shown in FIG. 10, the series of acts 1000 includes an act 1006 of determining a correlation between the content items and the media clip library based on contextual metadata. For instance, the media clip system 106 compares contextual metadata for one or more media clips in the media clip library of a user account to the identified content items to determine if a sufficient correlation exists. In some implementations, the media clip system 106 determines correlation scores between each of the identified content items and media clips in the media clip library (based on their contextual metadata). Additional detail regarding determining correlations between content items and media clip system associated with a user account is provided below in connection with FIG. 11.

As shown in FIG. 10, the series of acts 1000 also includes an act 1008 of recommending by the media clip system 106 to generate a digital media clip of the content item and adding the digital media clip to the media clip library of the user account. For instance, based on the media clip system 106 determining a correlation between a detected content item and media clips in the media clip library of a user account (or a media clip collection), the media clip system 106 can recommend adding the content item to the media clip library as a media clip (and the media clip collection). Upon detecting an interaction confirming the recommendation, the media clip system 106 can generate a digital media clip from the content item, as described above, and add the newly generated media clip to the media clip library of the user account (and the media clip collection). Additional detail regarding recommending content items to add to a media clip library is provided below in connection with FIGS. 11-14.

Figure 11:
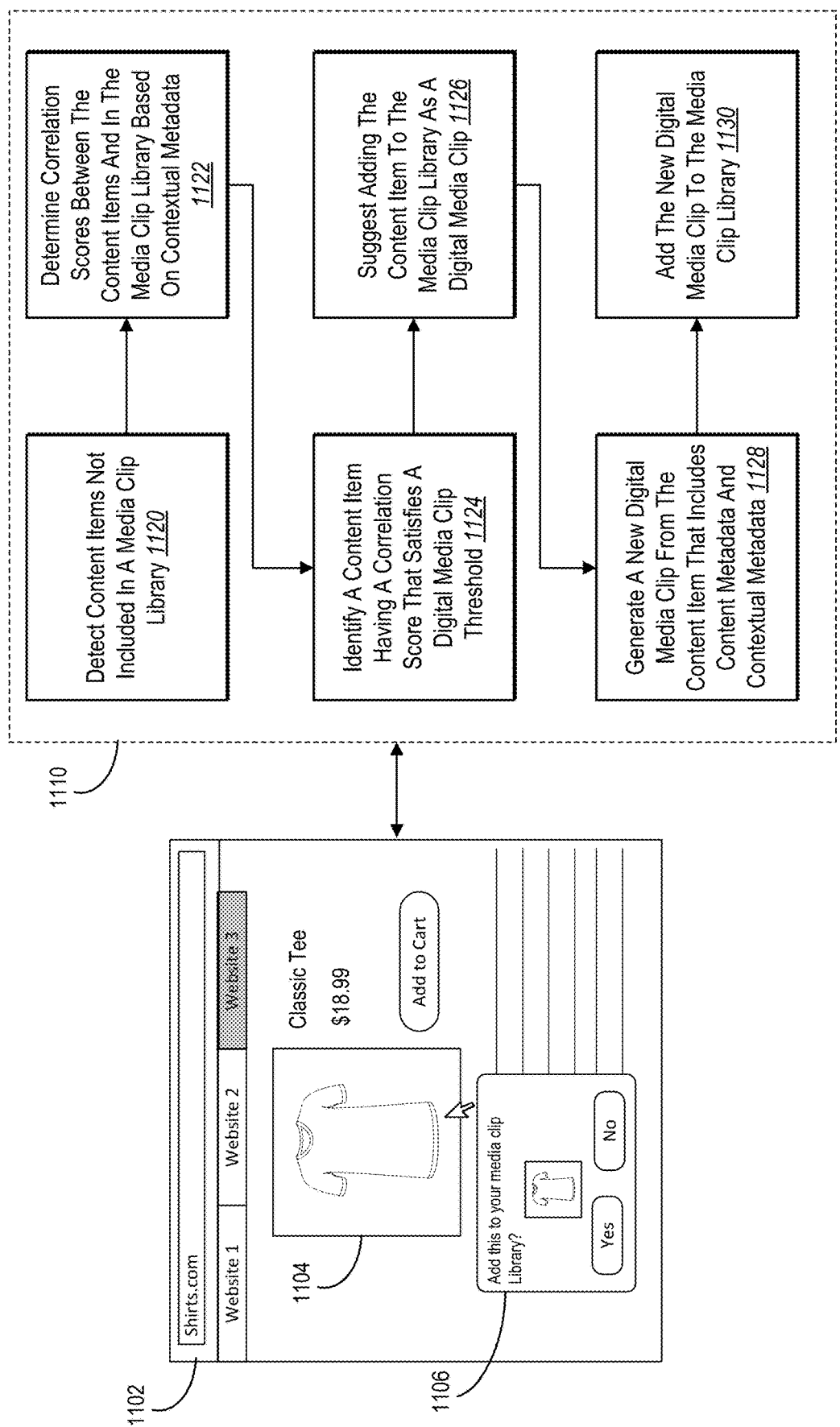
FIG. 11 illustrates suggesting adding a content item to a media clip library for a user account based on contextual metadata in accordance with one or more embodiments.

As mentioned above, FIG. 11 provides additional detail regarding the media clip system 106 identifying potential content items, determining correlations between content items and a user account, and providing a recommendation to add correlated content items as media clips to the media clip library of a user account. In particular, FIG. 11 illustrates suggesting adding a content item to a media clip library for a user account based on contextual metadata in accordance with one or more embodiments. As shown, FIG. 11 includes a graphical user interface of a web browser application 1102 that includes various websites (e.g., shown as tabs "Website 1," "Website 2," and "Website 3), where the content of Website 3 (i.e., Shirts.com) is currently shown.

As shown, the web browser application 1102 includes various content items including a content item 1104 of a tee shirt for purchase. The web browser application 1102 also includes a recommendation notification 1106 where the media clip system 106 is recommending that the user account add the content item 1104 to their media clip library associated with their user account. The web browser application 1102 could include additional content items, which are not displayed for simplicity.

FIG. 11 also shows a series of acts 1110 that provides additional detail regarding how the media clip system 106 determines to recommend the content item 1104. In various implementations, the series of acts 1110 corresponds to the media clip system 106 utilizing the current media clip of a user account as the context to suggest new adding new media clips. While the series of acts 1110 is described in the context of a content item on a website, the same principles and methods apply to content items in other digital environments, such as within native applications.

In some implementations, the media clip system 106 utilizes a web-browser plugin or extension to detect and recommend content on a webpage in a web browser application. In one or more implementations, the media clip system 106 utilizes a natively installed application (e.g., a content management system application 104) on a client device to detect and recommend content in an application and/or at the OS level of the client device. Additionally, in some implementations, the web-browser plugin and the content management system application communicate with each other to facilitate managing and recommending media clips.

As shown in FIG. 11, the series of acts 1110 includes an act 1120 of detecting content items not included in a media clip library. To elaborate, as a user interacts with content providers or sources of content (e.g., via a web browser or application), the media clip system 106 detects when new content items are detected. In one or more implementations, the media clip system 106 passively detects content items without explicit instructions from a user. In alternative implementations, the media clip system 106 receives an indication (e.g., and in some cases permission) from a user to monitor user activity and provide media clip suggestions. For instance, permission is granted to the media clip system 106 to monitor activity at specified times, from specified sources (e.g., approved websites) and/or within approved applications.

Upon detecting the presence of a content item (e.g., images, text, videos, etc.), the media clip system 106 can determine whether the content item is included in a media clip library of the user account. For example, based on following user activity and detecting the content item 1104 within the web browser application 1102, the media clip system 106 determines whether the content item 1104 is included in a media clip library of the user account. If so, the media clip system 106 can provide a notification to the user account that the content item is recognized as belonging to their media clip library. Additionally, the media clip system 106 can update the media clip for the content item by gathering additional content metadata and contextual metadata for the content item.

Otherwise, if the media clip system 106 determines that the content item 1104 is not included in a media clip library of the user account, the media clip system 106 can proceed to the act 1122 in the series of acts 1110. As shown, the act 1122 includes determining correlation scores between the content items and media clip library based on contextual metadata. For instance, in one or more implementations, the media clip system 106 determines a correlation score for one of the content items by comparing the content item to one or more media clips in the media clip library (or a media clip collection). In some instances, the media clip system 106 compares the content item to the contextual metadata of the media clips.

To illustrate, in one or more implementations, the media clip system 106 generates a correlation score by comparing a content item to the content item, content metadata, and/or contextual metadata of a media clip within the media clip library of a user account. For instance, the media clip system 106 can compare content metadata for the content item to content item metadata (e.g., content metadata and contextual metadata) to media clips in a media clip library to determine a correlation score based on the number or amount of similarities.

In some implementations, the media clip system 106 detects contextual metadata for the content item and utilizes it to compare the content item to media clips. For instance, the media clip system 106 determines if the contextual metadata overlap or share similar attributes. For example, the media clip system 106 determines a correlation score for a content item based on, in part, whether similar digital environments and/or contextual signals are detected with the content item as is stored for a media clip within a media clip library (or a media clip collection).

In one or more implementations, the media clip system 106 utilizes contextual metadata of the content item to determine a correlation score by comparing the contextual metadata of the content item to a set of metrics. For instance, the contextual metadata for the content item indicates the frequency of access on a website, the amount of active time with a content item within an app, or the number of user interactions with a particular content item. In some cases, the metrics are specific to a user and their past activity patterns with content items. Further, based on the contextual metadata satisfying metrics in the set of metrics, the media clip system 106 generates a correlation score for the content item.

As shown, the series of acts 1110 includes an act 1124 of identifying a content item having a correlation score that satisfies a digital media clip correlation threshold (or simply "correlation threshold"). For instance, in various implementations, the media clip system 106 determines which of the content items have a correlation score above a minimum correlation score (i.e., the correlation threshold). In some implementations, if multiple content items satisfy the correlation threshold, the media clip system 106 selects the content item with the highest score. In alternative implementations, the media clip system 106 selects each content item that satisfies the correlation threshold. In various implementations, the correlation threshold changes based on the content item type and/or the number of corresponding content items within a media clip collection.

In various implementations, the media clip system 106 utilizes a content item classification machine-learning model to determine correlations scores and/or whether a content item correlates to a media clip library of a user account. For example, the media clip system 106 generates a content item embedding for identified content items as well as embeddings for media clips in a media clip library (e.g., based on content item, content metadata, and/or contextual metadata). In additional implementations, the media clip system 106 compares the embeddings (e.g., measures the distance in embedding space) to determine if they satisfy a correlation threshold (e.g., are within a predetermined distance). In alternative implementations, the media clip system 106 utilizes other versions of a machine-learning model to determine a correlation score between identified content items and media clips of a media clip library of a user account.

As shown, the series of acts 1110 includes an act 1126 of suggesting adding the content item to the media clip library as a digital media clip. For instance, upon determining a correlation between the content item 1104 and one or more media clips within a media clip library of a user account, the media clip system 106 provides the recommendation notification 1106, as shown.

In some implementations, the media clip system 106 provides the suggestion in a notification message (e.g., text, email, instant, or push message). In some implementations, the media clip system 106 pops up an interactive interface, such as the recommendation notification 1106 shown in FIG. 11. In one or more implementations, the media clip system 106 provides an application-based interactive interface that floats on top of other interfaces and provides the suggestion, among other functions.

As shown, the series of acts 1110 includes an act 1128 of generating a new digital media clip from the content item that includes the content metadata and the contextual metadata. To illustrate, upon presenting the recommendation notification 1106 to the client device of the user, the media clip system 106 detects (e.g., directly or via the OS) a user confirmation of the recommendation (e.g., selecting the "yes" element). In response, the media clip system 106 can generate a media clip from the content item, as described above. In particular, the media clip system 106 can generate a media clip that includes the content item, content metadata identified from the content item, and contextual metadata generated from contextual signals from the digital environments in which the content item resides (e.g., the web browser application 1102 and the OS of the client device).

As also shown, the series of acts 1110 includes an act 1130 of adding the new digital media clip to the media clip library. For example, upon generating the media clip, the media clip system 106 adds the media clip to a media clip library associated with the user account. In various implementations, the media clip system 106 also enables the user to indicate a media clip collection a particular media clip collection in which to locate the new media clip (e.g., select a media clip collection via a dropdown menu).

In various implementations, the media clip system 106 can recommend adding the content item to a particular media clip collection of the user account. For example, if a user account has multiple media clip collections, the media clip system 106 can determine a correlation score for one or more of the media clip collections. Then, the media clip system 106 can suggest adding the content item to the media clip collection having the most favorable correlation score.

In many implementations, the media clip system 106 suggests adding media clips to a user account but does not automatically add media clips without approval or confirmation by the user account. In one or more implementations, however, the content management system 110 automatically generates media clips from correlated content items and adds them to a separate media clip collection separate from the media clips in the media clip library of the user account. In this manner, the user can determine whether to move an automatically generated media clip to their media clip library or discard it.

In some implementations, the media clip system 106 removes automatically generated media clips after an event occurs. For example, the media clip system 106 removes an automatically generated media clip after a week or a month, at the end of a week, after being viewed a set number of times without being added to another media clip collection, when a set number of media clips are added to the separate media clip collection, a user-specified event, or another event.

As mentioned above, FIG. 12 describes identifying potential content items to add to a media clip library (or a media clip collection) of a user account. To illustrate, FIG. 12 shows the media clip system 106 providing a suggestion to add a content item to a media clip library for a first user account from a media clip library of a second user account in accordance with one or more embodiments.

Figure 12:
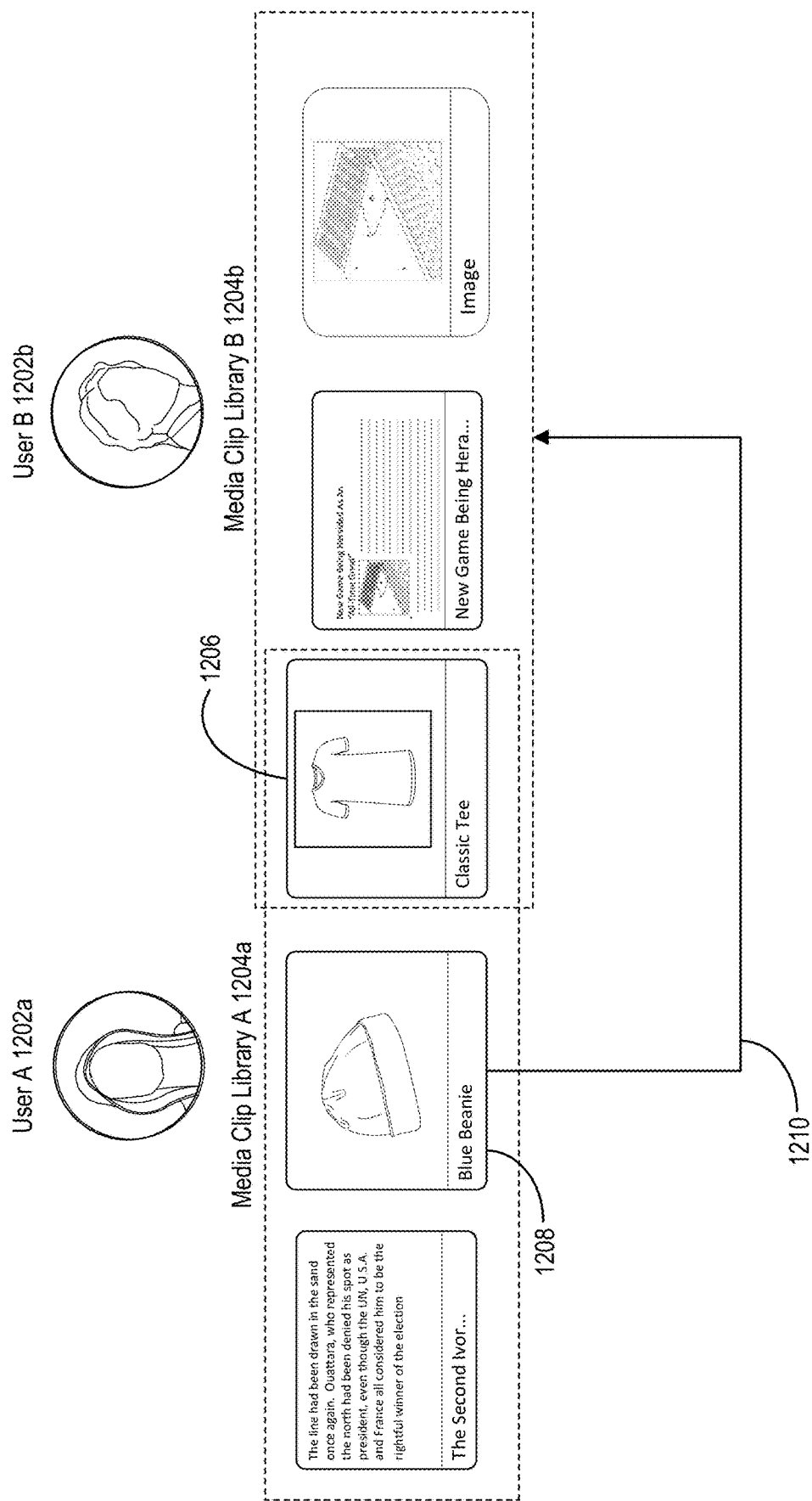
FIG. 12 illustrates suggesting adding a content item to a media clip library for a first user account from a media clip library of a second user account in accordance with one or more embodiments.

As shown, FIG. 12 includes a first user account 1202*a* (i.e., User A) and a second user account 1202*b* (i.e., User B). In addition, FIG. 12. includes a first media clip library 1204*a* associated with User A and a second media clip library 1204*b* associated with User B, where each media clip collection includes various media clips (i.e., digital media clips) that can vary across a wide range of content item types, as provided above. The one or more embodiments described with respect to FIG. 12 can rely on users affirmatively opting in to share data associated with their content so the media clip system 106 can generate the functionality described with respect to FIG. 12. If a user does not affirmatively opt-in, then the content and data associated with the content within a user account remains private. In additional embodiments, if the media clip system 106 detects that the user has already published a content item publicly, then the media clip system 106 may provide the suggestion functionality described with reference to FIG. 12 with reference to only the published content since by publishing the content the user has effectively indicated that privacy for that particular content item is not an issue. If, however, a user unpublishes the content item, then the media clip system 106 would no longer use the content item for the functionality described below.

As shown, the first media clip library 1204a and the second media clip library 1204b each have a media clip for the same content item (i.e., the "Classic Tee"), shown as a first media clip 1206. In one or more implementations, the first media clip 1206 includes the same content item in both media clip libraries. In addition, the first media clip 1206 may also include similar content metadata (which is based on the content item itself). However, in some implementations, the first media clip 1206 belonging to the first user account 1202a has different contextual metadata from the first media clip 1206 belonging to the second user account 1202b if the digital environments and contextual signals were different when the corresponding content item was captured. In alternative implementations, if the first user account 1202a shared the first media clip 1206 with the second user account 1202b, then the media clips including their contextual metadata could be the same.

As mentioned above, the media clip system 106 can suggest adding media clips to a user account. In some implementations, the media clip system 106 recommends adding media clips found in the media clip library of other user accounts. To illustrate, FIG. 12 includes the first user account 1202a and the second user account 1202b along with the first media clip library 1204a and the second media clip library 1204b, as introduced above. As shown, the first media clip library 1204a has three media clips including the first media clip 1206 and a second media clip 1208. The second media clip library 1204b also has three media clips and similarly includes the first media clip 1206.

In various implementations, the media clip system 106 recommends adding the media clips from the media clip library (or media clip collection) of one user account to another user account. For instance, the media clip system 106 analyzes the media clips in a first media clip library to determine if one or more of the media clips correlates to a second media clip library of another user. For example, in various implementations, the media clip system 106 compares the content items and/or their content metadata and contextual metadata from the first user account 1202a to the media clips of the second user account 1202b to determine correlation scores, as described above. Then, based determining a media clip and/or content item from the first user account 1202a having a correlation score that satisfies a correlation threshold with media clips of the second user account 1202b, the media clip system 106 determines to recommend the media clip to the second media clip library 1204b.

More particularly, in certain implementations, upon determining that the first user account 1202a and the second user account 1202b both share the first media clip 1206, the media clip system 106 may determine whether the first user account 1202a have additional media clips that correlate to media clips of the second user account 1202b. For example, the media clip system 106 identifies the contextual metadata of the first media clip 1206 and compares it to contextual metadata of media clips in the first media clip library 1204a. For instance, based on the contextual metadata of the first media clip 1206 belonging to User B, the media clip system 106 identifies a capture time and/or captures the location of the first media clip 1206. The media clip system 106 then compares the capture time and/or capture to contextual metadata of media clips in the first media clip library 1204a. In one instance, the media clip system 106 may determine that the second media clip 1208 in the first media clip library 1204a was captured around the same time or from the same source as the first media clip 1206 in the second media clip library 1204b. Accordingly, the media clip system 106 recommends adding the second media clip 1208 from the first media clip library 1204a to the second media clip library 1204b, as shown by the arrow 1210.

Before comparing the media clip libraries (or media clip collections) of different user accounts, in some implementations, the media clip system 106 determines whether a sufficient *nexus* or connection exists between the first user account 1202a and the second user account 1202b. For instance, the media clip system 106 determines if the first user account 1202a is linked to the second user account 1202b via a social, professional, or casual association. In some instances, the media clip system 106 determines if the first user account 1202a and the second user account 1202b belong to the same organization, team, group, and/or are collaborating on a project. In one or more instances, the media clip system 106 determines if the first user account 1202a is actively communicating with the second user account 1202b (e.g., via text, email, instant message, or an application).

In some implementations, the media clip system 106 determines a connection when two or more user accounts are sharing media clips and/or a media clip collection. For example, in various implementations, the media clip system 106 enables multiple user accounts to collaborate on a shared media clip collection. In these implementations, the media clip system 106 can determine a connection between the user accounts and determine if additional media clips not in the shared media clip collection should be shared between the user accounts and/or added to the shared media clip collection.

As another illustrate, for two connected user accounts, the media clip system 106 detects that the two user accounts were adding media clips to their respective individual media clip collections around the same time. Here, the media clip system 106 can compare contextual metadata along with the content items and content metadata of the media clip system to see if a sufficient correlation exists. If so, the media clip system 106 can recommend that one of the media clips added to one user account's media clip collection be added to the second user account's media clip collection (and thus, each user account's media clip library).

Indeed, in various implementations, the media clip system 106 can passively (e.g., executing in the background) identify content items to suggest to a user account. For example, when a first user account interacts with a second user account, the media clip system 106 analyzes the media clip collections or media clip library of the second user account to determine whether to recommend one or more media clips to the first user. As mentioned above, the media clip system 106 can compare contextual metadata and/or other parts of the media clips to determine media clip correspondences and whether to recommend a content item to the first user account.

While FIG. 12 shows comparing two user accounts, the media clip system 106 can compare other types of graphs and data structures. For example, the media clip system 106 compares event graphs, people graphs, content graphs, work graphs, project graphs, social graphs, etc., to determine if content items and/or media clips in a graph correspond to media clips in the media clip collection of a user account.

Figure 13:
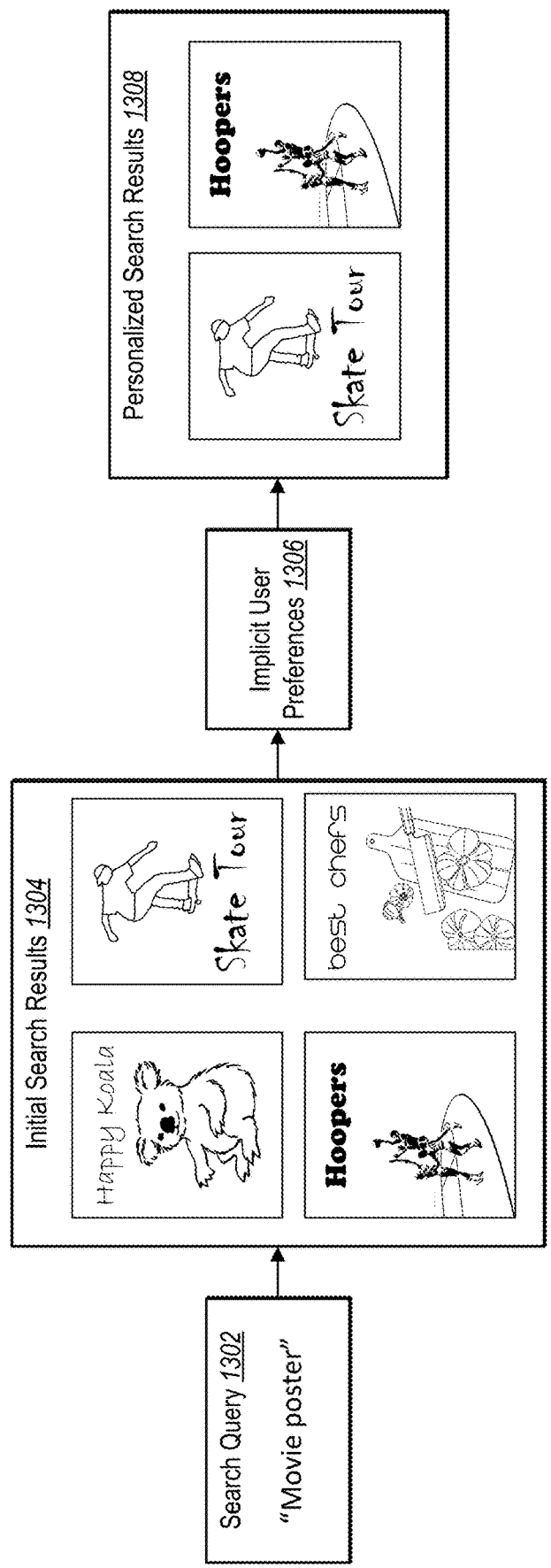
FIG. 13 illustrates generating personalized search results of content items based on implicit user preferences in accordance with one or more embodiments.

As mentioned above, the media clip system 106 can suggest adding media clips that are customized and personalized to a user account based on contextual metadata of media clips. To illustrate, FIG. 13 shows generating personalized search results of content items based on implicit user preferences in accordance with one or more embodiments. As shown, FIG. 13 includes a search query 1302, initial search results 1304, implicit user preferences 1306, and personalized search results 1308.

To illustrate, the media clip system 106 can receive a search query from a user associated with a user account of the content management system. For example, a user desiring to discover new content provides search terms to the media clip system 106. In some instances, the search query 1302 is text (i.e., a string of characteristics). In other instances, the search query 1302 is a selected content item and/or media clip, such as a media clip from a media clip collection.

Figure 14:
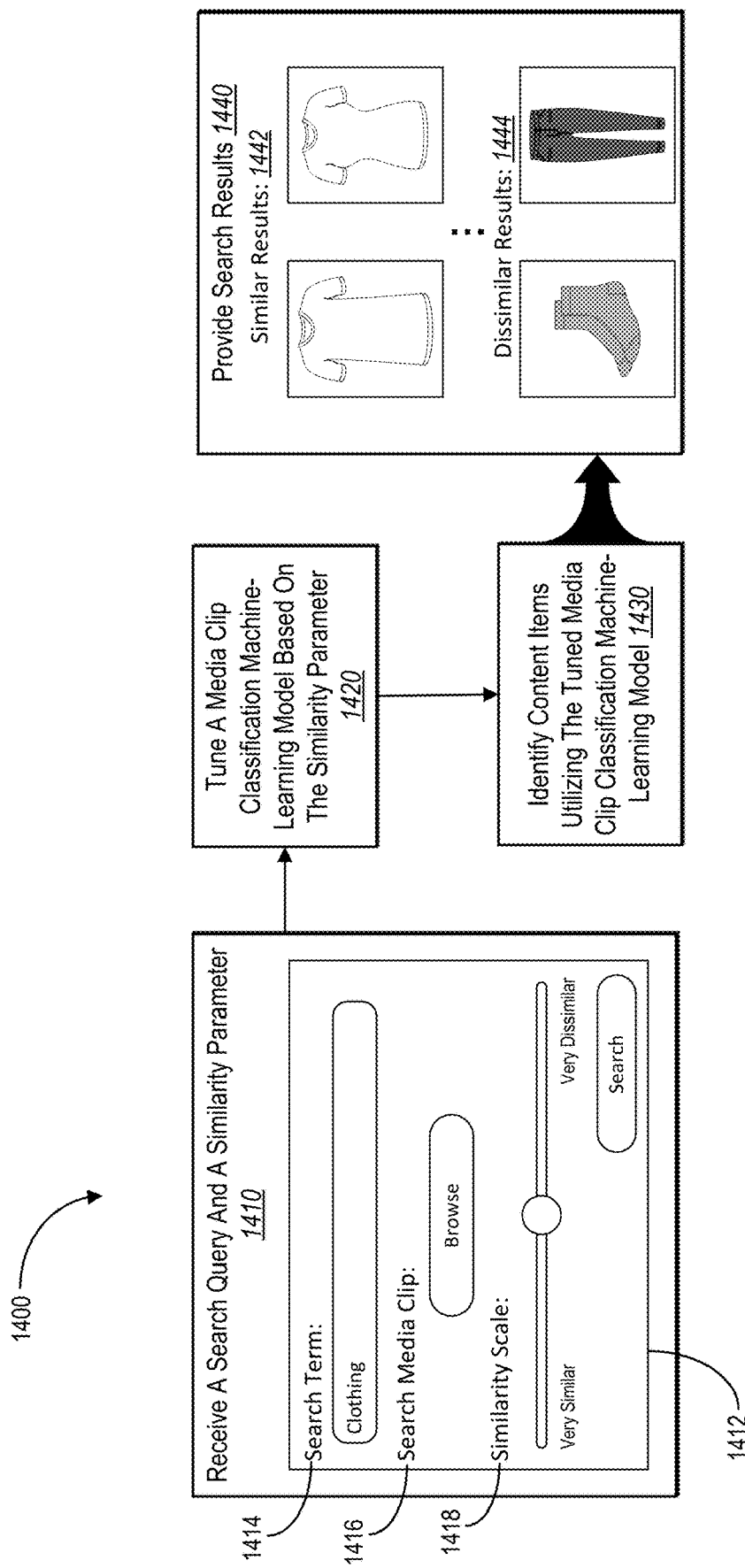
FIG. 14 illustrates tuning and utilizing a media clip classification machine-learning model to recommend content items in accordance with one or more embodiments.

In various implementations, the media clip system 106 provides an interactive interface for the user to enter in the search query 1302. For example, FIG. 7 provides an example of an interactive interface for entering in search queries and/or searching for content. FIG. 14, described below, also provides an example of an interactive interface. In some implementations, the media clip system 106 operates in the background of a client device. For example, the media clip system 106 adds a filtering layer to the initial search results of other applications and/or the OS system such that the search results provided to a user have been refined based on contextual metadata of media clips belonging to a user account, as described below. In some embodiments, the media clip system 106 provides an option to search all published collections across a variety of users, e.g., teams, organizations, or all published content from users across the content management system. Another example of a search option that the media clip system 106 provides is to search only the user's specific corpus of collections.

As shown in FIG. 13, the media clip system 106 receives the search query 1302 of "Movie posters." Accordingly, the media clip system 106 searches for content items related to movie posters. In one or more implementations, the media clip system 106 searches sources external to a user account (e.g., outside of media clips of the user account). For example, the media clip system 106 searches a repository of content items/media clips, online sources, and/or the media clip collections of other user accounts (e.g., shared or public media clip collections). In some implementations, the media clip system 106 searches through media clips and/or content items stored associated with the user account (e.g., content items stored on the client device of the user or in cloud storage).

As shown, the content management system 110 generates the initial search results 1304 from the search query 1302. As mentioned above, in some implementations, another application or the OS system generates the initial search results 1304. In many implementations, the initial search results 1304 are not provided for display to the user at this point. In various implementations, the initial search results 1304 are provided to the user for display.

In addition, FIG. 13 shows the content management system 110 identifying implicit user preferences 1306. For example, the media clip system 106 access the contextual metadata for media clips in a media clip collection and/or looks up content item metadata from the metadata database (described above) to identify the implicit user preferences 1306. In various implementations, the implicit user preferences 1306 includes preferences not explicitly expressed by the user but inferred from analyzing media clips and/or content item metadata of the user account.

To illustrate, the media clip system 106 determines that a user account prefers realistic, stock images over cartoon or abstract images. For instance, the media clip system 106 analyzes the media clip system of the user account to determine this implicit preference of the user account. Other implicit preferences could reveal that the user account prefers the first style of writing (or images) when adding media clips in the mornings and the second style of writing (or images) when adding media clips in the evening.

As another example, in one or more implementations, the media clip system 106 identifies contextual signals from the current digital environments on the client device. Then, the media clip system 106 identifies a subset of media clips in the media clip library of the user account that has the same or similar contextual metadata (e.g., date and time, open applications, similar web browser tabs open, etc.). The media clip system 106 then determines the implicit user preferences 1306 from the subset of media clips.

As shown, FIG. 13 includes the personalized search results 1308, which shows content items matching the search query 1302 and specifically tailored to the user account. For example, upon identifying the implicit user preferences 1306, in various implementations, the media clip system 106 applies, filters, and/or compares the implicit user preferences 1306 to the initial search results 1304. In some implementations, the media clip system 106 determines a correlation score based on comparing the initial search results 1304 with the implicit user preferences 1306 (e.g., using machine learning as provided above). Additionally, the media clip system 106 can select a subset of the initial search results 1304 that align with the implicit user preferences 1306 to generate the personalized search results 1308.

In various implementations, the media clip system 106 provides the personalized search results 1308 in the interactive interface. In some implementations, the media clip system 106 provides the personalized search results 1308 in a content management system application. Additionally, in one or more implementations, the media clip system 106 provides options to easily add a content item in the personalized search results 1308 to be added to a media clip library of a user account.

Moving to the next figure, FIG. 14 provides more detail regarding the media clip system 106 tuning and utilizing a media clip classification machine-learning model to recommend content items in accordance with one or more embodiments. In particular, FIG. 14 includes a series of acts 1400 performed by the media clip system 106 for providing search results.

As shown, the series of acts 1400 includes an act 1410 of receiving a search query and a similarity parameter. For instance, the media clip system 106 provides an interactive interface 1412 that enables the media clip system 106 to receive user input from a user account with respect to searching for content items and/or media clips.

As shown, the interactive interface 1412 includes a search term section 1414, a media clip selection section 1416, and a similarity scale section 1418. In one or more implementations, the search term section 1414 facilitates user-provided search terms (i.e., query terms). In some implementations, the media clip selection section 1416 facilitates the selection of a target media clip or content item, which also can serve as a search query for the media clip system 106. In some implementations, the media clip system 106 includes and/or utilizes both the search term section 1414 and the media clip selection section 1416 in the interactive interface 1412. In other implementations, the client device 102 includes and/or utilizes only one of the search query inputs.

In addition, the interactive interface 1412 includes the similarity scale section 1418. As shown, the similarity scale section 1418 includes a similarity scale that indicates how similar or dissimilar to make search results. Indeed, the similarity scale section 1418 can represent a relatedness range where the selected level can range from highly correlated to uncorrelated. In one or more embodiments the similarity scale 1418 can be a toggle that is more of a binary value, for example 1=similar and 0=dissimilar. Alternatively, and as illustrated in FIG. 14, the similarity scale 1418 can include a slider bar with which a user can interact to set a level of similarity between very similar to very dissimilar. To elaborate, when the media clip system 106 detects input moving the similarity metric (e.g., relatedness level) toward "Very Similar," the media clip system 106 attempts to identify content items and/or media clips that are increasingly related to media clips from the media clip collection of the user while also satisfying the search query. Similarly, when the similarity metric is moved toward "Very Dissimilar," the media clip system 106 attempts to identify content items and/or media clips that are increasingly different from the media clips in one or more media clip collections of the user account while still satisfying or matching the search query.

Based on the indicated level relatedness level, the media clip system 106 can modify how it searches for content items. To illustrate, the series of acts 1400 includes an act 1420 of tuning a media clip classification machine-learning model based on the similarity parameters (e.g., indicated relatedness level). For instance, in various implementations, the media clip system 106 tunes a media clip classification machine-learning model (or simply "classification model") to identify content items according to the indicated relatedness level and/or the content item metadata of media clips of the user account. In some implementations, the media clip system 106 pre-trains various parameter sets of the classification model for different related levels (e.g., similarity metric values).

Additionally, utilizing a tuned classification model, the media clip system 106 can apply the search query to identify appropriate content item results. To illustrate, the series of acts 1400 includes an act 1430 of identifying existing systems utilizing the tuned media clip classification machine-learning model. Indeed, in various implementations, the media clip system 106 provides the search term and/or target media clip (or target content item) from the interactive interface 1412 to the tuned classification model to identify one or more content items based on the search query while also identifying content items that either relate or do not relate to current media clips of the user account (e.g., based on the content item metadata of the media clips).

As shown, the series of acts 1400 includes an act 1440 of providing search results. In particular, for content item results that are similar to the media clips of a user account, the media clip system 106 can provide similar results 1442. For content item results that are dissimilar to the media clips of a user account, the media clip system 106 can provide dissimilar results 1444. Further, the media clip system 106 can provide a range of content item results in-between based on the relatedness level selected by the user account.

Indeed, in various implementations, the media clip system 106 facilitates a user to search for new content items that, while relevant, can widely and flexibly range from content items that match those of the user account's current media clip collection to content items that are vastly different from those of the user account's current media clip collection. In this manner, the media clip system 106 provides additional functionality not offered by existing systems when searching for and adding content items to a media clip collection of a user account.

The media clip system 106 can also provide additional functions with respect to media clips and contextual metadata that greatly benefit users. To illustrate, in various implementations, the media clip system 106 provides additional suggestions besides adding a content item to a media clip collection. For instance, in various implementations, the media clip system 106 utilizes contextual signals to determine that a user is filling out a form. Further, based on matching one or more of the contextual signals with contextual metadata of a media clip, the media clip system 106 can suggest populating the form with information from the media clip.

To elaborate, in various implementations, the media clip system 106 detects a user filling out a form requiring personal information, such as a driver's license number. Based on analyzing the contextual signals related to the form (e.g., an application-based signal), the media clip system 106 can identify a corresponding media clip, such as an image or scan picture of the user's driver's license. Further, in some instances, the media clip system 106 extracts the driver's license number from the media clip (if not previously extracted and stored as content item metadata) and suggests populating the form with the driver's license number.

Figure 15:
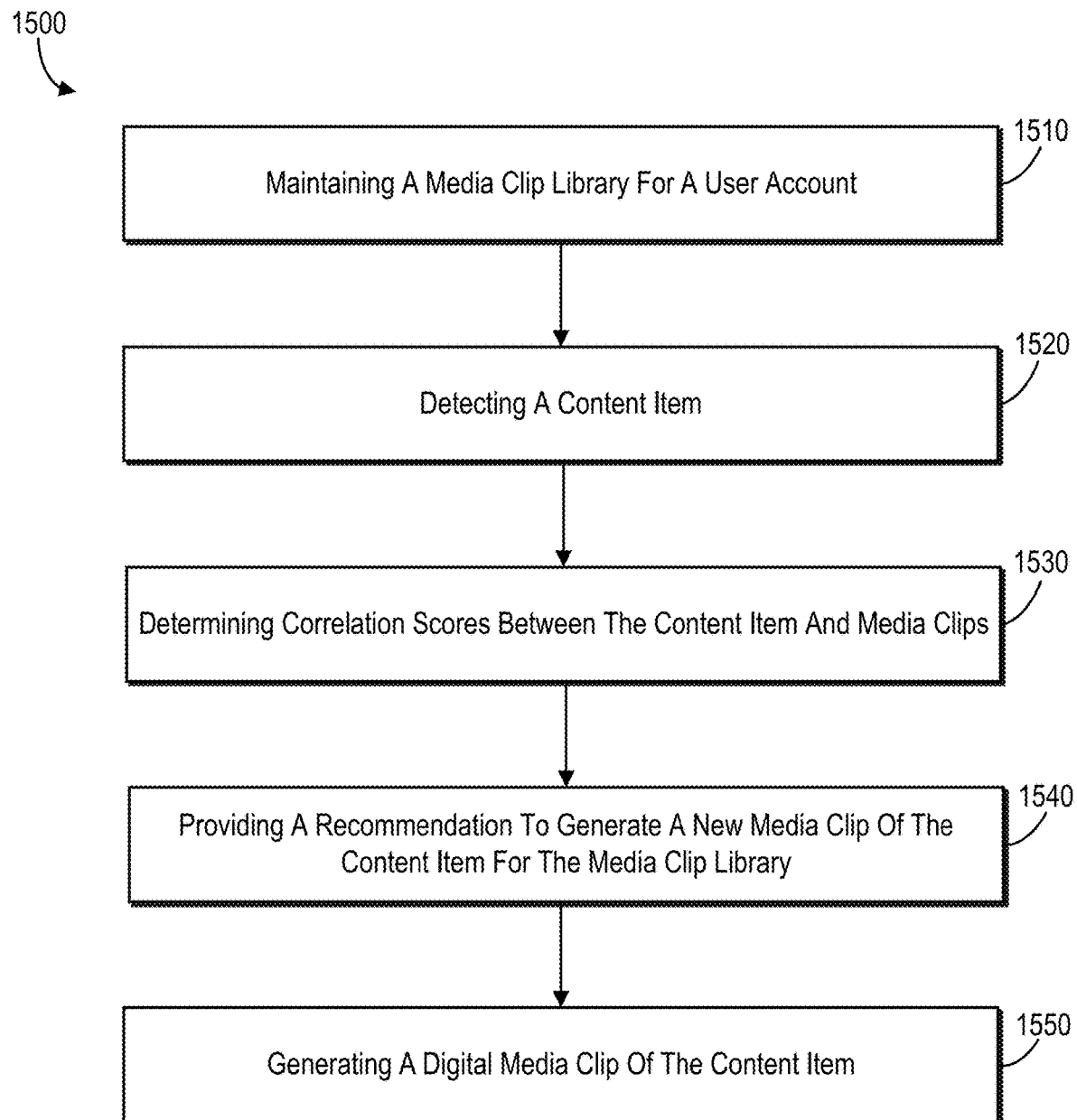
FIG. 15 illustrates a flowchart of a series of acts for recommending content items to add to a media clip library based on contextual metadata in accordance with one or more embodiments.

The preceding figures, the corresponding text, and the examples provide several different systems, methods, techniques, components, and/or devices of the digital media clip system 106 in accordance with one or more embodiments. In addition to the above description, one or more embodiments can also be described in terms of flowcharts including acts for accomplishing a particular result. For example, FIG. 15 illustrates flowcharts corresponding to the one or more implementations of the media clip system 106 described above. Moreover, the outlined acts in FIG. 15 are only provided as examples, and some of the acts may be optional, combined into fewer acts, or expanded into additional acts without detracting from the essence of the disclosed embodiments. Further, the acts described herein may be repeated or performed in parallel with one another or in parallel with different instances of the same or similar acts.

Additionally, the digital media clip system 106 may perform one or more acts of the series of acts in addition to or alternatively to one or more acts described in conjunction with other figures. While FIG. 15 illustrates acts according to one embodiment, alternative embodiments may omit, add to, reorder, and/or modify any of the acts shown. Further, each of the acts of FIG. 15 can be performed as part of a method. Alternatively, a non-transitory computer-readable medium can comprise instructions that, when executed by one or more processors, cause a computing device to perform the acts of FIG. 15. In some embodiments, a system can perform the acts of FIG. 15.

To illustrate, FIG. 15 includes a series of acts 1500 for recommending content items to add to a media clip library based on contextual metadata in accordance with one or more embodiments. As shown, the series of acts 1500 includes an act 1510 of maintaining a media clip library for a user account. For instance, the act 1510 can involve maintaining, for a user account of a content management system, a media clip library including digital media clips each having a content item, content metadata, and contextual metadata.

Additionally, the series of acts 1500 includes an act 1520 of detecting a content item. For instance, the act 1520 can involve detecting a content item not associated with the user account. In one or more implementations, the act 1520 can include identifying a plurality of content items not associated with the user account including the content item. In some implementations, the act 1520 can include identifying the plurality of content items from an additional media clip library (or media clip collection) of an additional user of the content management system.

The series of acts 1500 also includes an act 1530 of determining correlation scores between the content item and media clips. For instance, the act 1520 can involve determining correlation scores between the content item and one or more digital media clips within the media clip library. In one or more implementations, the act 1530 can include selecting the content item from the plurality of content items based on the correlation scores. In some implementations, the act 1530 can include determining a correlation between contextual metadata of the digital media clip and contextual metadata from a second media clip library of a second user account of the content management system. In various implementations, the act 1530 can include selecting the content item based on a correlation score for the content item satisfying a digital media clip suggestion threshold. In example implementations, the act 1530 can include determining a correlation between the content item and the one or more digital media clips of the media clip library by comparing contextual metadata related to the content item with contextual metadata of digital media clips within the media clip library.

Further, the series of acts 1500 includes an act 1540 of providing a recommendation to generate a new media clip of the content item for the media clip library. For instance, the act 1540 can involve providing a recommendation to generate a digital media clip of the content item for the media clip library based on the correlation scores. In various implementations, the act 1540 can include providing an additional recommendation to the second user account to add the digital media clip to a second media clip library associated with the second user account based on the correlation.

Moreover, the series of acts 1500 includes an act 1550 of generating a digital media clip of the content item. For instance, the act 1550 can involve generating a digital media clip of the content item based on receiving user confirmation of the recommendation. In various implementations, the act 1540 can include adding the digital media clip to the media clip library of the user account. In one or more implementations, the act 1540 can include adding a new digital media clip to the media clip library by generating the new digital media clip from the content item based on a correlation (e.g., a correlation score). In some implementations, the act 1540 can include capturing the content item, extracting content metadata from the content item, and generating contextual metadata from contextual signals corresponding to one or more digital environments in which the content item currently resides.

The series of acts 1500 can also include acts not included in FIG. 15. To illustrate, in various implementations, the series of acts 1500 includes additional acts of determining, for a digital media clip in the media clip library of the user account, that a copy of the digital media clip is located in a second media clip library of a second user account of the content management system; determining an additional correlation between an additional digital media clip in the second media clip library of the second user account and the digital media clip in the media clip library of the user account; and based on the additional correlation, providing a content item from the additional digital media clip within the second media clip library of the second user account to the user account as the content item.

In some implementations, the series of acts 1500 includes additional acts of identifying a plurality of content items not associated with the user account based on a search query; determining one or more implicit user preferences based on contextual metadata of digital media clips in the media clip library; filtering out the plurality of content items based on the one or more implicit user preferences to identify a subset of content items; and providing the subset of content items in response to the search query.

In one or more implementations, the series of acts 1500 includes additional acts of identifying a target digital media clip; receiving user input indicating a relatedness level ranging from highly correlated to uncorrelated; tuning parameters of a media clip classification machine-learning model based on the relatedness level; and identifying one or more content items utilizing the tuned media clip classification machine-learning model and the target digital media clip.

Canvas and Collections

As mentioned above, the content management system 110 facilitates the creation, management, utilization, publication, and presentation of media clip collections. As further provided below, the content management system 110 provides tools to generate media clip collections including adding suggested digital media clips, arranging media clip collections into various layouts, sharing media clip collections, as well as controlling accessing media clip collections via control lenses.

Figure 16:
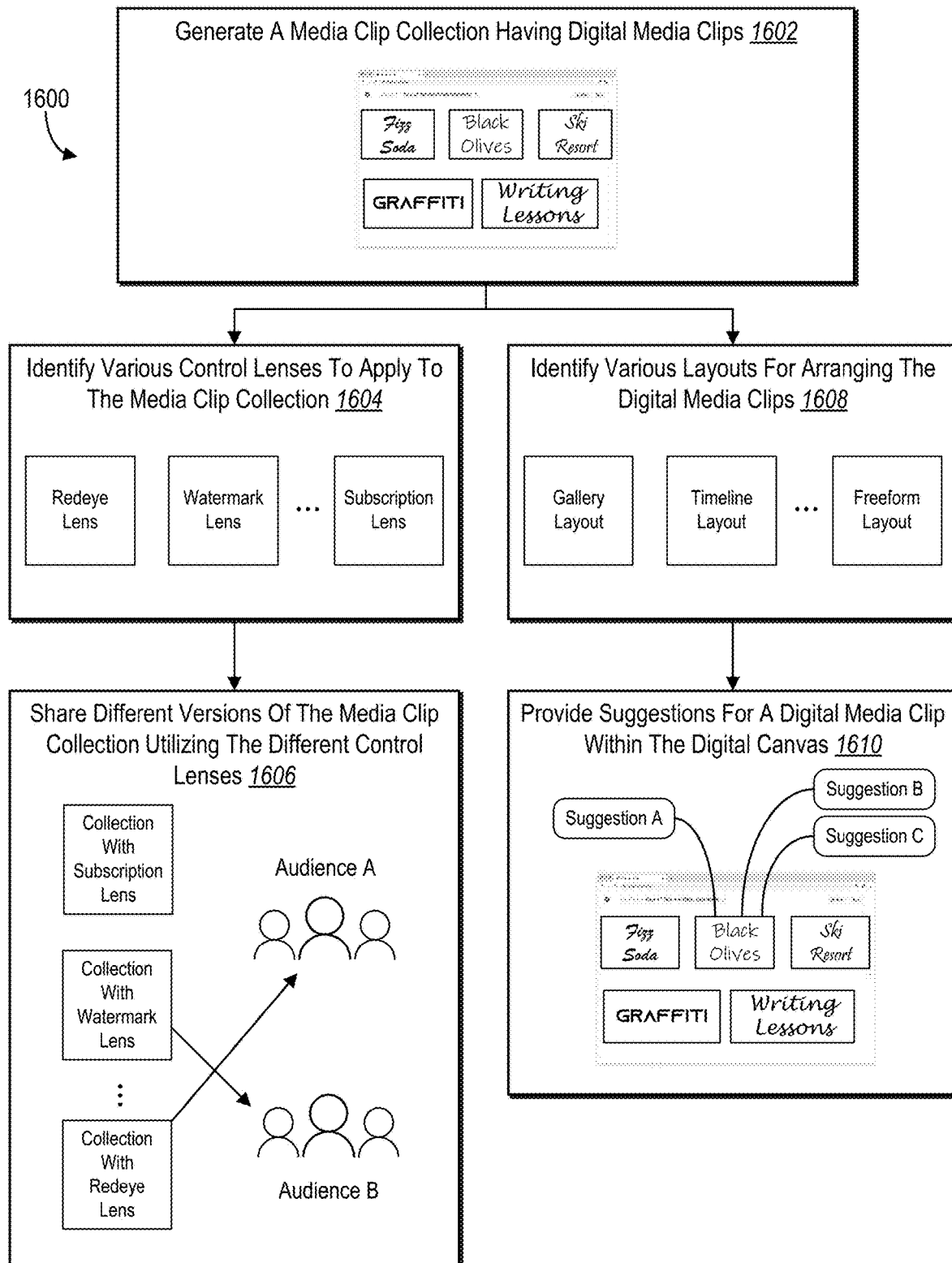
FIG. 16 illustrates an overview diagram of generating media clip collections with various control lenses and layout arrangements in accordance with one or more embodiments.

To illustrate, FIG. 16 shows an overview diagram of generating media clip collections with various control lenses and layout arrangements in accordance with one or more embodiments. In particular, FIG. 16 include a series of acts 1600 performed by the media clip system 106 for generating a media clip collection, utilizing the media clip collection, and providing the media clip collection to various audiences utilizing various control lenses and layout arrangements.

As shown in FIG. 16, the series of acts 1600 includes an act 1602 of generating a media clip collection having digital media clips. As noted above, in various implementations, the media clip system 106 enables a user account to generate media clips (i.e., digital media clips) from content items and add them to the media clip library of a user account. Additionally, in one or more implementations, the media clip system 106 enables a user account to generate a media clip collection from media clips in the media clip library. Additional detail regarding generating a media clip collection is provided below in connection with FIGS. 17A-17F.

As also shown, the series of acts 1600 includes an act 1604 of identifying various control lenses to apply to the media clip collection. For instance, in various implementations, the media clip system 106 provides several control lenses to apply to a media clip collection. In one or more implementations, a control lens changes the visual appearance of one or more of the media clips in a media clip collection, such as adding a watermark or a color filter. In some implementations, a control lens changes the access rights to the media clip collection, such as preventing viewing, sharing, or downloading media clips as well as enabling purchasing of media clips. In either case, while the media clip system 106 utilizes a control lens to modify the appearance or access of a media clip collection, the media clip system 106 keeps the original or underlying media clips in the media clip collection unchanged. Additional details regarding utilizing control lenses are provided in connection with FIGS. 20A-20C below.

As shown, the series of acts 1600 includes an act 1606 of sharing different versions of the media clip collection utilizing the different control lenses. For example, in various implementations, the media clip system 106 provides a media clip collection with the first set of control lenses to a first audience while providing the same media clip collection with a second set of control lenses to a second audience. In this manner, the two audiences experience the media clip collection differently as affected by the different control lens sets. Additional details regarding sharing media clip collections utilizing control lenses are provided below in connection with FIGS. 20A-20C.

As also shown, the series of acts 1600 includes an act 1608 of identifying various layouts for arranging the digital media clips. For instance, in various implementations, the media clip system 106 provides a number of layout arrangements for displaying a media clip collection. Examples of layout arrangements include a grid layout, a gallery layout, a timeline layout, and a freeform layout (e.g., a canvas layout) among other layout arrangements. Additional details regarding utilizing layout arrangements are provided in connection with FIGS. 19A-19C below.

As shown, the series of acts 1600 includes an act 1610 of providing suggestions for a digital media clip within the digital canvas. In various implementations, as media clips are added to a media clip collection, the media clip system 106 can utilize content item metadata to provide insights regarding the media clips as well as suggest related media clips. Additional details regarding the content management system providing suggestions for digital media clips are provided below in connection with FIGS. 17B-17D.

As mentioned above, FIGS. 17A-17F provide additional details regarding generating a media clip collection. In particular, FIGS. 17A-17F illustrate generating media clip collections in accordance with one or more embodiments. To illustrate, FIG. 17A includes an interactive interface 1700a on the client device 400 and is displayed within a graphical user interface 402, which are described above.

As shown, the interactive interface 1700a includes a media clip library 1702a and media clips 1706a, which are also described above. In some instances, the interactive interface 1700a is part of an application or is a short-term floating interface triggered by shortcut keys or a detected menu selection. In addition, the graphical user interface 402 also includes a digital canvas 1710a for generating a media clip collection. For instance, each of the media clips 1706a added to the digital canvas 1710a make up a media clip collection. In various implementations, media clip system 106 implements the digital canvas 1710a within an application 1708a, such as a native application on the client device 400 (e.g., a content management system application 104) or within a web browser application.

As also shown, the digital canvas 1710a includes a media clip collection title 1712a for labeling the media clip collection. In addition, the digital canvas 1710a includes one or more media clips 1716a. For instance, the media clip system 106 enables a user account to add one or more of the media clips 1706a from the media clip library 1702a within the interactive interface 1700a to the digital canvas 1710a. In many implementations, the media clip system 106 enables a user account to select and drag one of the media clips 1706a from the interactive interface 1700a to the digital canvas 1710a without leaving the digital canvas 1710a, switching interfaces, or without switching tabs (when the digital canvas 1710a is implemented in a web browser).

The media clip system 106 can enable a user account to organize the media clips 1716a within the digital canvas 1710a as needed. Various arrangements for organizing the media clips 1716a are provided below with respect to FIGS. 19A-19C. Further, in various implementations, the media clip system 106 can provide tools in connection with the digital canvas 1710a, such as a digital whiteboard, flowchart, note-taking, and other editing tools.

In one or more implementations, when adding a media clip to a media clip collection, the media clip system 106 adds a representative, symbolic, or placeholder media clip to a media clip collection (i.e., the media clips 1716a in the digital canvas 1710a are placeholder media clips of the media clips 1706a). Indeed, rather than duplicating a media clip, the media clip system 106 shows a placeholder of the media clip in a media clip collection while maintaining a single copy of the media clip within the media clip library (e.g., stored within a media clip database and/or another database). In this manner, a user account can have the same media clip in several media clip collections without requiring additional storage space on the client device 400 for each version or duplicates of the media clip.

Figure 17A:
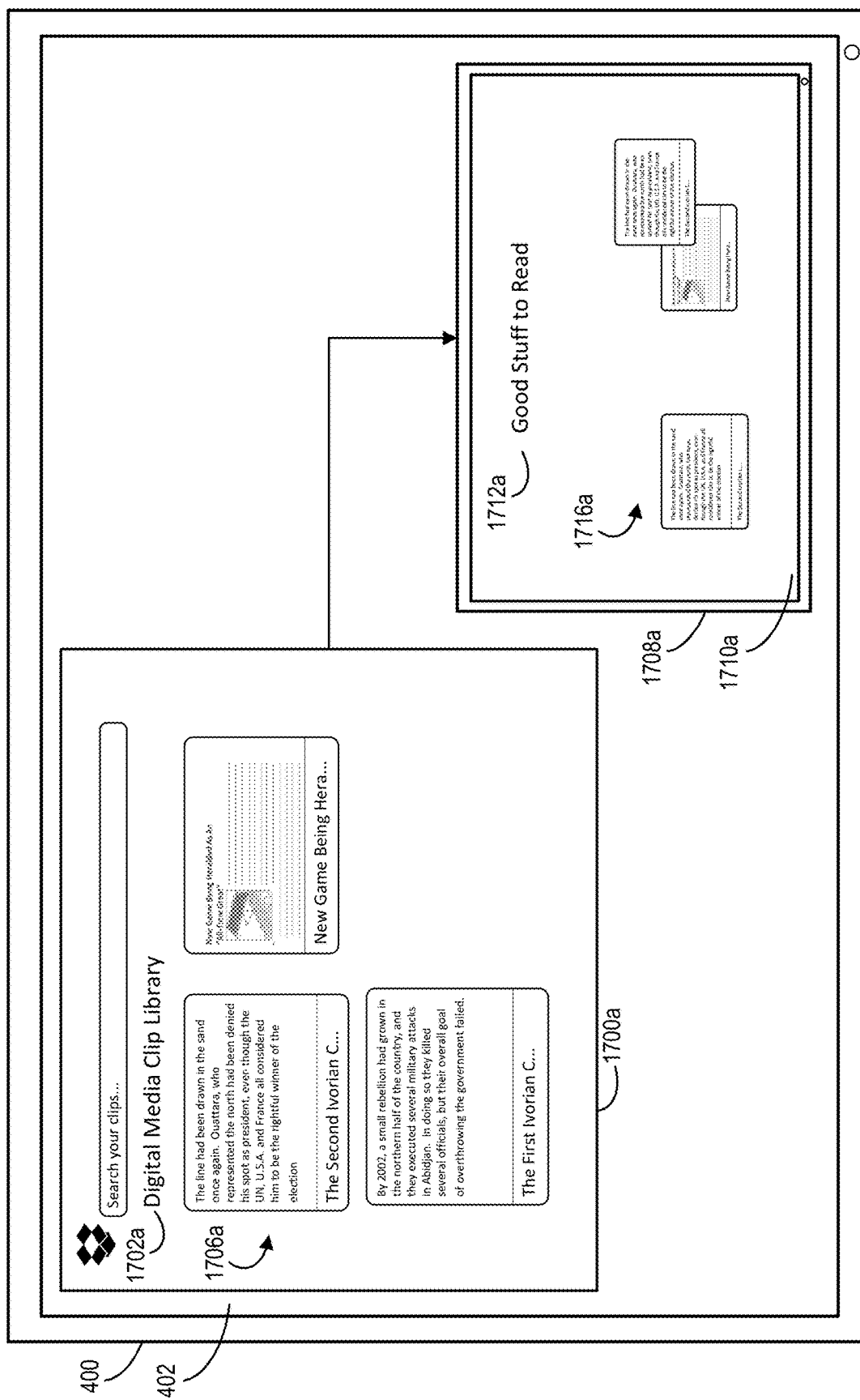
FIGS. 17A-17F illustrate generating media clip collections in accordance with one or more embodiments.
Figure 17B:
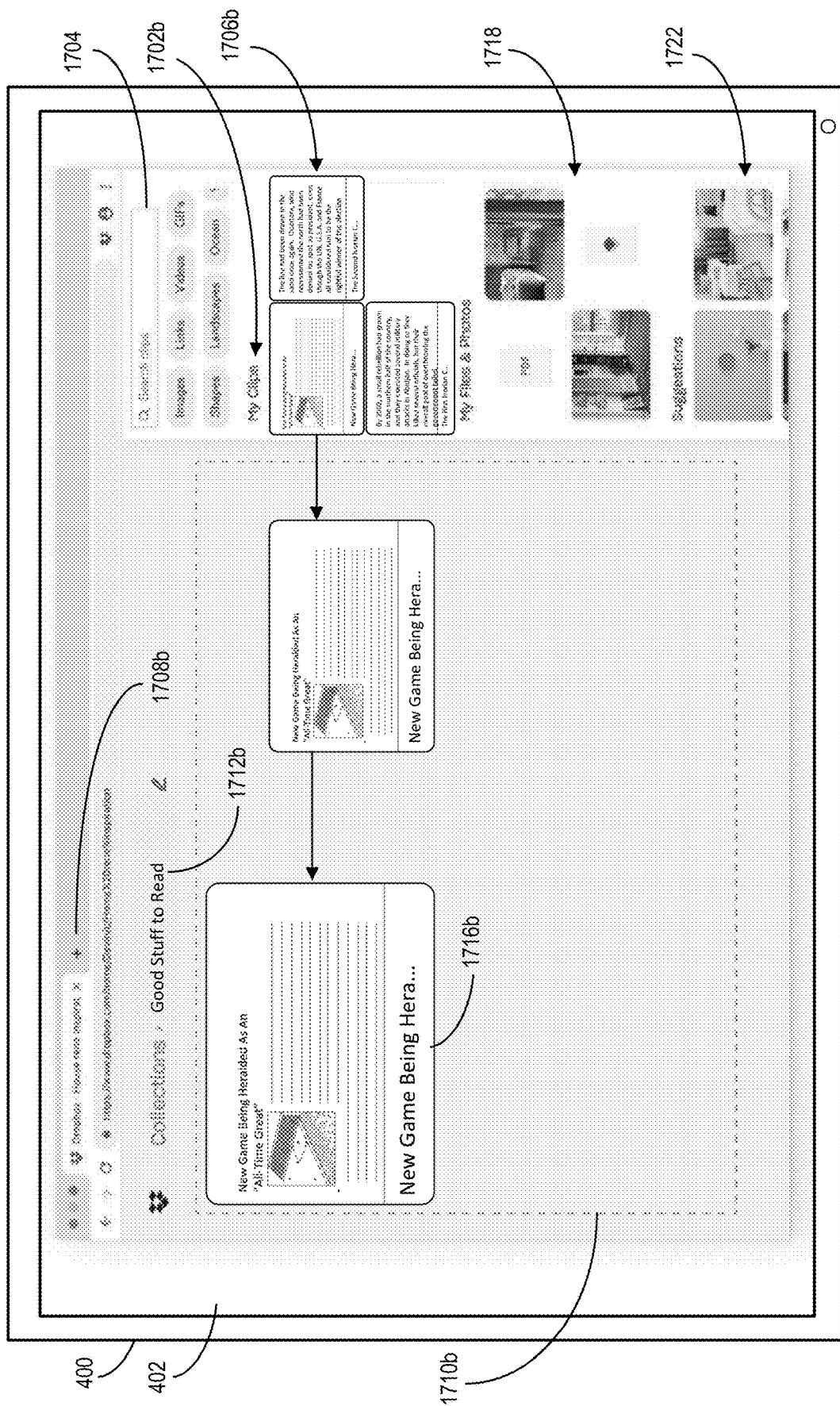
Figure 17C:
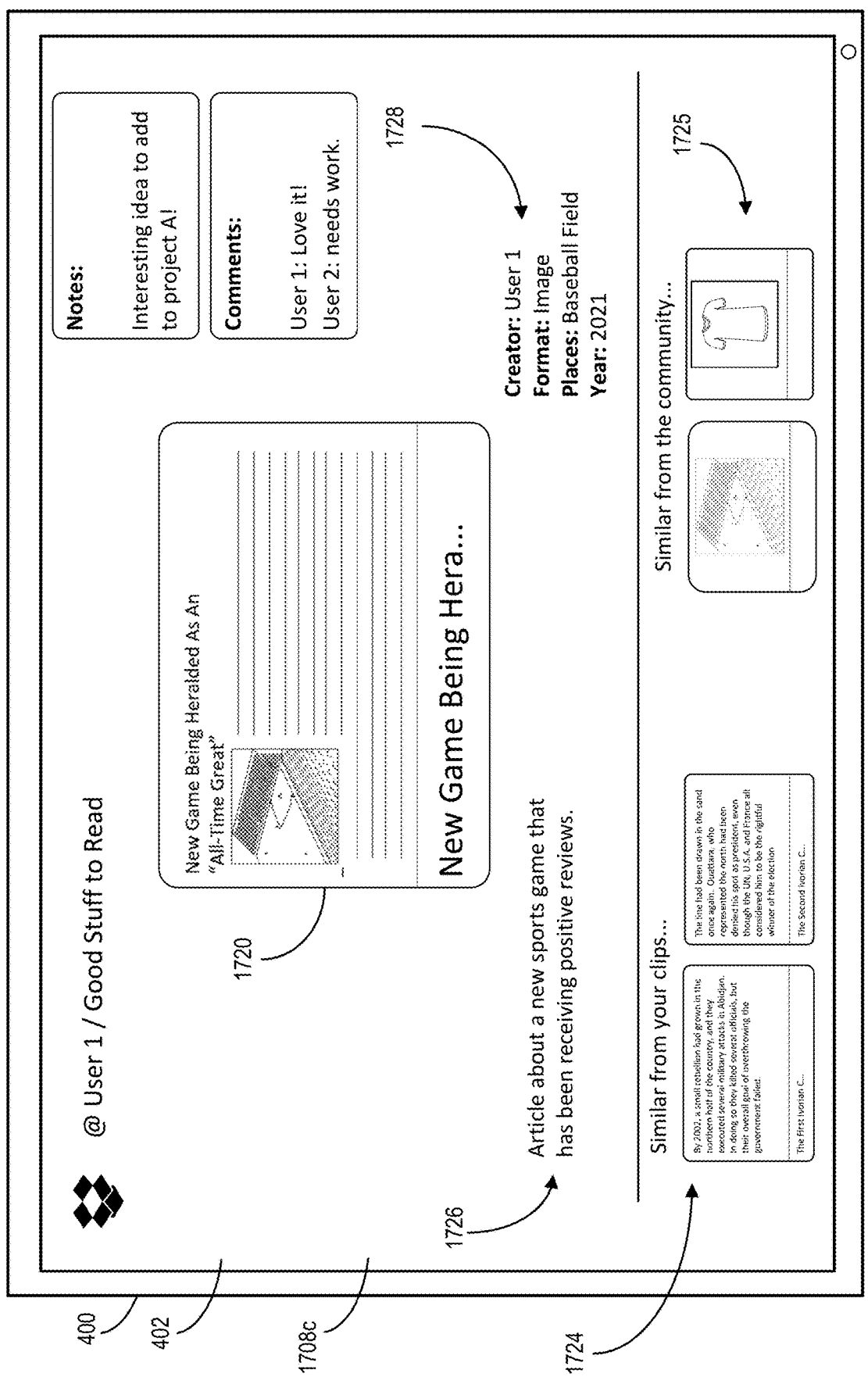

FIG. 17B illustrates another implantation of generating a media clip collection. As shown, FIG. 17B includes the client device 400 having the graphical user interface 402. As illustrated, the graphical user interface 402 includes a web browser application 1708b showing a digital canvas 1710b as well as a media clip collection title 1712b. In addition, the web browser application 1708b includes a side panel 1704 that includes a media clip library 1702b having media clips 1706b, files 1718, and suggested media clips 1722. In various implementations, the side panel 1704 is part of a web browser plugin that appears when its selection is detected.

As shown, the media clip system 106 facilitates a user account in building a media clip collection by moving one or more of the media clips 1706b to the digital canvas 1710b. For example, the media clip system 106 detects the user account adding a media clip from the media clip library 1702b to the digital canvas 1710b, shown as metadata 1716b. In this manner, the media clip system 106 facilitates the construction of a media clip collection from media clips in a user account's media clip library.

In various implementations, the media clip system 106 provides additional tools for generating a media clip collection. For example, the side panel 1704 includes tools for searching or filtering media clips. Also, as introduced above, the side panel 1704 includes files 1718 as well as suggested media clips 1722 (which are described in the next figure). In various implementations, a media clip collection can include files in addition to media clips. Files can include documents, images, texts, videos, and other stored data on the client device 400 (or stored remotely) that are not included in the media clip library of the user account or of another user account of the content management system. Indeed, a media clip collection flexibly enables files and media clips to be viewed together in a dynamic and seamless manner.

While FIG. 17B illustrates a desktop embodiment of a graphical user interface 402, the media clip system 106 can also provide mobile graphical user interfaces. For example, in one or more embodiments, the media clip system 106 can provide a graphical user interface comprising a mobile share sheet for display on a mobile device (e.g., smart phone). The mobile share sheet can include an area within a graphical user interface within which a user can drag and drop a content item to store and/or share the content time via a collection, as described in detail herein. For example, the media clip system 106 can provide an area within which a user can clip a content item (e.g., an image) from a webpage, for example, and drag the clipped content item to the area and drop the content item within the area. Upon dropping the content item within the share sheet, the content item is saved to a collection with the content management system.

As noted above, in various implementations, the media clip system 106 can provide suggestions for media clips. To illustrate, FIG. 17C shows a media clip 1720 within an application 1708*c* (e.g., a web browser). In one or more implementations, the media clip 1720 is part of a media clip collection, such as a media clip recently added to a media clip collection as described above. In alternative implementations, the media clip 1720 is a media clip selected from a media clip library of a user account. In either case, as shown in FIG. 17C, the media clip system 106 updates the application 1708*c* to focus on the media clip 1720.

As shown, the application 1708*c* includes the media clip 1720, a title of the media clip 1720, a media clip description 1726, and a displayed media clip metadata 1728. In various implementations, the media clip description 1726 includes a brief description of the media clip 1720 and can include a user-provided description, information obtained from the content metadata and/or contextual metadata, and/or information automatically generated based on the media clip. Similarly, the displayed media clip metadata 1728 can show various metadata elements from the content item metadata of the media clip (e.g., the content metadata and/or the contextual metadata). Moreover, and while not shown, the media clip metadata 1728 can include a link to the original source of the media clip 1729. For example, the link could be to a document within the content management system or a link to webpage from which the media clip 1729 was captured. As shown, the displayed media clip metadata 1728 shows the creator, place, format, and year of the media clip 1720. In various implementations, the metadata elements shown in the displayed media clip metadata 1728 are based on the format (e.g., filetype) of the media clip being provided.

In some implementations, the media clip description 1726 displays insights. For example, the media clip system 106 utilizes a machine-learning model and/or other analytics to discover a less common genre, category, typeface, or another topic regarding a media clip (e.g., "the aesthetic in this clip is called 80's grunge" or "this typeface is called gothic bold"). Further, in one or more implementations, the media clip system 106 provides follow-up actions on the suggestions, such as adding a note to the media clip or initiating a search based on the insight. In example implementations, the media clip system 106 provides insights in other locations, such as a popup interface that appears when a media clip is added or the user account interacts with the media clip (e.g., within a digital canvas and/or media clip collection).

As shown, the application 1708*c* also includes sections for similar media clips 1724 and suggested media clip description 1726. In various implementations, the media clip system 106 identifies the similar media clips 1724 by searching through the media clip library of the user account. Additionally, the media clip system 106 can search through the media clip libraries of other user accounts in the content management system, including publicly shared media clip libraries as well as user accounts that have granted the user account permission to connect and provides clips from a community 1725, as illustrated in FIG. 17C.

In one or more implementations, the media clip system 106 determines similar media clips by comparing content item metadata between the media clip 1720 and other media clips. For example, as described above, the media clip system 106 compares the content metadata and/or contextual metadata of the media clip 1720 to similar metadata of other media clips to determine a correlation score. Then, in various instances, the media clip system 106 provides the highest-ranked media clips within the application 1708*c* as suggested similar media clips, as shown. In various implementations, the media clip system 106 detects the selection of a suggested media clip and enables a user account to add the suggested media clip to their media clip library and/or a media clip collection.

As further illustrated in FIG. 17C, the graphical user interface can include a notes section and a comments section. For example, upon a user adding the media clip 1720 to the collection, the media clip system 106 may provide a notes section to allow the user to enter a note along with saving the media clip 1720. Accordingly, when the media clip system 106 provides access to the media clip 1720 to a client device, the media clip system 106 can provide the note that was originally saved when the user clipped the media clip 1720. Moreover, as further indicated in FIG. 17C, the graphical user interface 402 can include a comments section that displays comments from various users with whom the media clip 1720 is shared. In this way, by simply clipping an item, the media clip system 106 generates a collaborative environment to allow users to view, comment, and use the media clip 1720.

Figure 17D:
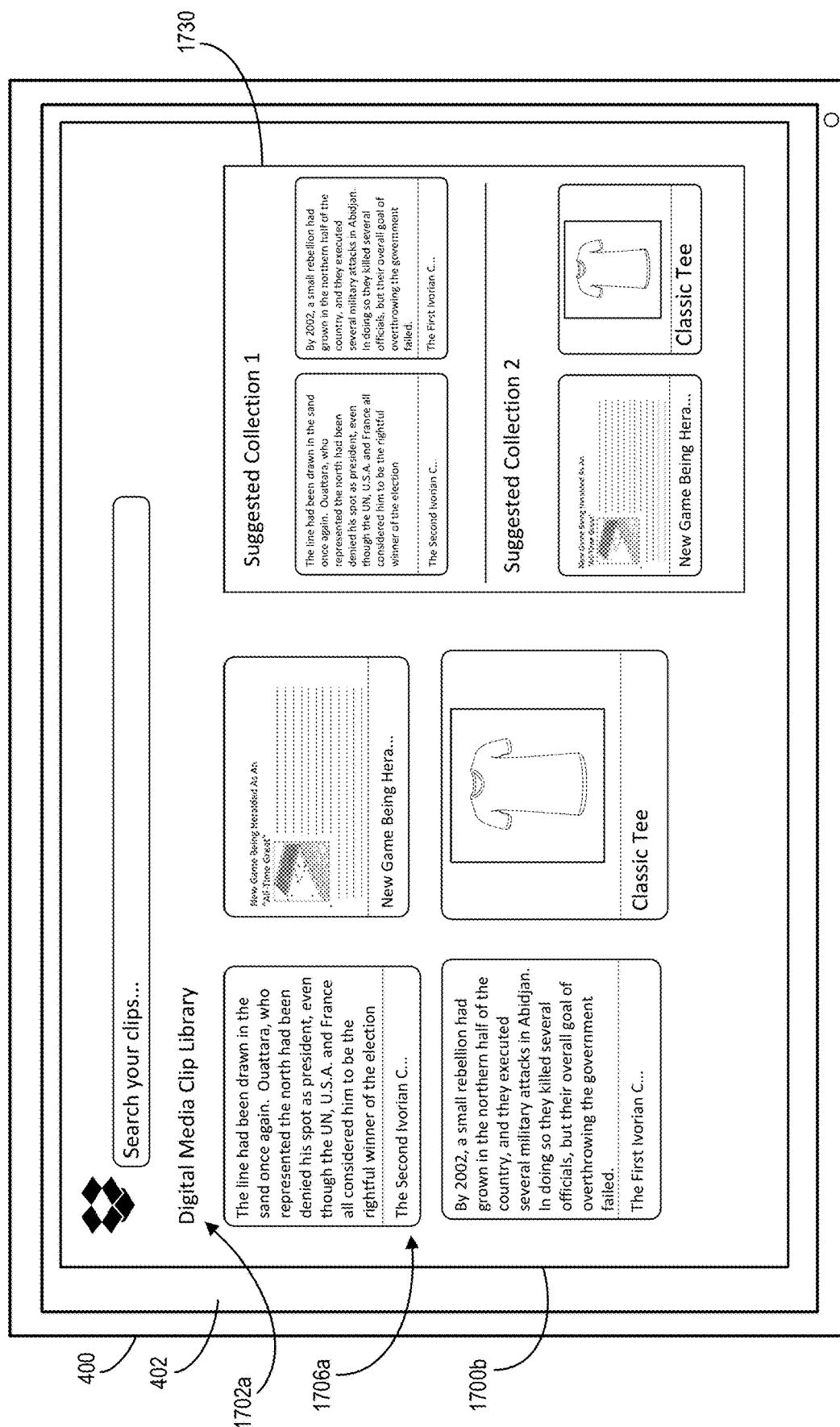

In addition to providing suggested media clips, in various implementations, the media clip system 106 can suggest media clip collections from media clips in the media clip library of a user account. To illustrate, FIG. FIG. 17D shows the media clip system 106 suggesting multiple suggested media clip collections. As shown, FIG. 17D includes an interactive interface 1700*b*, which includes the media clip library 1702*a* and the media clips 1706*a*. The interactive interface 1700*b* also includes suggested media clip collections 1730. For instance, the content management system 110 updates the interactive interface 1700*a* from FIG. 17A by adding the suggested media clip collections 1730 to display the interactive interface 1700*b*, as shown in FIG. 17D.

In various implementations, the media clip system 106 generates a suggested media clip collection based on determining correspondences between the content item metadata of media clips within a media clip library of a user account. For example, the media clip system 106 determines a group of media clips that share similar combinations of contextual signals and/or contextual metadata, which reveal combinations not otherwise revealed. In some implementations, the media clip system 106 utilizes a machine-learning model (e.g., a media clip classification machine-learning model) to generate an embedding space of media clips, and the media clip system 106 generates a suggested media clip collection by clustering media clip embeddings within the embedding space.

As shown, in various implementations, the media clip system 106 provides the suggested media clip collections 1730 to a user account within the interactive interface 1700*b*. In some implementations, the media clip system 106 otherwise provides one or more suggested media clip collections 1730 to a user account. In response, a user account can choose to keep or disregard a suggested media clip collection. For instance, in response to providing suggested media clip collection, the media clip system 106 detects a user interaction adding the media clip collection to their user account.

Figure 17E:
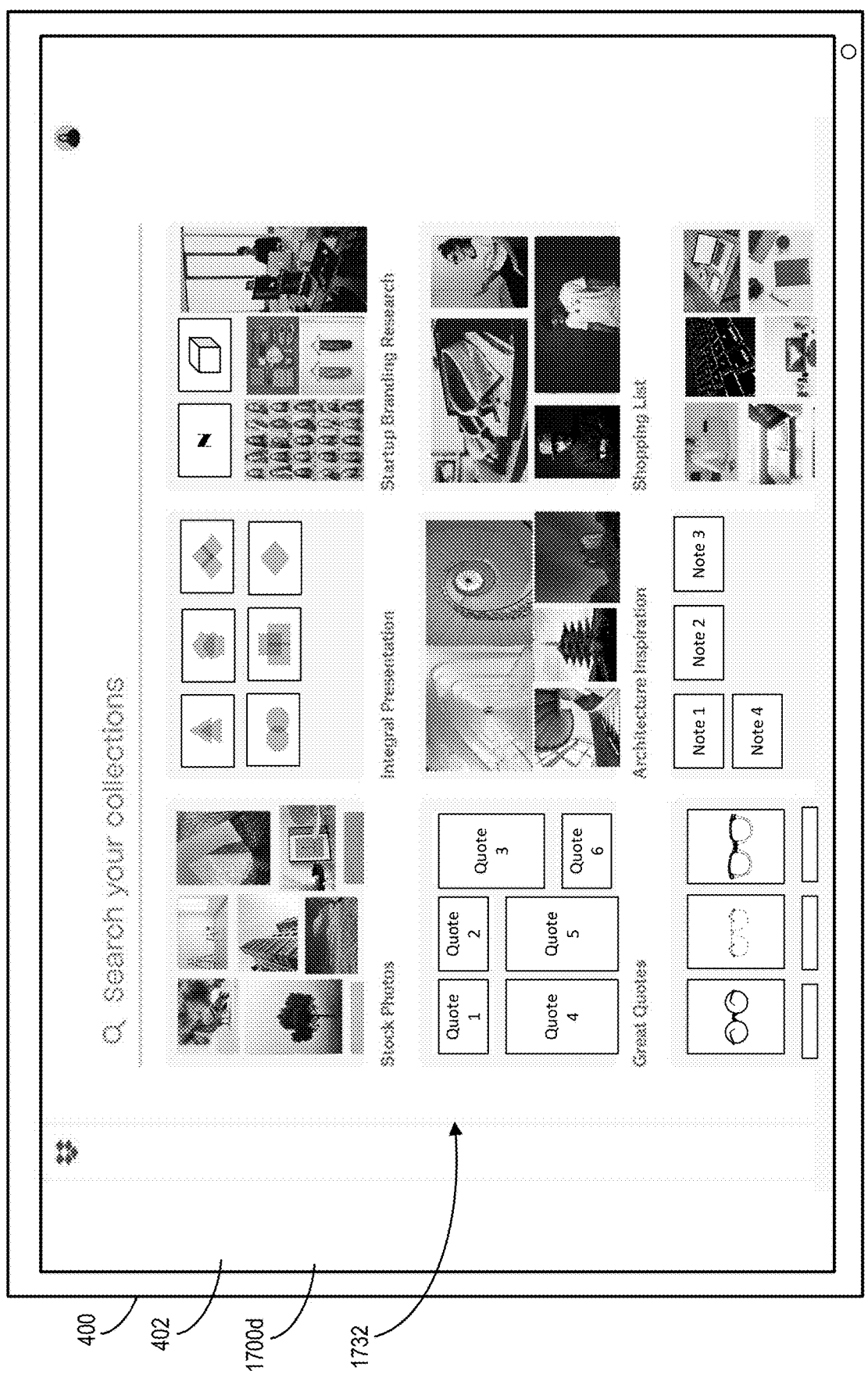

To illustrate, in various implementations, the media clip system 106 provides a display of multiple media clip collections. For example, FIG. 17E illustrates the client device 400 having a graphical user interface 402 that shows an interactive interface 1700*d*. In addition, the interactive interface 1700*d* shows a digital media collection library 1732 that includes multiple media clip collections. In various implementations, the media clip system 106 provides tools for searching through the media collection library 1732 as well as modifying, copying, removing, sharing, and/or otherwise managing media clip collections associated with a user account. As can be seen in FIG. 17E, the media clip collections provide a display of a wide assortment of different file types and media items visualized together in a single graphical user representation of a collection.

In some implementations, a media clip collection can include another media clip collection. For example, the media clip system 106 embeds a media clip collection (or a representation of a media clip collection) within another media clip collection. In some implementations, the media clip system 106 allows for media clip collections to be grouped with other media clip collections, such as work grounds and personal groups.

Figure 17F:
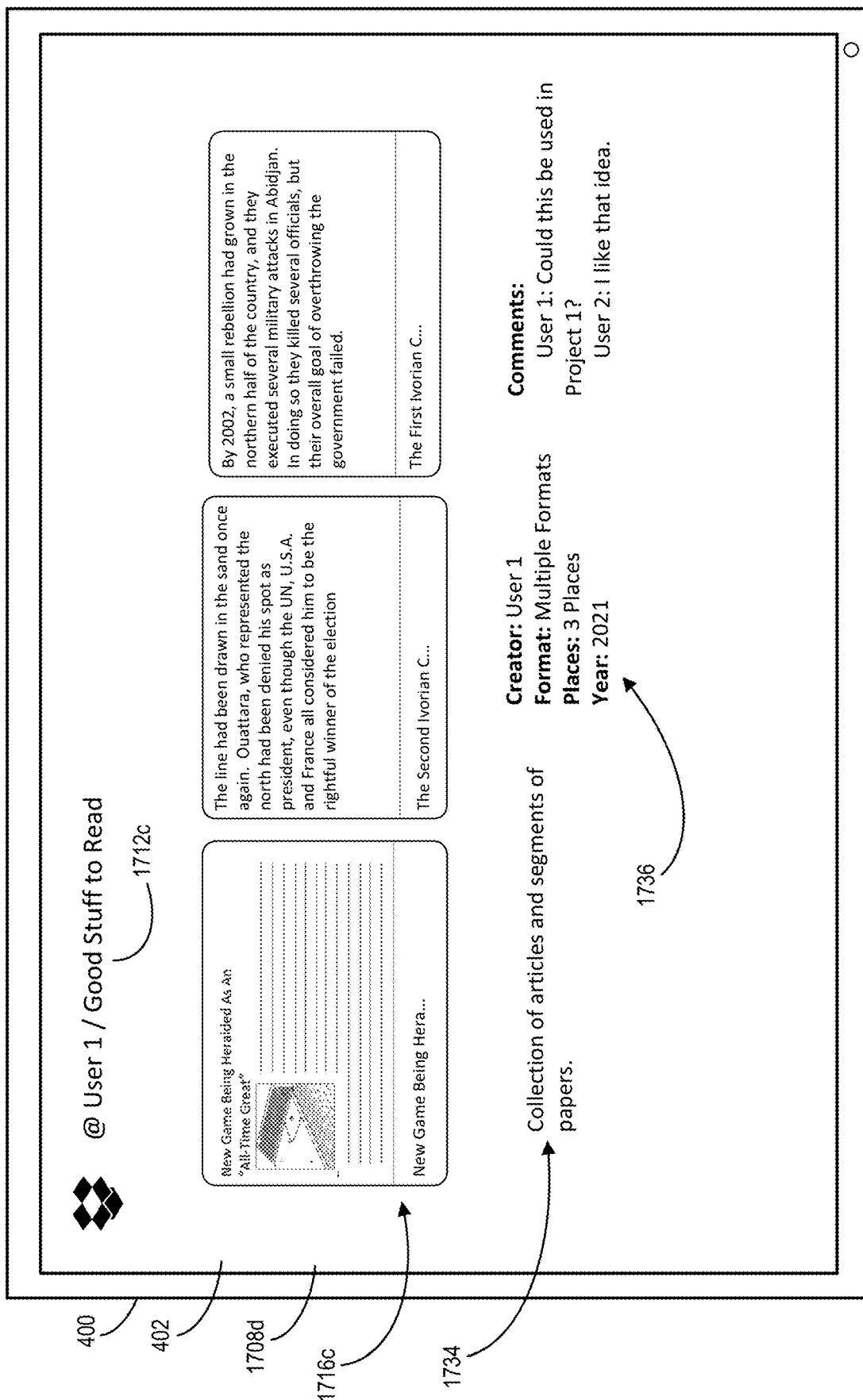

In addition, the media clip system 106 can provide additional detail for individual media clip collections. To illustrate, FIG. 17F shows the media clip system 106 displaying a digital media collection. As shown, FIG. 17F includes the client device 400 having a graphical user interface 402 that includes an application 1708*d*. As noted above, the application 1708*d* can represent an application native to the client device 400 or a web browser application. In some implementations, the media clip system 106 replaces one or more of the applications shown with the interactive interface previously described.

As shown, the application 1708*d* includes a media clip collection title 1712*c*, media clips 1716*c*, media clip collection description 1734, and metadata 1736. In various implementations, the media clips 1716*c* are included as part of a digital canvas that enables a user to modify the media clips within the media clip collection.

In one or more implementations, the media clip collection description 1734 provides a brief description of the media clip collection. For instance, the media clip system 106 automatically generates one or more lines of text that encapsulate the media clips included in the media clip collection. For example, the media clip system 106 utilizes a machine-learning model or other summary generation model to process the content item metadata of the media clips within the media clip collection and generates the media clip collection description 1734.

Similarly, in various implementations, the media clip system 106 compiles and provides the metadata 1736 in connection with the media clip collection. In some implementations, the metadata 1736 includes similar metadata elements as the displayed media clip metadata 1728 described above in FIG. 17C but is an aggregate of some or all of the media clips within the media clip collection. For example, the metadata 1736 shows the multiple formats of media clips and/or files included in a media clip collection. Moreover, and as illustrated in FIG. 17F, the graphical user interface 402 can include a comments section that allows users to comment on the content of the collection to enable user collaboration within the collection.

As mentioned above, in various implementations, the media clip system 106 can add both media clips and files to a media clip collection. In some instances, the media clip system 106 can also add a stacked digital media clip (or simply a "stacked media clip"). In various implementations, the media clip system 106 generates a stacked media clip 1802 by binding a set of digital media clips in a defined presentation order. Additional detail regarding stacked media clips is provided with respect to FIGS. 18A-18B.

Figure 18A:
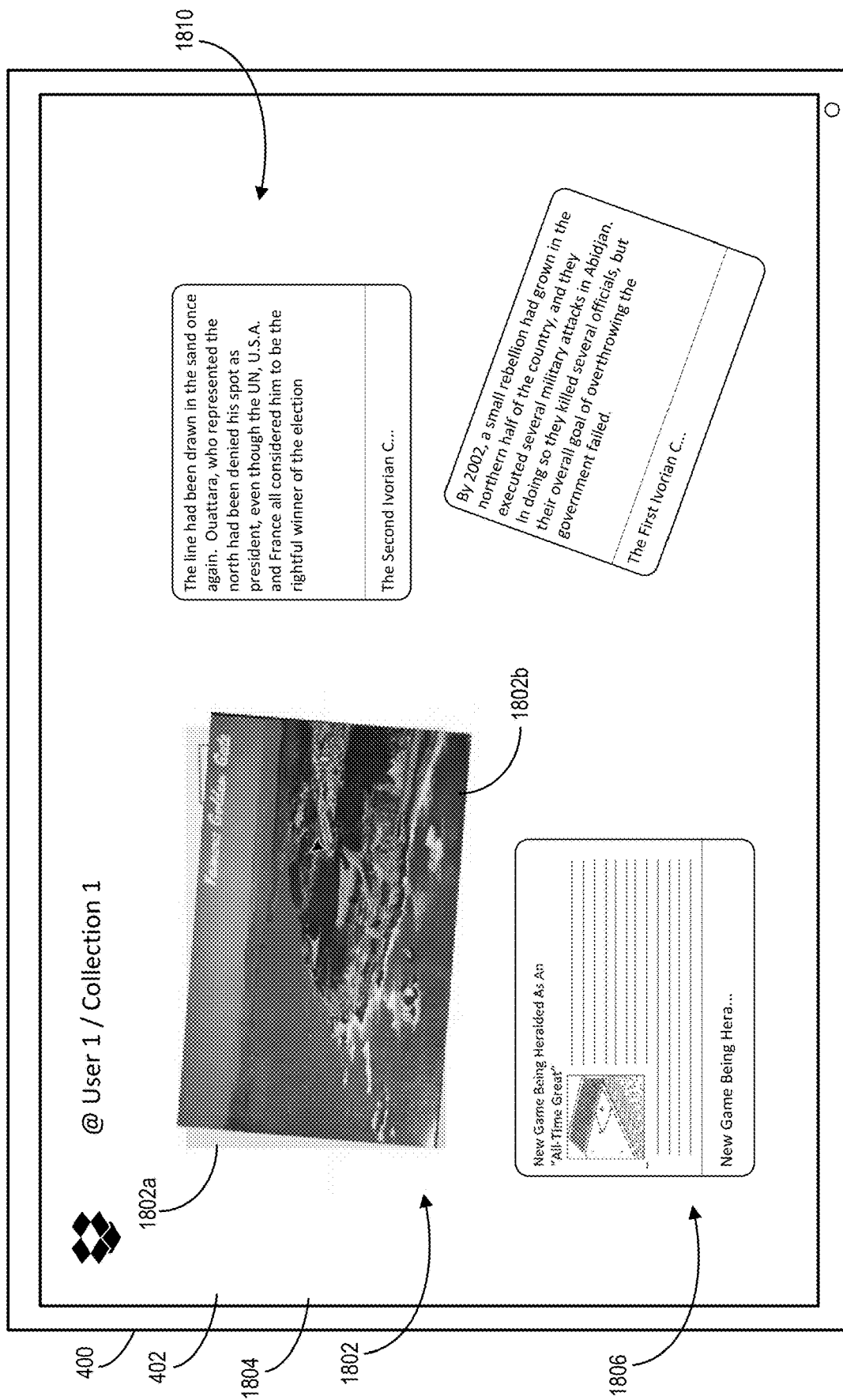
FIGS. 18A-18B illustrate utilizing a stacked digital media clip in accordance with one or more embodiments.
Figure 18B:
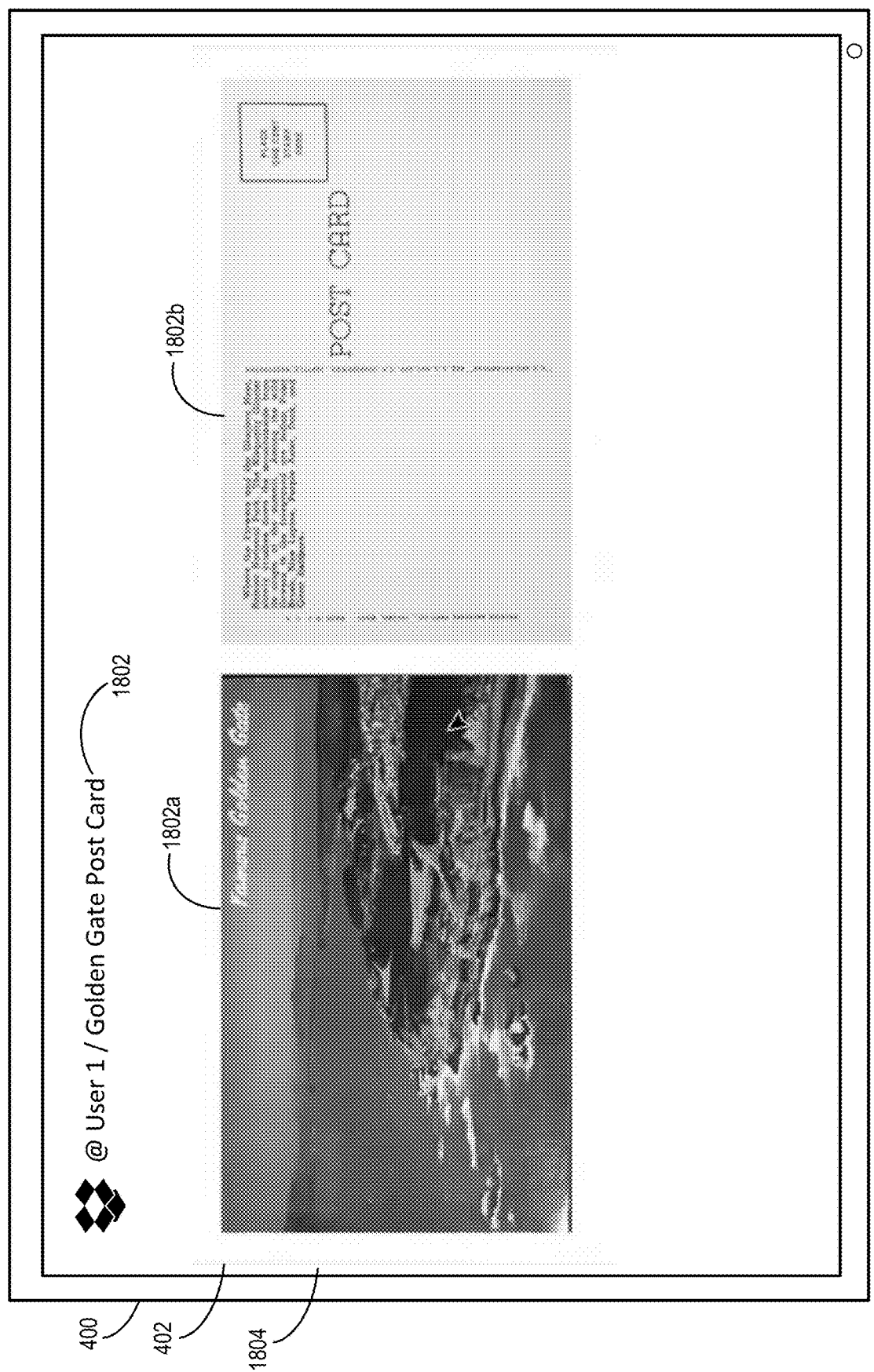

To illustrate, FIGS. 18A-18B show a stacked media clip in accordance with one or more embodiments. As shown, both FIGS. 18A-18B include the client device 400 having a graphical user interface 402, as introduced above. Additionally, both FIGS. 18A-18B include an application 1804, shown as a web browser. However, in other implementations, the application 1804 is a native app and/or the interactive interface, described above.

As shown, FIG. 18A shows a media clip collection 1810 that includes media clips 1806 including a stacked media clip 1802. In particular, the stacked media clip 1802 includes a first stacked media clip 1802*a* and a second stacked media clip 1802*b*. While the stacked media clip 1802 in the media clip collection 1810 shows two media clips joined or bonded together, the media clip system 106 can generate a stacked media clip that includes more than two media clips. Indeed, the media clip system 106 can detect the selection of multiple media clips along with a request to generate a stacked media clip from the media clips. In additional implementations, the media clip system 106 also receives the presentation order of the media clips in the stacked media clip.

In various implementations, because the first stacked media clip 1802*a* and the second stacked media clip 1802*b* are joined into the stacked media clip 1802, the media clip system 106 displays the stacked media clip 1802 as a single entity within a media clip collection. In various implementations, the media clip system 106 does not show a first stacked media clip within a stacked media clip without showing at least a portion of a second stacked media clip. In this manner, a stacked media clip signals that two or more media clips are designated to travel and be presented together as a single entity. Often, by generating and utilizing a stacked media clip, the media clip system 106 can provide better context to a viewer or system than either media clip could provide by itself. In some implementations, rather than showing at least a portion of each media clip in a stacked media clip, the media clip system 106 indicates that a media clip collection is a stacked media clip that includes multiple joined, bonded, or otherwise linked media clip when displayed within a media clip collection.

In various implementations, a stacked media clip includes a predefined presentation order and/or arrangement. To illustrate, FIG. 18B shows the application 1804 updating from showing the media clip collection 1810 to showing the stacked media clip 1802. In particular, the application 1804 shows the first stacked media clip 1802*a* and the second stacked media clip 1802*b* as separate media clips. In some implementations, the application 1804 also includes additional elements, such as a media clip description, displayed media clip metadata, similar media clips, and suggested media clips, as described above.

As shown, the media clip system 106 arranges the first stacked media clip 1802*a* first (on the left) and the second stacked media clip 1802*b* second (on the right). In various implementations, the media clip system 106 maintains this presentation order when displaying the first stacked media clip 1802a and the second stacked media clip 1802b as separate, but joined, media clips. In alternative implementations, the media clip system 106 presents the media clips within a stacked media clip in different orders or arrangements.

In some implementations, the media clip system 106 generates the stacked media clip 1802 by creating a media clip collection of the first stacked media clip 1802a and the second stacked media clip 1802b. For example, the media clip system 106 adds the first stacked media clip 1802a and the second stacked media clip 1802b to a media clip collection. In addition, the media clip system 106 applies a layout arrangement and/or control lens that locks the presentation order of the media clips within the media clip collection (as further discussed below). Further, the media clip system 106 adds the stacked media clip/media clip collection to another media clip collection and ensures that each of the media clips within the stacked media clip is at least partially visible within the other media clip collection.

As mentioned above, the media clip system 106 can apply various layouts to a media clip collection. For instance, the media clip system 106 can generate and/or provide an assortment of layout arrangements for viewing, editing, displaying, and/or presenting a media clip collection. To elaborate, FIGS. 19A-19C illustrate various layout arrangements of a media clip collection in accordance with one or more embodiments.

Figure 19A:
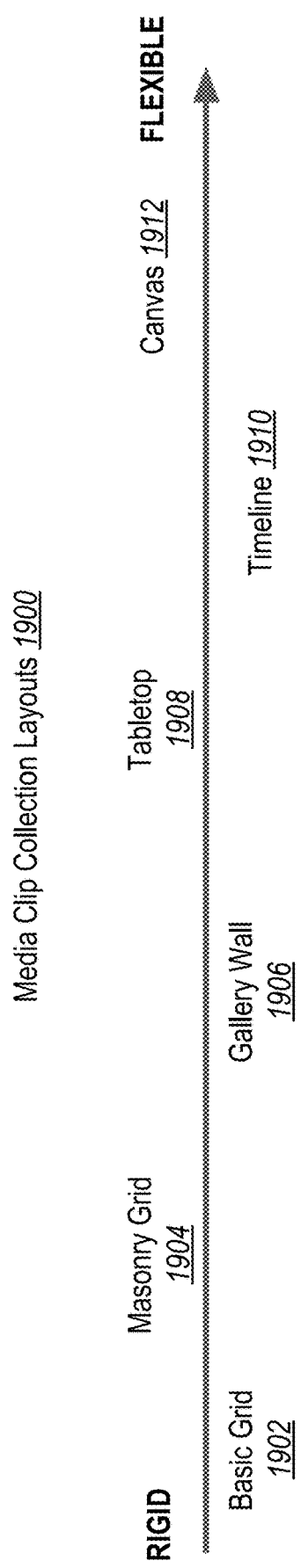
FIGS. 19A-19C illustrate utilizing various layout arrangements of a media clip collection in accordance with one or more embodiments.
Figure 19B:
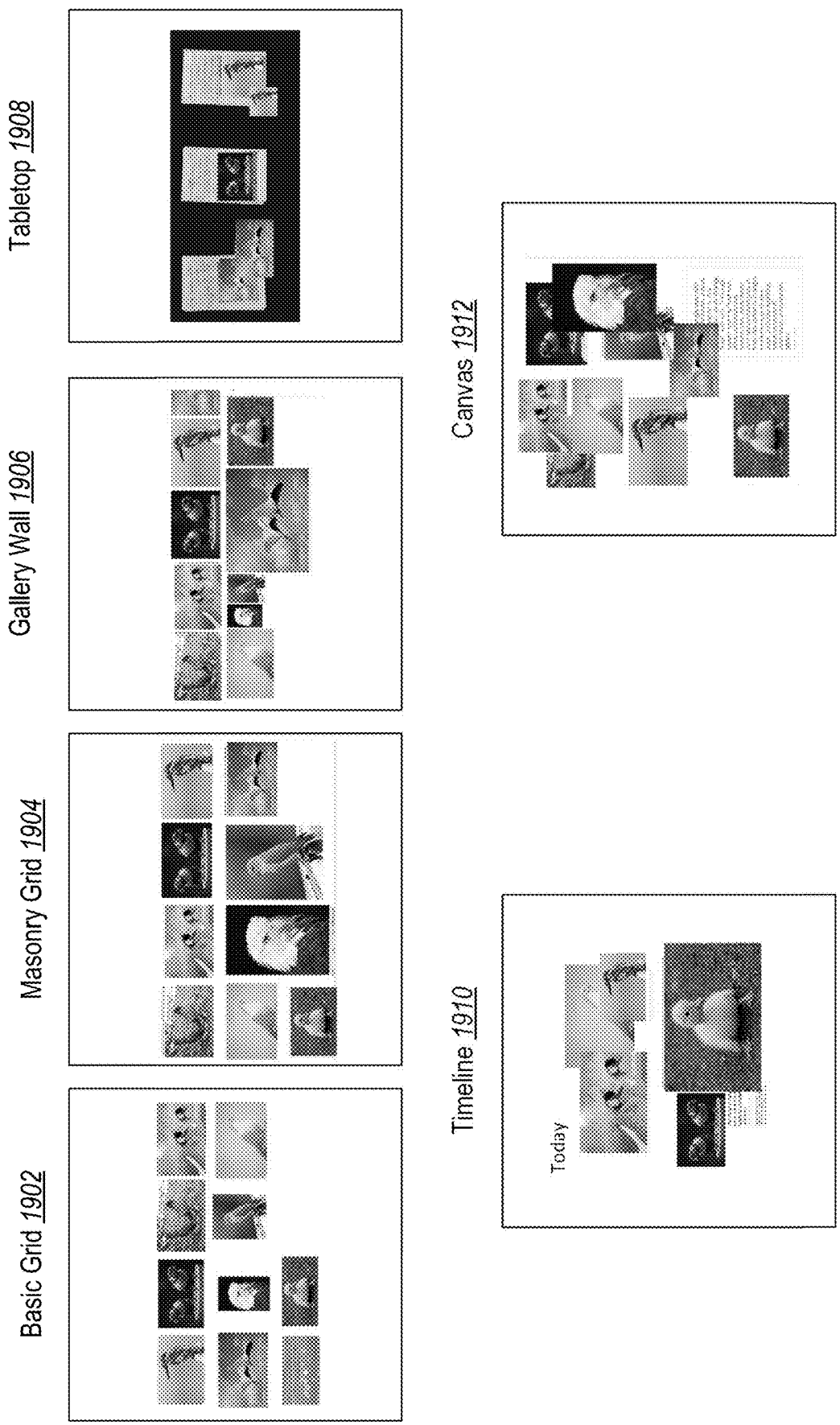
Figure 19C:
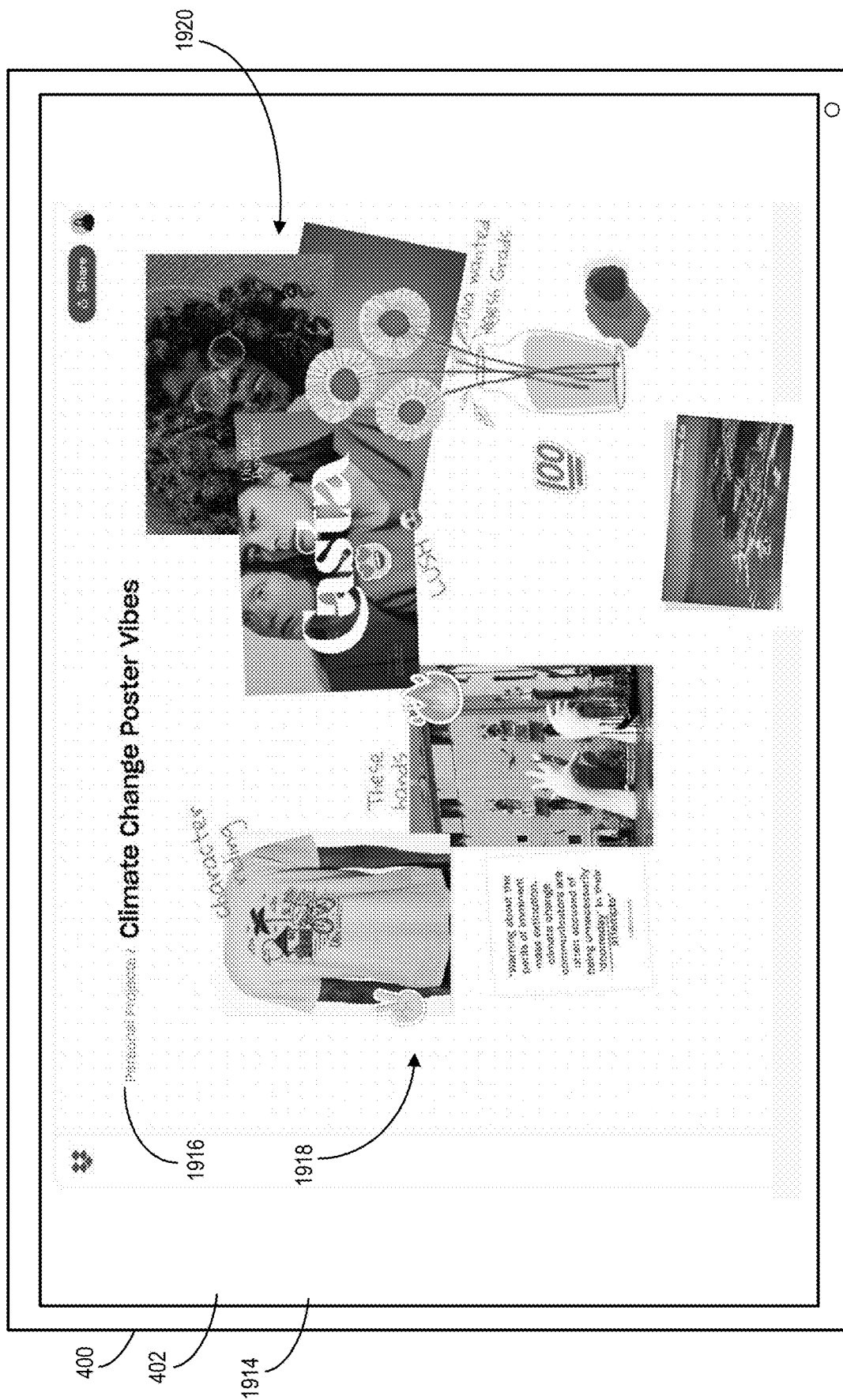

As shown, FIG. 19A shows an overview of various media clip collection layouts 1900. In particular, the various media clip collection layouts 1900 range from rigid (left) to flexible (right) layout arrangements. For example, the various media clip collection layouts 1900 include a basic grid layout 1902, a masonry grid layout 1904, a gallery wall layout 1906, a tabletop layout 1908, a timeline layout 1910, and a canvas layout 1912 (aka a freeform layout). While not shown, the various media clip collection layouts 1900 can include other layouts, such as a column layout, a hub-and-spoke layout, a flow layout, etc.

As illustrated, the various media clip collection layouts 1900 provide a variety of layout arrangement options for organizing media clips within a media clip collection. Each of the layout arrangements is further detailed below in FIG. 19B. For instance, FIG. 19B shows visual example layout arrangements of a media clip collection having media clips. While not shown, in some instances, the media clip collection can also include files and stacked media clips in addition to the media clips.

As shown, the media clip system 106 can provide the basic grid layout 1902. In various implementations, the basic grid layout 1902 provides a rigid structure for organizing media clips within a media clip collection. In some implementations, the media clip system 106 provides the masonry grid layout 1904. As shown, the masonry grid layout 1904 provides additional flexibility over the basic grid layout 1902 by allowing various media clips to expand into multiple grid spaces (or portions of a grid space). For example, in some implementations, the masonry grid layout 1904 allows a media clip to expand to 1×1.5 (width×height) grid spaces, as shown. In various implementations, the masonry grid layout 1904 allows a media clip to expand to 2×2 or 2×3 grid spaces. Indeed, the masonry grid layout 1904 can allow media clips to chart the architecture of a basic grid while allowing for additional flexibility to accommodate different shape media clips and/or emphasize more important media clips.

In addition, FIG. 19B shows the gallery wall layout 1906. In various implementations, the gallery wall layout 1906 provides for a set presentation of media clips within a media clip collection. For example, the gallery wall layout 1906 can define the order in which media clips are presented, such as enforcing scrolling or viewing media clips from left to right. As shown, the gallery wall layout 1906 can allow for multiple rows of media clips while still enforcing navigational constraints. In some implementations, the gallery wall layout 1906 enables a user account to have a single row of media clips.

As shown, the various media clip collection layouts 1900 include the tabletop layout 1908. In various implementations, the tabletop layout 1908 enables media clips, files, and stacked media clips to be arranged spatially while still roughly preserving a grid architecture. In many instances, the tabletop layout 1908 allows for groups or clusters of media clips (media clips can cluster and overlap within a media clip collection, which is different from a stacked media clip) to be presented in an orderly, editorialized manner.

Additionally, FIG. 19B shows the timeline layout 1910. In example implementations, the timeline layout 1910 provides a time-delineated arrangement of media clips. For example, the media clip system 106 groups media clips by date and time added to the media clip collection. In some implementations, the media clip system 106 utilizes the time added to the media clip library, the time a media clip collection was created, or another time determined from the content item metadata of the media clips in the media clip collection. In some implementations, the media clip system 106 partitions the timeline layout 1910 by a time delineation, such as hour, day, month, year, etc.

Further, FIG. 19B includes the canvas layout 1912, also called the freeform layout. As shown, the canvas layout 1912 provides a flexible freeform arrangement that allows for customized placement of media clips within a media clip collection. For example, under the canvas layout 1912, a user account may create various groups and clusters of media clips together as needed. Additional detail regarding the canvas layout 1912 is provided below with respect to FIG. 19C.

FIG. 19C shows the canvas layout 1912 of a media clip collection 1916 having media clips 1918. As shown, the media clip system 106 presents the media clip collection 1916 within an interactive interface 1914, which is further described above. In alternative implementations, the media clip system 106 presents the media clip collection 1916 within an application and/or a web browser.

As shown, the media clip collection 1916 is arranged in the canvas layout 1912 on a digital canvas. Accordingly, the media clips 1918 in the media clip collection 1916 are not arranged in a grid pattern or architecture but in a freeform arrangement. Further, the media clip collection 1916 includes additional media clip types such as notes (e.g., handwritten notes) and emoji stickers that are clustered to various media clips within the media clip collection 1916. In addition, the media clip collection 1916 includes a stacked media clip 1920.

In one or more implementations, the canvas layout 1912 (and other layout arrangements) can dynamically update a digital canvas to accommodate media clips as more media clips are added to the media clip collection. For example, in some implementations, the media clip system 106 dynamically expands the size of the digital canvas to accommodate additional media clips or when media clips are moved around (e.g., expand the edge of the canvas layout 1912 as media clips are placed near it). Similarly, as media clips are consolidated and/or removed, the media clip system 106 can efficiently shrink the size of the digital canvas. Moreover, because media clips in a media clip collection are often placeholders (e.g., media clips are stored outside of the digital canvas), the media clip system 106 can dynamically expand a digital canvas to large areas and sizes while keeping resource consumption at a client device low.

Further, in various implementations, the media clip system 106 utilizes the canvas layout 1912 as an interactive medium to support a user account in building their media clip collection. For example, the media clip system 106 can provide suggestions as media clips are added or interacted with within the canvas layout 1912, as further described below. Indeed, the media clip system 106 can imbue the canvas layout 1912 with dynamic intelligence that facilitates ingesting media clips and files and providing proactive suggestions that guide the creative journey of the user account.

In addition to providing layout arrangements for media clip collection, the media clip system 106 can also provide control lenses to media clip collection that change the appearance and/or the access to a media clip collection without modifying the digital media clips within the media clip collection. To illustrate, FIGS. 20A-20C illustrate utilizing various control lenses in accordance with one or more embodiments.

Figure 20A:
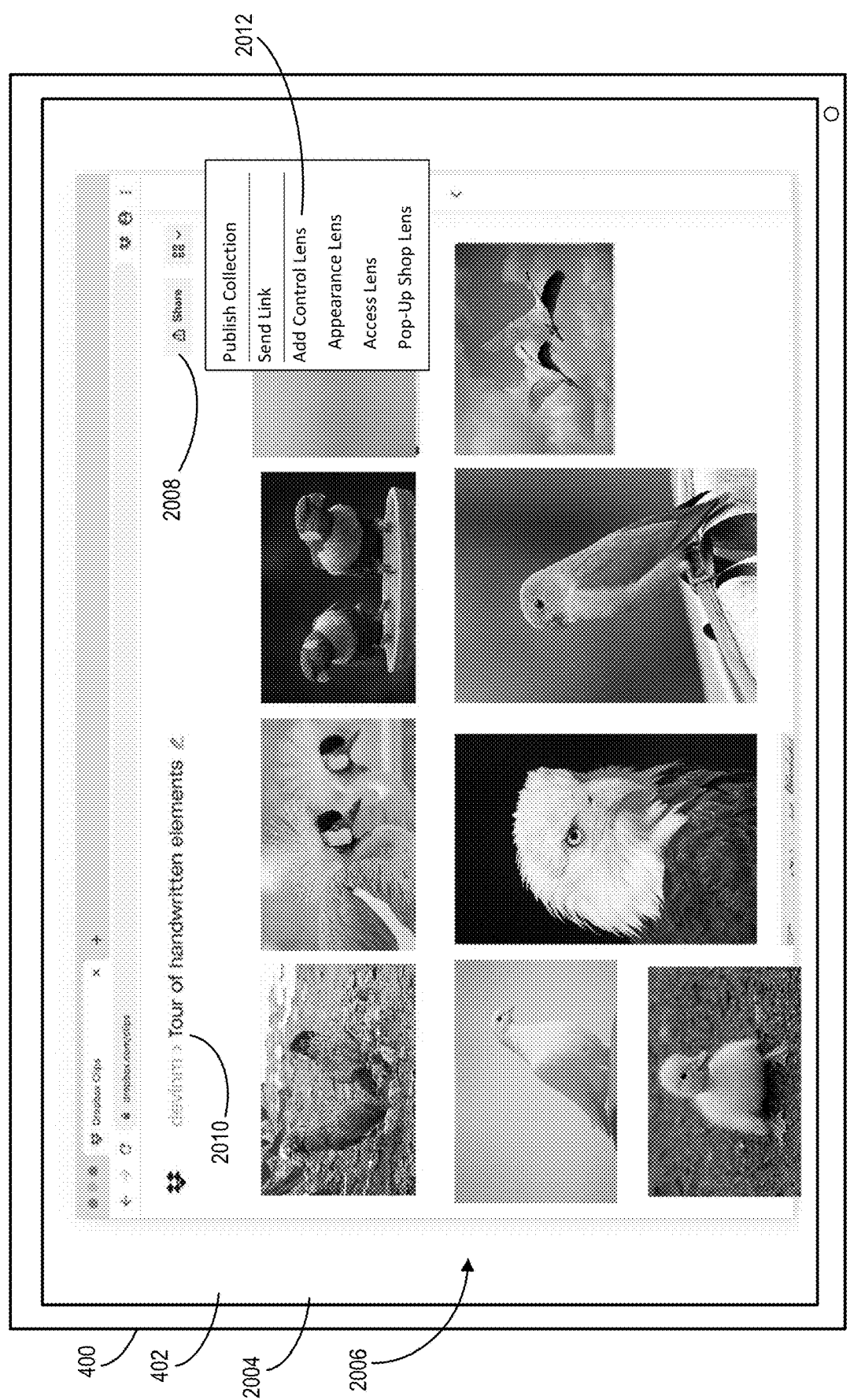
FIGS. 20A-20C illustrate utilizing various control lenses in accordance with one or more embodiments.
Figure 20B:
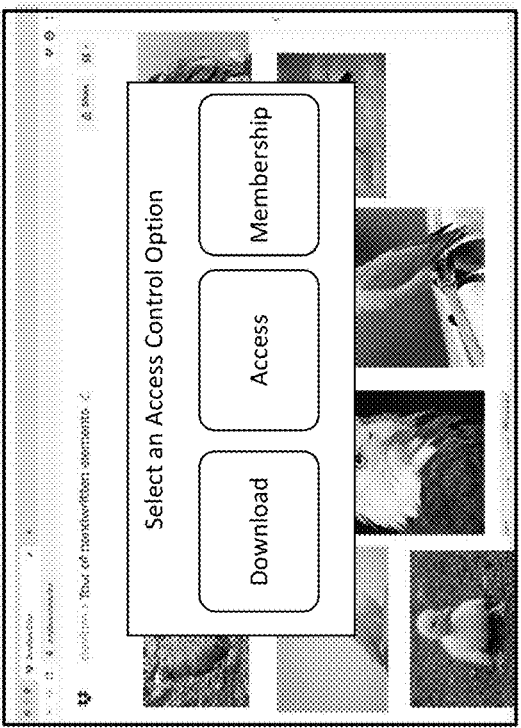
Figure 20B:
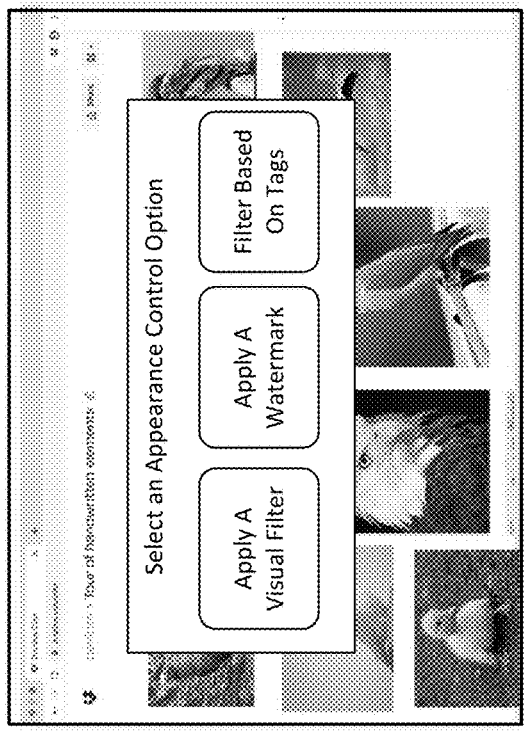
Figure 20B:
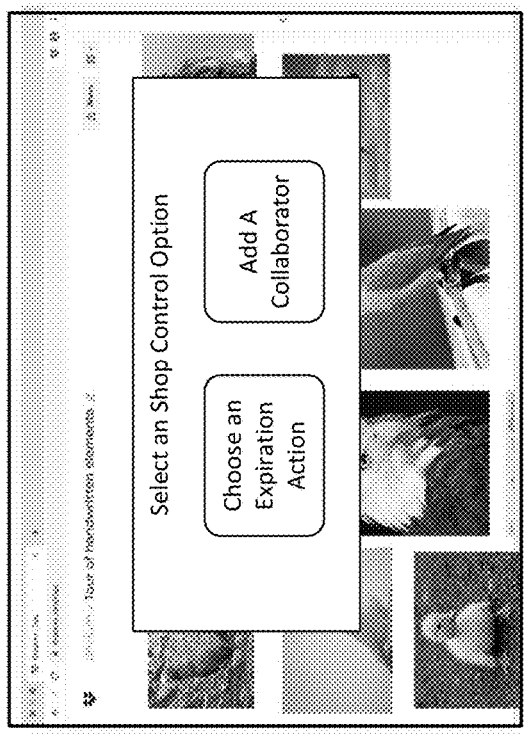
Figure 20C:
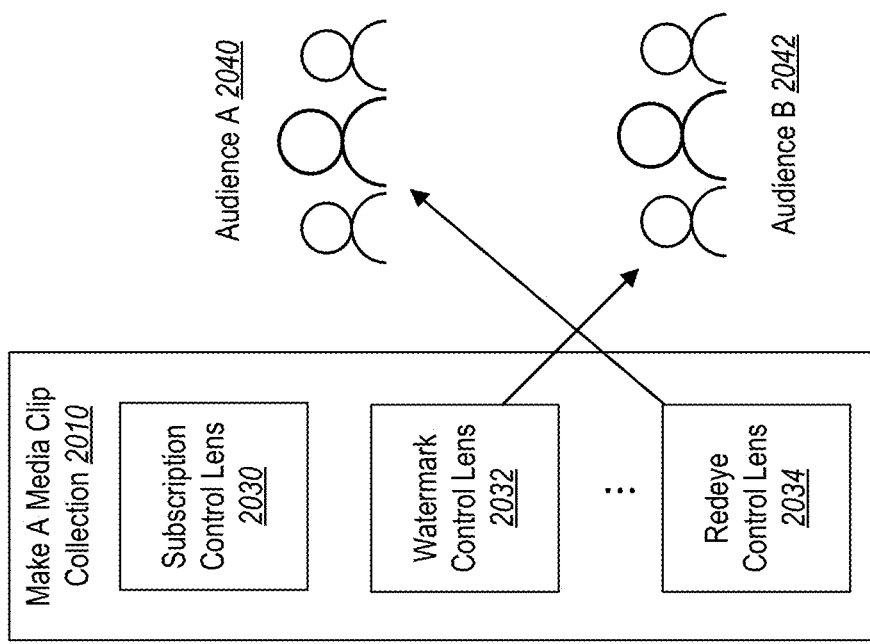

In particular, FIG. 20A includes the client device 400 and the graphical user interface 402 displaying an application 2004, which includes media clips 2006 in a media clip collection 2010. As shown, the application 2004 also includes selectable elements including a sharing element 2008. In various implementations, upon detecting the selection of the sharing element 2008, the media clip system 106 provides various sharing options, such as publishing the media clip collection (discussed in FIG. 21 below), sending a link of the media clip collection, or adding a control lens to the media clip collection (e.g., via one or more control lens elements 2012).

In various implementations, the media clip system 106 generates a control lens to modify or change the visual appearance of one or more of the media clips in a media clip collection. For example, the media clip system 106 creates a control lens that adds a watermark or a color filter to media clips in a media clip collection. In some implementations, the content management system 110 generates a control lens to enforce access rights to a media clip collection. For instance, the media clip system 106 creates a control lens that restricts viewing, sharing, or downloading media clips in a media clip collection. In some instances, the media clip system 106 generates control lenses that relate to facilitating the purchase of media clips in a media clip collection.

To elaborate, the control lens elements 2012 show various control lens elements including an appearance control lens element, an access control lens element, and a pop-up shop control lens element. Upon detecting a selection of one of these or another control lens element, the media clip system 106 can apply the selected control lens element to the media clip collection 2010. Each of these control lens options is further discussed below with respect to FIG. 20B.

In some implementations, the media clip system 106 applies a control lens to a version of media clip collection (e.g., a placeholder copy) while preserving or maintaining the original media clip collection (and its media clips) as unchanged. To illustrate, in one or more implementations, the media clip system 106 adds a control lens by adding one or more layers or elements of metadata to the media clip collection 2010, which modifies the appearance and/or access to the media clip collection. Further, in some implementations, each control lens is stored in a separate metadata file and added to a media clip collection and/or media clips upon being presented. Accordingly, a first set of viewers that are provided the media clip collection with one or more control lenses applied have a different experience than a second set of viewers (e.g., the creator) that are provided the same media clip collection without any control lenses despite the media clip system 106 providing both sets of viewers the same media clip collection.

As mentioned above, FIG. 20B provides additional detail regarding the various control lens elements shown in the control lens elements 2012 of FIG. 20A. In particular, FIG. 20B shows expanded options for the appearance control lens 2020, the access control lens 2022, and the pop-up shop control lens 2024. For example, upon detecting selection of the access control lens element in the sharing element 2008 (or from another tool, menu, or command), the media clip system 106 provides the additional elements for the appearance control lens 2020, as shown in FIG. 20B.

As shown, the appearance control lens 2020 includes various example options for modifying the appearance of a media clip collection. As illustrated, the media clip system 106 can apply a visual filter. For example, the media clip system 106 adds a color filter or lens over media clips in the media clip collection, applies an aesthetic change that inverts the colors, changes the color scheme (e.g., makes black and white), or adds stickers; applies a redeye reduction filter that corrects redeyes; and/or utilizes a machine-learning model that corrects, touches up, or transforms one or more media clips. Indeed, in some implementations, the visual appearance filter enables a user account to set defined visual parameters for viewing media clips in the media clip collection.

As also shown, the appearance control lens 2020 includes an option to add a watermark. For instance, the media clip system 106 adds a watermark, labels, a copyright notice, or other text to media clips in the media clip collection. Additionally, the appearance control lens 2020 includes an option to filter out one or more media clips based on tags. For example, the media clip system 106 utilizes a list of tags to determine which media clips to display and which to hide (or perform another action). In example implementations, the media clip system 106 compares the tag list to the content item metadata of each media clip to determine whether or how to display the media clip.

In addition, FIG. 20B includes the access control lens 2022. As shown, the access control lens 2022 includes various example options for modifying the access rights to a media clip collection. For instance, the access control lens 2022 includes an option for limiting downloads. For example, in one or more implementations, the media clip system 106 prevents, limits, or otherwise controls the download of media clips in a media clip collection. In some instances, the download control lens limits the download or print resolution of a media clip.

As illustrated, the access control lens 2022 includes an option to limit access to a media clip collection. In some instances, the media clip system 106 limits access to load or view a media clip. Indeed, the media clip system 106 can limit access to a media clip collection in several ways (e.g., password protection). As also shown, the access control lens 2022 includes options for subscriptions and memberships. For example, the media clip system 106 prevents access or notifications when a media clip collection is updated unless a viewer has a subscription or membership. Indeed, the media clip system 106 can apply various control lenses that provide more complete control over media clips in the media clip collection.

Further, FIG. 20B includes the pop-up shop control lens 2024. As shown, the pop-up shop control lens 2024 includes various example options for setting up a temporary shop for a media clip collection. As shown, in some instances, the pop-up shop control lens 2024 includes a control lens to choose an expiration option, such as removing a temporary shop upon an expiration action occurring, such as a timer expiring or a number of views occurring. As another example, the pop-up shop control lens 2024 can include a control lens option to add a collaborator to a pop-up shop and/or another media clip collection such are media clips from multiple user accounts make up a media clip collection. Additionally, the media clip system 106 can add a control lens that adds prices or values to media clips in the media clip collection as part of a temporary or more-persistent e-commerce site centered around the media clip collection.

In various implementations, the media clip system 106 can apply multiple control lenses to a media clip collection. For example, the media clip system 106 applies one or more appearance control lens 2020 as well as one or more access control lens 2022 to a media clip collection. Further, the media clip system 106 can create different versions of the media clip collection that apply different control lenses.

To illustrate, FIG. 20C shows the media clip collection 2010 and example control lenses including a subscription control lens 2030, a watermark control lens 2032, and a redeye control lens 2034. FIG. 20C also shown multiple audiences including a first audience 2040 (i.e., Audience A) and a second audience 2042 (i.e., Audience B). As shown, the media clip system 106 can provide the same media clip collection to both the first audience 2040 and the second audience 2042.

In addition, the media clip system 106 can apply different control lenses to the media clip collection 2010. As shown, the media clip system 106 applies the subscription control lens 2030, the watermark control lens 2032, and the redeye control lens 2034 to the media clip collection before providing it to the first audience 2040. Further, the media clip system 106 applies the redeye control lens 2034 to the media clip collection 2010 before providing it to the second audience 2042. Accordingly, viewers in the second audience 2042 can access the media clip collection 2010 with the redeye filter applied, but without the additional restrictions imposed on viewers of the first audience 2040. Moreover, as noted above, the media clip system 106 can provide the different versions of the media clip collection 2010 to the audiences without changing the content of the underlying media clips in the media clip collection. With additional example control lens combinations, the media clip system 106 can provide a first audience (not paying) with low resolution versions of the content within a collection, while providing a second audience (paid members) with a high-resolution version of the content within a collection. This can be true for both images and videos within a collection. According, media clip system 106 uses the lens concept to efficiently and effectively share content with different audiences of for different purposes.

Figure 21:
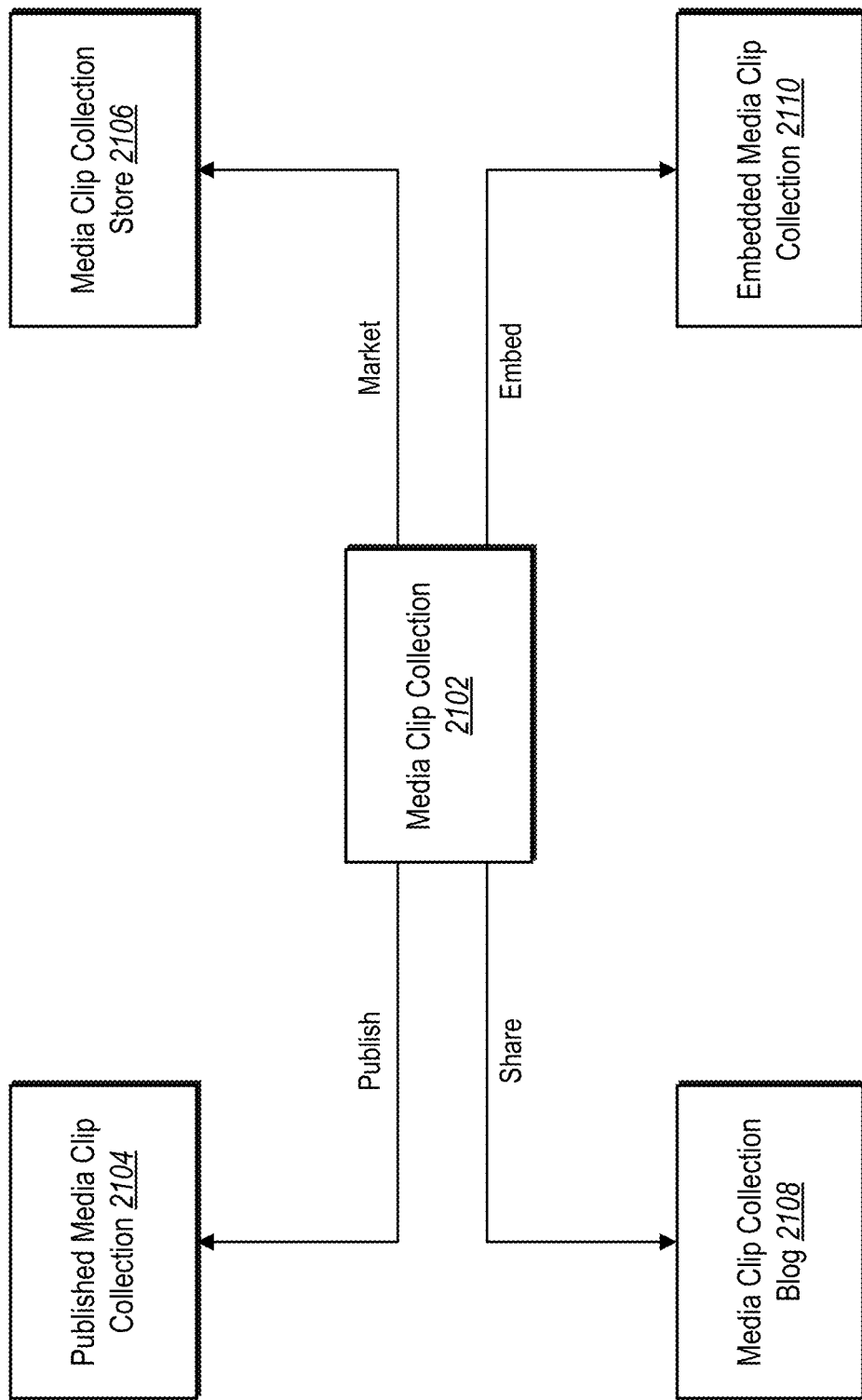
FIG. 21 illustrates publishing and sharing media clip collections in accordance with one or more embodiments.

Turning now to the next figure, FIG. 21 illustrates publishing and sharing media clip collections in accordance with one or more embodiments. As shown, FIG. 21 includes a media clip collection 2102. In various implementations, the media clip system 106 enables a user account to publish, share, embed, and/or market media clips within a media clip collection.

To illustrate, in various implementations, the media clip system 106 enables a user account to publish the media clip collection 2102 as a published media clip collection 2104. In some implementations, the media clip system 106 publishes the media clip collection 2102 to an online media clip collection repository or website. In this manner, other user accounts can view, access, search, etc. the published media clip collection 2104. In example implementations, the media clip system 106 can publish the media clip collection 2102 with a selected layout arrangement and/or one or more control lenses, as described above. In example implementations, the media clip system 106 generates a simple, readable, and comprehensible link (e.g., URL) to access the media clip collection 2102 (e.g., dropbox.com/user_account_name/collection_name).

In some implementations, the media clip system 106 enables a user account to market the media clip collection 2102. For example, in various implementations, the media clip system 106 enables a user account to convert a media clip collection 2102 into a media clip collection store 2106, where visitors can purchase access, subscriptions prints, downloads, etc. to media clips. As noted above, the media clip system 106 can provide various control lenses to facilitate converting a media clip collection into a media clip collection store 2106.

In addition, in one or more implementations, the media clip system 106 can enable a user account to share the media clip collection 2102. For example, the media clip system 106 provides an option to convert a media clip collection into a media clip collection blog 2108, as shown. In various implementations, the media clip system 106 enables a media clip collection to be converted into a journal, news article, content gallery, or into another shareable format. In example implementations, the media clip system 106 enables a user account to share a link to the media clip collection 2102 (e.g., a simple, readable, and comprehensible URL) with another user account or computing device.

As also shown, in example implementations, the media clip system 106 can enable a user account to embed the media clip collection 2102 into one or more websites and/or applications. Additionally, the embedded media clip collection 2110 can be a published media clip collection 2104, a media clip collection store 2106, or another type of shared media clip collection. In this manner, a user account can provide the media clip collection to various connected sites (e.g., websites). Further, in these implementations, media clips in the media clip collection 2102 change, the media clip system 106 can automatically propagate the changes to each of the embedded media clip collections (and/or other shared media clip collections), thus maintaining a consistent presentation of the media clip collection across the different sites.

Figure 22A:
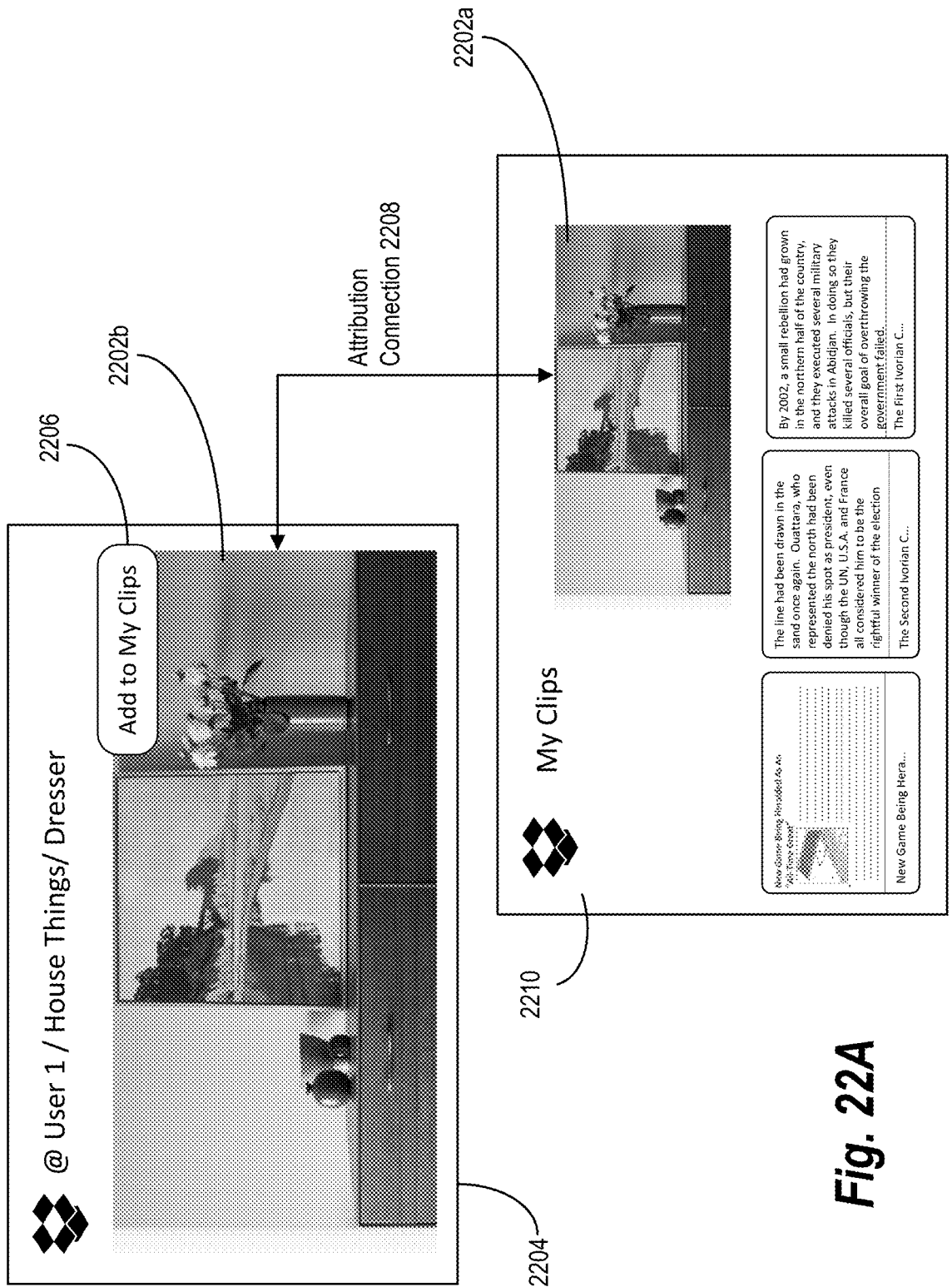
FIGS. 22A-22B illustrate adding attributed digital media clips and media clip collections to a media clip library in accordance with one or more embodiments.
Figure 22B:
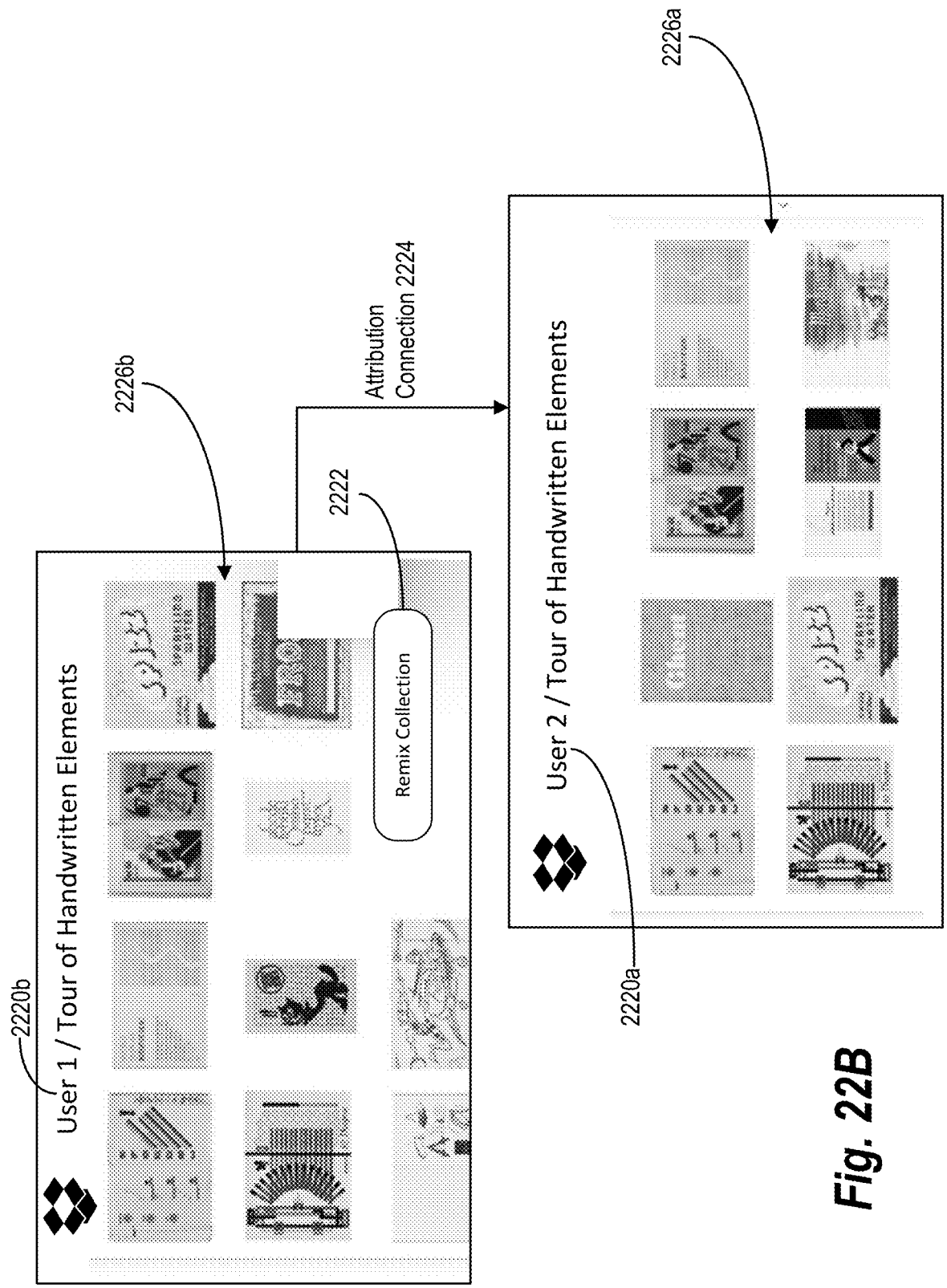

Just as a user account can share a media clip collection with media clips, in various implementations, the user account can add media clips from other user accounts to their media clip library. To illustrate, FIGS. 22A-22B illustrate adding attributed digital media clips and attributed media clip collection to a media clip library in accordance with one or more embodiments. As shown, FIG. 22A includes an application 2204 (e.g., a web browser) showing a second user media clip 2202b shared by a second user account (i.e., User 2).

As shown, the application 2204 also includes an add media clip element 2206 that enables the user account to add the second user media clip 2202b to the user account (e.g., a first user account). Upon detecting selection of the add media clip element 2206 by the user account, the media clip system 106 can add the second user media clip 2202b to the first user media clip library 2210 of the user account, shown as first user media clip 2202a within the first user media clip library 2210.

In various implementations, the media clip system 106 also determines an attribution connection 2208 when adding media clips from one user account to another user account. In this manner, the media clip system 106 can track the source and origin of media clips, even if the media clip is modified. In some implementations, the media clip system 106 maintains a media clip attribution table that maintains an attribution chain of a media clip (e.g., stored in connection with the original media clip or in a central attribution database). The media clip attribution table includes the original source of the first user media clip 2102a (e.g., the second user), other user accounts that also have the second user media clip 2202b in their media clip library, and/or other user accounts that have added the first user media clip 2102a from the first user account to their user accounts.

Indeed, in various implementations, the media clip system 106 can track attribution of media clips as they circulate among various media clip collections and user accounts. By maintaining an attribution connection 2208, the media clip system 106 is not only able to track where media clips have been shared but also use shared media clips to identify and suggest additional related media clips to add to the media clip library of a user account, as detailed above.

In addition to adding individual media clips, in various implementations, the media clip system 106 facilitates adding the entire media clip collection of another user to a user account. To illustrate, FIG. 22B shows a user account adding an external media clip collection to their user account. In particular, FIG. 22B shows an original media clip collection 2220b for a second user account having original media clips 2226b. For example, the second user account publishes the original media clip collection 2220b to a media clip collection sharing website or repository.

As shown, the original media clip collection 2220b includes a user account customization or remix media clip collection element 2222. In various implementations, the remix media clip collection element 2222 allows a user account to add the original media clip collection 2220b to their user account as well as customize or redesign the media clip collection as needed.

To illustrate, FIG. 22B shows a remixed media clip collection 2220a of a first user account. In one or more embodiments, the option to remix a collection is based on user permissions. As shown, the remixed media clip collection 2220a includes remixed media clips 2226a that match the original media clips 2226b, but which are organized differently. For example, the media clip system 106 enables the first user account to remix the media clip collection by organizing the remixed media clips 2226a in a different order, arrangement, etc. Further, in some implementations, the user account may remove one or more of the remixed media clips 2226a from the remixed media clip collection 2220a.

In addition, FIG. 22B includes the attribution connection 2224. As a single media clip can be attributed to the original creation, so to can media clip collections, even if the media clip collection is remixed. Indeed, in various implementations, the media clip system 106 maintains one or more attribution connections to track how media clips and media clip collections are being shared among user account. Further, the media clip system 106 can ensure that proper credit is given to the author or creator of a media clip collection even if media clips within the media clip collection have been modified or customized to another user account. In other words, the media clip system 106 maintains attribution metadata at both a collection and media clip level that allows attribution of the work to be maintained through various uses and manipulations of a collection.

Figure 23:
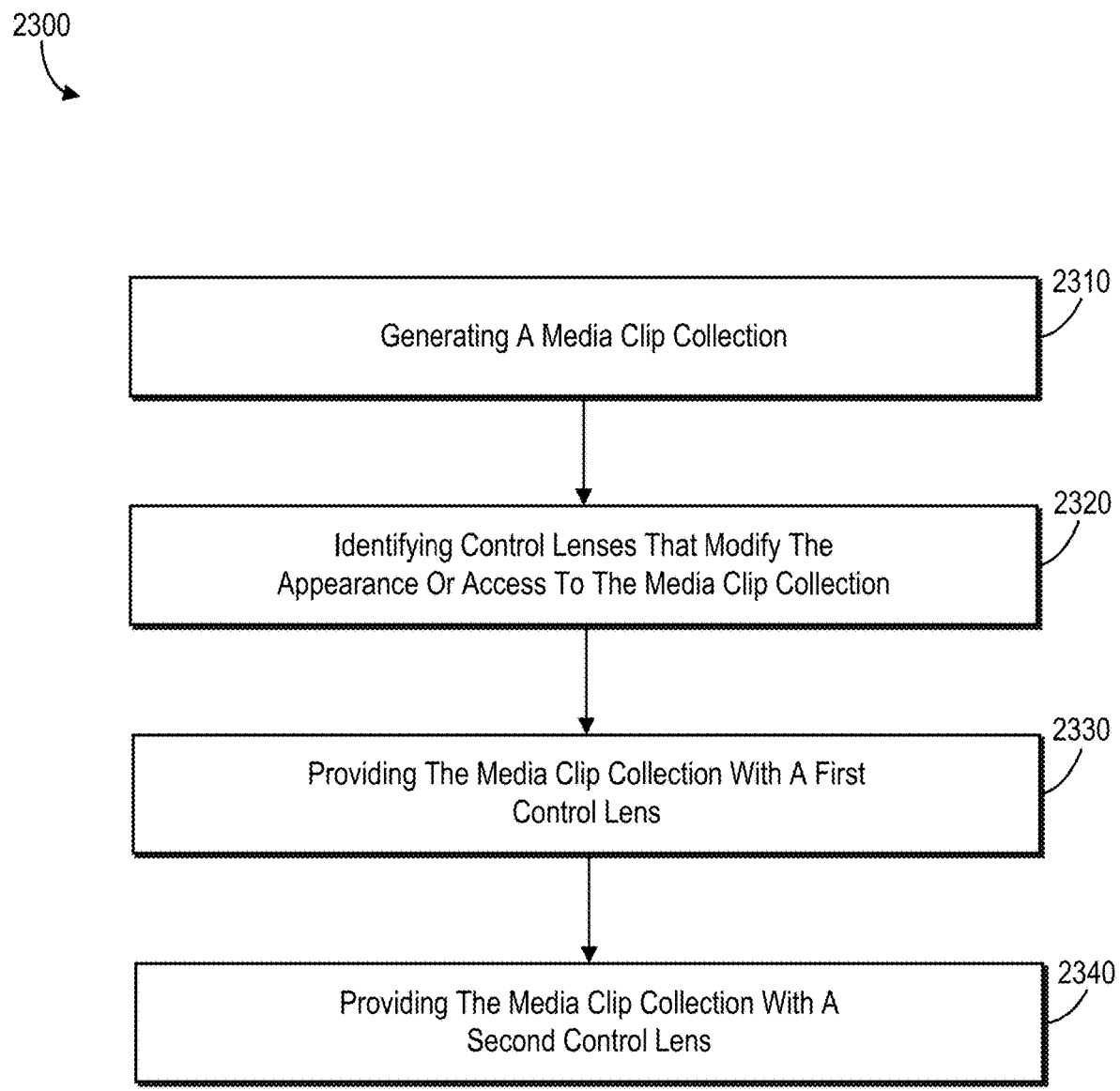
FIG. 23 illustrates a flowchart of a series of acts for providing a media clip collection with one or more control lenses in accordance with one or more embodiments.

The preceding figures, the corresponding text, and the examples provide several different systems, methods, techniques, components, and/or devices of the digital media clip system 106 in accordance with one or more embodiments. In addition to the above description, one or more embodiments can also be described in terms of flowcharts including acts for accomplishing a particular result. For example, FIG. 23 illustrate flowcharts corresponding to the one or more implementations of the media clip system 106 described above. Moreover, the outlined acts in FIG. 23 are only provided as examples, and some of the acts may be optional, combined into fewer acts, or expanded into additional acts without detracting from the essence of the disclosed embodiments. Further, the acts described herein may be repeated or performed in parallel with one another or in parallel with different instances of the same or similar acts.

Additionally, the digital media clip system 106 may perform one or more acts of the series of acts in addition to or alternatively to one or more acts described in conjunction with other figures. While FIG. 23 illustrates acts according to one embodiment, alternative embodiments may omit, add to, reorder, and/or modify any of the acts shown. Further, each of the acts of FIG. 23 can be performed as part of a method. Alternatively, a non-transitory computer-readable medium can comprise instructions that, when executed by one or more processors, cause a computing device to perform the acts of FIG. 23. In some embodiments, a system can perform the acts of FIG. 23.

To illustrate, FIG. 23 includes a series of acts 2300 for providing a media clip collection with one or more control lenses in accordance with one or more embodiments. As shown, the series of acts 2300 includes an act 2310 of generating a media clip collection. For instance, the act 2310 can involve generating a media clip collection displaying a plurality of digital media clips each having a content item, content metadata, and contextual metadata.

In one or more implementations, the act 2310 incudes generating the media clip collection by automatically grouping related digital media clips from the plurality of digital media clips based on analyzing content metadata and contextual metadata of the plurality of digital media clips in the plurality of digital media clips. In some implementations, the act 2310 includes generating a bonded set of digital media clips that includes a first digital media clip joined to a second digital media clip in a defined presentation order, wherein the first digital media clip cannot be provided for display within the media clip collection without at least a portion the second digital media clip being provided for display. In one or more implementations, the act 2310 also includes generating a digital canvas that displays a digital media clip of the plurality of digital media clips, a file, and a bonded set of digital media clips, wherein the digital media clip is stored outside of the digital canvas.

In certain implementations, the act 2310 includes providing an interactive graphical user interface that displays, within a digital canvas, a set of digital media clips from the plurality of digital media clips and digital canvas metadata generated from the set of digital media clips. In various implementations, the act 2310 includes detecting the addition of a new digital media clip moved to an edge of the digital canvas and dynamically expanding the size of the digital canvas to encompass the new digital media clip based on the addition of the new digital media clip.

Additionally, the series of acts 2300 includes an act 2320 of identifying control lenses that modify the appearance or access to the media clip collection. For instance, the act 2320 can involve identifying a plurality of control lenses that modifies an appearance or access to the media clip collection without modifying the plurality of digital media clips. In one or more implementations, the act 2320 can include identifying a plurality of control lenses that modifies an appearance or access to the media clip collection without modifying the plurality of digital media clips.

The series of acts 2300 also includes an act 2330 of providing the media clip collection with a first control lens. For instance, the act 2320 can involve providing the media clip collection with a first control lens of the plurality of control lenses. In one or more implementations, the act 2330 can include modifying the appearance of the plurality of digital media clips within the media clip collection by applying the first control lens to the plurality of digital media clips.

In some implementations, the act 2330 can include modifying access to the plurality of digital media clips and the media clip collection by applying the first control lens to the media clip collection. In various implementations, the act 2330 can include providing the media clip collection to the first set of computing devices having the first control lens applied to the media clip collection. In example implementations, the act 2330 can include providing the media clip collection with a first control lens of the plurality of control lenses to a first recipient computing device, wherein the first control lens changes the appearance of the plurality of digital media clips in the media clip collection.

Further, the series of acts 2300 includes an act 2340 of providing the media clip collection with a second control lens. For instance, the act 2340 can involve providing the media clip collection with a second control lens of the plurality of control lenses where the second control lens differs from the first control lens. In various implementations, the act 2340 can include providing the media clip collection to a second set of computing devices having the second control lens applied to the media clip collection. In some implementations, the act 2340 can include providing the media clip collection for display arranged one of a plurality of layouts including a grid layout, a gallery layout, a timeline layout, and a freeform layout. In one or more implementations, the act 2340 can include providing the media clip collection with a second control lens that changes viewing access to the media clip collection. In example implementations, the second control lens includes access controls to view, share, copy, or print the plurality of digital media clips within the media clip collection.

The series of acts 2300 can also include acts not included in FIG. 23. To illustrate, in various implementations, the series of acts 2300 includes additional acts of adding a shared digital media clip to the media clip collection from an externally shared media clip collection; providing the shared digital media clip for display in the media clip collection along with the plurality of digital media clips; and based on receiving a selection indication for the shared digital media clip, providing an attribution table for display that includes a plurality of external media clip collections that include the shared digital media clip and a source media clip collection of the shared digital media clip. In some implementations, the series of acts 2300 includes additional acts of identifying a digital media clip within a digital canvas, determining additional content metadata for the digital media clip based on content metadata and contextual metadata of the digital media clip, and providing the additional content metadata for displaying in connection with the digital media clip.

Components of the Media Clip System

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general-purpose or special-purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid-state drives ("SSDs") (e.g., based on RAM), Flash memory, phase-change memory ("PCM"), other types of memory, other optical disk storage, magnetic disk storage or other magnetic storage devices, or any other medium which can be used to store needed program code means in the form of computer-executable instructions or data structures and which can be accessed by a general-purpose or special-purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links that can be used to carry needed program code means in the form of computer-executable instructions or data structures and which can be accessed by a general-purpose or special-purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special-purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 24:
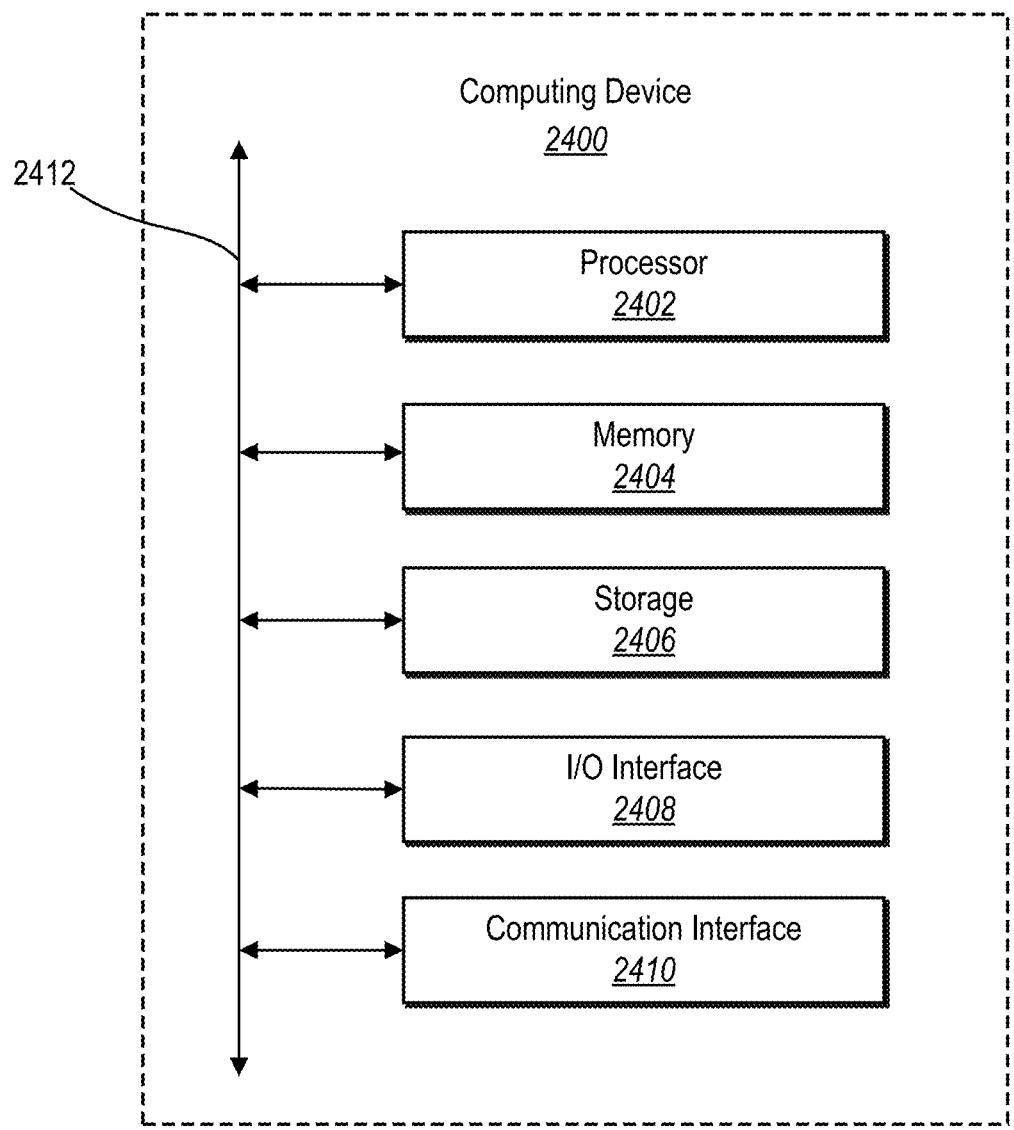
FIG. 24 illustrates a block diagram of an example computing device for implementing one or more embodiments.

FIG. 24 illustrates a block diagram of computing device 2400 that may be configured to perform one or more of the processes described above. One will appreciate that the client devices and/or server devices described herein may comprise one or more computing devices such as the client device 102 and/or the client device 400. As shown by FIG. 24, the computing device 2400 can comprise a processor 2402, memory 2404, a storage device 2406, an I/O interface 2408, and a communication interface 2410, which may be communicatively coupled by way of communication infrastructure 2412. While the computing device 2400 is shown in FIG. 24, the components illustrated in FIG. 24 are not intended to be limiting. Additional or alternative components may be used in other embodiments. Furthermore, in certain embodiments, the computing device 2400 can include fewer components than those shown in FIG. 24. Components of the computing device 2400 shown in FIG. 24 will now be described in additional detail.

In particular embodiments, processor 2402 includes hardware for executing instructions, such as those making up a computer program. As an example, and not by way of limitation, to execute instructions, processor 2402 may retrieve (or fetch) the instructions from an internal register, an internal cache, memory 2404, or storage device 2406 and decode and execute them. In particular embodiments, processor 2402 may include one or more internal caches for data, instructions, or addresses. As an example and not by way of limitation, processor 2402 may include one or more instruction caches, one or more data caches, and one or more translation lookaside buffers (TLBs). Instructions in the instruction caches may be copies of instructions in memory 2404 or the storage device 2406. Additionally, processor 2402 can include or represent one or more processors or processor cores.

Memory 2404 may be used for storing data, metadata, and programs for execution by the processor(s). Memory 2404 may include one or more of volatile and non-volatile memories, such as Random Access Memory ("RAM"), Read-Only Memory ("ROM"), a solid-state disk ("SSD"), Flash, Phase Change Memory ("PCM"), or other types of data storage. Memory 2404 may be internal or distributed memory.

Storage device 2406 includes storage for storing data or instructions. As an example and not by way of limitation, storage device 2406 can comprise a non-transitory storage medium described above. Storage device 2406 may include a hard disk drive (HDD), a floppy disk drive, flash memory, an optical disc, a magneto-optical disc, magnetic tape, or a Universal Serial Bus (USB) drive or a combination of two or more of these. Storage device 2406 may include removable or non-removable (or fixed) media, where appropriate. Storage device 2406 may be internal or external to computing device 2400. In particular embodiments, storage device 2406 is non-volatile, solid-state memory. In other embodiments, Storage device 2406 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 2408 allows a user to provide input to, receive output from, and otherwise transfer data to and receive data from computing device 2400. I/O interface 2408 may include a mouse, a keypad or a keyboard, a touch screen, a camera, an optical scanner, network interface, modem, other known I/O devices, or a combination of such I/O interfaces. I/O interface 2408 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interface 2408 is configured to provide graphical data to a display for presentation to a user. The graphical data may be representative of one or more graphical user interfaces and/or any other graphical content as may serve a particular implementation.

Communication interface 2410 can include hardware, software, or both. In any event, communication interface 2410 can provide one or more interfaces for communication (such as, for example, packet-based communication) between computing device 2400 and one or more other computing devices or networks. As an example and not by way of limitation, communication interface 2410 may include a network interface controller (NIC) or network adapter for communicating with an Ethernet or other wire-based network or a wireless NIC (WNIC) or wireless adapter for communicating with a wireless network, such as a WI-FI.

Additionally or alternatively, communication interface 2410 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, communication interface 2410 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, communication interface 2410 may facilitate communications using various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 2412 may include hardware, software, or both that couples components of the computing device 2400 to each other. As an example and not by way of limitation, the communication infrastructure 2412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

Figure 25:
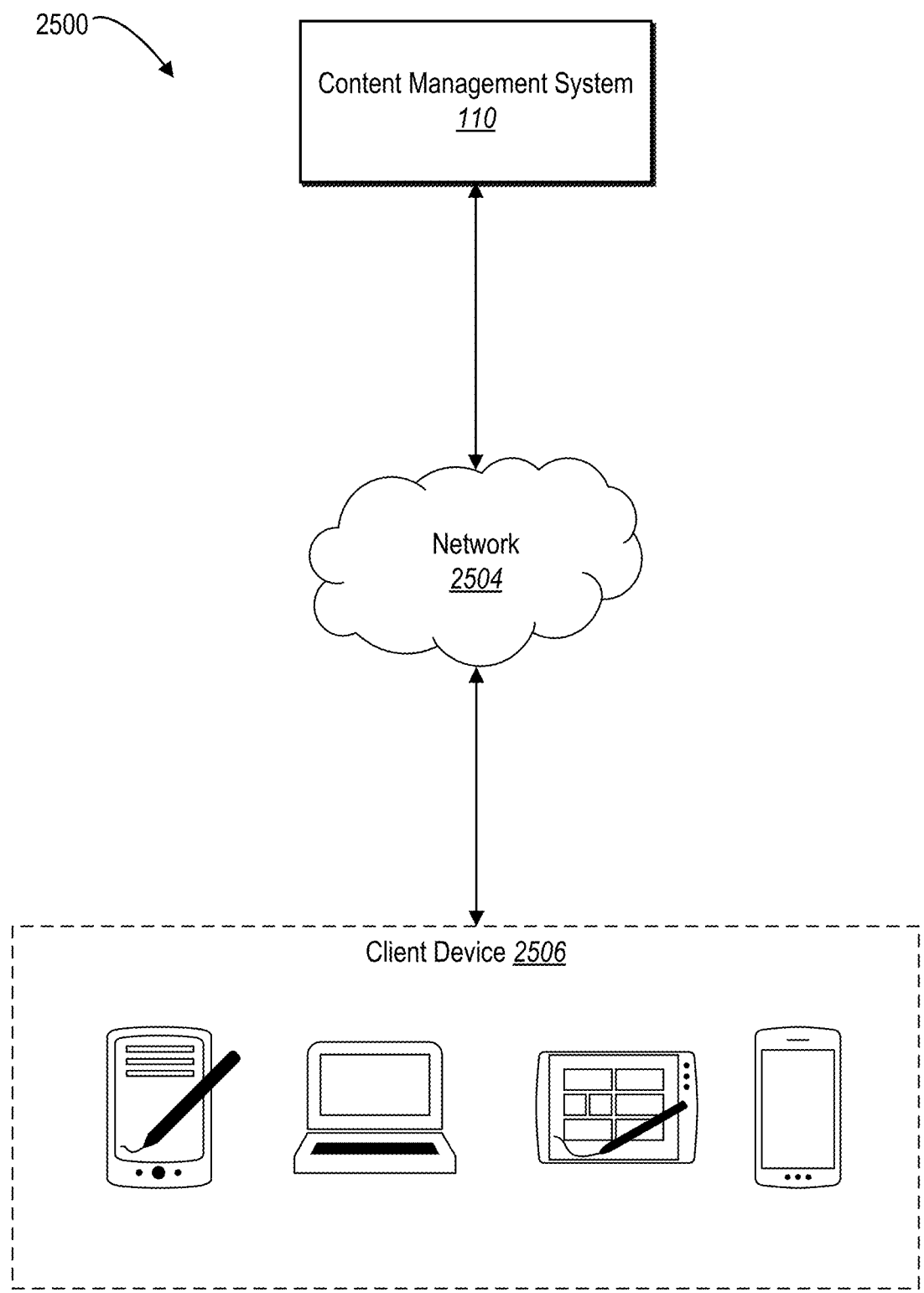
FIG. 25 illustrates a network environment of a content management system in accordance with one or more embodiments.

FIG. 25 is a schematic diagram illustrating an environment 2500 within which one or more embodiments of the content management system 110 can be implemented. For example, as shown in FIG. 25, the content management system 110 may generate, store, manage, receive, and send digital content (such as digital documents and other content items). For example, the content management system 110 may send and receive digital content to and from the client device 2506 by way of a network 2504. In particular, the content management system 110 can store and manage a collection of digital content. The content management system 110 can manage the sharing of digital content between computing devices associated with a plurality of users (i.e., user account of the content management system 110). For instance, the content management system 110 can facilitate a user sharing digital content with another user of the content management system 110.

In particular, the content management system 110 can manage synchronizing digital content across multiple client devices associated with one or more users. For example, a user may edit digital content using the client device 2506. The content management system 110 can cause the client device 2506 to send the edited digital content to the content management system 110. The content management system 110 then synchronizes the edited digital content on one or more additional computing devices.

In addition to synchronizing digital content across multiple devices, one or more embodiments of the content management system 110 can provide an efficient storage option for users that have large collections of digital content. For example, the content management system 110 can store a collection of digital content on the content management system 110, while the client device 2506 only stores reduced-sized versions of the digital content. A user can navigate and browse the reduced-sized versions (e.g., a thumbnail of a digital image) of the digital content on the client device 2506. In particular, one way in which a user can experience digital content is to browse the reduced-sized versions of the digital content on the client device 2506.

Another way in which a user can experience digital content is to select a reduced-size version of digital content to request the full- or high-resolution version of digital content from the content management system 110. In particular, upon a user selecting a reduced-sized version of digital content, the client device 2506 sends a request to the content management system 110 requesting the digital content associated with the reduced-sized version of the digital content. The content management system 110 can respond to the request by sending the digital content to the client device 2506. The client device 2506, upon receiving the digital content, can then present the digital content to the user. In this way, a user can have access to large collections of digital content while minimizing the number of resources used on the client device 2506.

The client device 2506 may be a desktop computer, a laptop computer, a tablet computer, a personal digital assistant (PDA), an in- or out-of-car navigation system, a smart TV, a virtual reality (VR) or augmented reality (AR) device, a handheld device, a wearable device, a smartphone or other cellular or mobile phone, or a mobile gaming device, another mobile device, or other suitable computing devices. The client device 2506 may execute one or more client applications, such as a web browser (e.g., Microsoft Windows Internet Explorer, Mozilla Firefox, Apple Safari, Google Chrome, Opera, etc.) or a native or special-purpose client application (e.g., Facebook for iPhone or iPad, Facebook for Android, etc.), to access and view content over the network 2504.

The network 2504 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which the client device 2506 may access the content management system 110.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with fewer or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
   generating a first media clip collection displaying a plurality of digital media clips;
   identifying a plurality of control lenses comprising pop-up shop control lenses to set up a digital shop for the first media clip collection;
   providing access to the digital shop for the first media clip collection to a first set of computing devices by applying a first control lens of the plurality of control lenses to the first media clip collection, the first control lens comprising an option that removes the access to the digital shop for the first set of computing devices in response to an action occurring;
   providing collaboration access for the digital shop to a second set of computing devices by applying a second control lens of the plurality of control lenses to the first media clip collection, the second control lens comprising options for the second set of computing devices to add additional digital media clips from a second media clip collection to the first media clip collection;
   receiving, from the second set of computing devices, an addition of one or more digital media clips from the second media clip collection to the first media clip collection, the digital shop comprising the first media clip collection and the one or more digital media clips from the second media clip collection; and
   based on receiving the one or more digital media clips from the second set of computing devices, providing, for the first set of computing devices, access to the digital shop that includes the first media clip collection and the one or more digital media clips from the second media clip collection; and
   modifying access to the plurality of digital media clips and the first media clip collection by applying a third control lens to the first media clip collection, the third control lens comprising an option for the second set of computing devices to add prices or values to digital media clips in the first media clip collection.

2. The computer-implemented method of claim 1, wherein the option to remove the access to the digital shop for the first set of computing devices in response to the action occurring comprises the action of a timer expiring.

3. The computer-implemented method of claim 1, wherein the option to remove the access to the digital shop for the first set of computing devices in response to the action occurring comprises the action of a number of views by the first set of computing devices occurring.

4. The computer-implemented method of claim 1, further comprising:
   providing the first media clip collection to the first set of computing devices having the first control lens and a fourth control lens applied to the first media clip collection, the fourth control lens modifying an appearance of the first media clip collection; and
   providing the first media clip collection to a second set of computing devices having the second control lens and the third control lens applied to the first media clip collection.

5. The computer-implemented method of claim 1, further comprising:
   providing access to the digital shop to the first set of computing devices by applying a third control lens to the first media clip collection, the third control lens comprises a watermark filter on the plurality of digital media clips; and
   in response to an action from the first set of computing devices, removing the third control lens from the digital shop.

6. The computer-implemented method of claim 1, further comprising in response to the first set of computing devices accessing the digital shop a threshold number of times, removing access to the digital shop for the first set of computing devices.

7. The computer-implemented method of claim 1, further comprising generating a bonded set of digital media clips that comprises a first digital media clip joined to a second digital media clip in a defined presentation order, wherein the first digital media clip cannot be provided for display within the digital shop for the first media clip collection without at least a portion the second digital media clip being provided for display.

8. The computer-implemented method of claim 7, further comprising:
   generating a digital canvas that displays a digital media clip of the plurality of digital media clips, a file, and a bonded set of digital media clips, wherein the digital media clip is stored outside of the digital canvas; and
   providing the digital canvas for display in the digital shop.

9. The computer-implemented method of claim 1, further comprising providing an interactive graphical user interface that displays, within a digital canvas in the digital shop, a set of digital media clips from the plurality of digital media clips and digital canvas metadata generated from the set of digital media clips.

10. The computer-implemented method of claim 1, further comprising:
   adding a shared digital media clip to the first media clip collection from an externally shared media clip collection;

providing the shared digital media clip for display in the first media clip collection along with the plurality of digital media clips; and based on receiving a selection indicating the shared digital media clip, providing an attribution table for display that shows the shared digital media clip and other user accounts that also contain the shared digital media clip.

11. A non-transitory computer-readable storage medium comprising instructions that, when executed by at least one processor, cause a computer device to:

generate a first media clip collection comprising a plurality of digital media clips;

identify a plurality of control lenses comprising pop-up shop control lenses to set up a digital shop for the first media clip collection;

provide access to the digital shop for the first media clip collection with a first control lens of the plurality of control lenses to a first recipient computing device, wherein the first control lens comprises an option that removes the access to the digital shop for the first recipient computing device in response to an action occurring;

provide collaboration access for the digital shop with a second control lens of the plurality of control lenses to a second recipient computing device, wherein the second control lens comprises options for the second recipient computing device to add additional digital media clips from a second media clip collection to the first media clip collection;

receive, from the second recipient computing device, an addition of one or more digital media clips from the second media clip collection to the first media clip collection, the digital shop comprising the first media clip collection and the one or more digital media clips from the second media clip collection;

based on receiving the one or more digital media clips from the second recipient computing device providing, for the first recipient computing device, access to the digital shop that includes the first media clip collection and the one or more digital media clips from the second media clip collection; and modify access to the plurality of digital media clips and the first media clip collection by applying a third control lens to the first media clip collection, the third control lens comprising an option for the second recipient computing device to add prices or values to digital media clips in the first media clip collection.

12. The non-transitory computer-readable storage medium of claim 11, further comprising instructions that, when executed by the at least one processor, cause the computer device to:

provide an interactive graphical user interface that displays, within a digital canvas, a set of digital media clips from the plurality of digital media clips and digital canvas metadata generated from the set of digital media clips; and provide the digital canvas for display in the digital shop.

13. The non-transitory computer-readable storage medium of claim 12, further comprising instructions that, when executed by the at least one processor, cause the computer device to:

identify a digital media clip within the digital canvas;

determine additional content metadata for the digital media clip based on content metadata and contextual metadata of the digital media clip; and provide the additional content metadata for displaying in the digital shop in connection with the digital media clip.

14. The non-transitory computer-readable storage medium of claim 11, further comprising instructions that, when executed by the at least one processor, cause the computer device to provide the first media clip collection with a third control lens that applies a watermark to the first media clip collection.

15. The non-transitory computer-readable storage medium of claim 11, further comprising instructions that, when executed by the at least one processor, cause the computer device to generate a digital media clip by:

capturing a content item;

extracting content metadata from the content item; and generating contextual metadata from contextual signals corresponding to one or more digital environments in which the content item currently resides.

16. A system comprising:

at least one processor; and a non-transitory computer memory comprising instructions that, when executed by the at least one processor, cause the system to:

generate a first media clip collection comprising a plurality of digital media clips;

identify a plurality of control lenses comprising pop-up shop control lenses to set up a digital shop for the first media clip collection;

provide access to the digital shop for the first media clip collection with a first control lens to a first recipient computing device, the first control lens comprises an option that removes the access to the digital shop for the first recipient computing device in response to an action occurring;

provide collaboration access for the digital shop with a second control lens to a second recipient computing device, the second control lens comprises options for the second recipient computing device to add additional digital media clips from a second media clip collection to the first media clip collection;

receive, from the second recipient computing device, an addition of one or more digital media clips from the second media clip collection to the first media clip collection, the digital shop comprising the first media clip collection and the one or more digital media clips from the second media clip collection;

based on receiving the one or more digital media clips from the second recipient computing device provide, for the first recipient computing device, access to the digital shop that includes the first media clip collection and the one or more digital media clips from the second media clip collection; and modify access to the plurality of digital media clips and the first media clip collection by applying a third control lens to the first media clip collection, the third control lens comprising an option for the second recipient computing device to add prices or values to digital media clips in the first media clip collection.

17. The system of claim 16, further comprising instructions that, when executed by the at least one processor, cause the system to identify a plurality of control lenses that modifies an appearance or access to the first media clip collection without modifying the plurality of digital media clips, wherein the plurality of control lenses comprise the first control lens and the second control lens.

18. The system of claim 16, further comprising instructions that, when executed by the at least one processor, cause the system to apply a third control lens to the first media clip collection, the third control lens comprises access controls to view, share, copy, or print the plurality of digital media clips within the first media clip collection.

19. The system of claim 16, further comprising instructions that, when executed by the at least one processor, cause the system to:
   generate a bonded set of digital media clips that comprises a first digital media clip displayed with a second digital media clip in a defined presentation order, wherein the first digital media clip cannot be displayed within the first media clip collection without at least a portion the second digital media clip being displayed; and
   provide, for display in the digital shop, the bonded set of digital media clips.

20. The system of claim 16, further comprising instructions that, when executed by the at least one processor, cause the system to:
   provide an interactive graphical user interface that displays, within a digital canvas, a set of digital media clips from the plurality of digital media clips;
   detect an addition of a new digital media clip moved to an edge of the digital canvas;
   based on the addition of the new digital media clip, dynamically expanding a size of the digital canvas to encompass the new digital media clip; and
   provide, for display in the digital shop, the digital canvas with the new digital media clip.

* * * * *